(12) United States Patent
McGreevy

(10) Patent No.: US 6,741,981 B2
(45) Date of Patent: *May 25, 2004

(54) SYSTEM, METHOD AND APPARATUS FOR CONDUCTING A PHRASE SEARCH

(75) Inventor: Michael W. McGreevy, Sunnyvale, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 196 days.

This patent is subject to a terminal disclaimer.

(21) Appl. No.: 09/800,311

(22) Filed: Mar. 2, 2001

(65) Prior Publication Data

US 2003/0004914 A1 Jan. 2, 2003

(51) Int. Cl.[7] ................................................ G06F 17/30
(52) U.S. Cl. .................................... 707/3; 707/1; 707/6
(58) Field of Search ........................................ 707/1–7

(56) References Cited

U.S. PATENT DOCUMENTS

| | | | |
|---|---|---|---|
| 4,849,898 A | | 7/1989 | Adi |
| 5,014,275 A | * | 5/1991 | Shimoda et al. ............. 714/791 |
| 5,128,865 A | * | 7/1992 | Sadler ........................... 704/2 |
| 5,251,131 A | * | 10/1993 | Masand et al. ................ 704/9 |
| 5,265,065 A | * | 11/1993 | Turtle ............................. 707/4 |
| 5,386,556 A | | 1/1995 | Hedin et al. |
| 5,404,506 A | | 4/1995 | Fujisawa et al. |
| 5,418,948 A | | 5/1995 | Turtle |
| 5,488,725 A | | 1/1996 | Turtle et al. |
| 5,619,709 A | | 4/1997 | Caid et al. |
| 5,721,897 A | | 2/1998 | Rubinstein |
| 5,771,378 A | | 6/1998 | Holt et al. |
| 5,794,178 A | * | 8/1998 | Caid et al. ..................... 704/9 |
| 5,832,428 A | | 11/1998 | Chow et al. |
| 5,913,215 A | | 6/1999 | Rubinstein et al. |
| 5,926,811 A | * | 7/1999 | Miller et al. ................... 707/5 |
| 5,933,822 A | | 8/1999 | Braden-Harder et al. |
| 5,983,216 A | | 11/1999 | Kirsch et al. |
| 5,987,170 A | | 11/1999 | Yamamoto et al. |
| 6,006,217 A | | 12/1999 | Lumsden |
| 6,006,221 A | * | 12/1999 | Liddy et al. ................... 707/5 |
| 6,018,733 A | | 1/2000 | Kirsch et al. |
| 6,038,560 A | | 3/2000 | Wical |
| 6,041,323 A | | 3/2000 | Kubota |
| 6,041,326 A | | 3/2000 | Amro et al. |
| 6,076,051 A | | 6/2000 | Messerly et al. |
| 6,076,088 A | | 6/2000 | Paik et al. |
| 6,078,913 A | | 6/2000 | Aoki et al. |
| 6,078,914 A | | 6/2000 | Redfern |
| 6,098,034 A | * | 8/2000 | Razin et al. ................... 704/9 |
| 6,405,197 B2 | * | 6/2002 | Gilmour ......................... 707/5 |

OTHER PUBLICATIONS

Bush, V., "Digital Libraries," Communication of the ACM, vol. 38, No. 4, (1995).

Church, K., Gale W., Hanks, P., and Hindle, D., "Using Statistics in Lexical Analysis," *Lexical Acquisition: Exploiting On–Line Resources to Build a Lexicon,* Lawrence Erlbaum Associates, Inc., Hillsdale, New Jersey (1991).

Cowie, J. and Lehnert W., "Information Extraction," Communications of the ACM, vol. 39, No. 1 (Jan. 1996).

(List continued on next page.)

*Primary Examiner*—Uyen Le
*Assistant Examiner*—Hanh B Thai
(74) *Attorney, Agent, or Firm*—Robert M. Padilla; John F. Schipper

(57) ABSTRACT

A phrase search is a method of searching a database for subsets of the database that are relevant to an input query. First, a number of relational models of subsets of a database are provided. A query is then input. The query can include one or more sequences of terms. Next, a relational model of the query is created. The relational model of the query is then compared to each one of the relational models of subsets of the database. The identifiers of the relevant subsets are then output.

66 Claims, 32 Drawing Sheets

OTHER PUBLICATIONS

Croft, W. B., Turtle, H. R., and Lewis D. D., "The Use of Phrases and Structured Queries in Information Retrieval," ACM SIGIR (1991).

De Lima, E. F. and Pedersen, J. O., "Phrase Recognition and Expansion for Short, Precision–Based Queries Based on a Query Log," ACM SIGIR, Berkeley, California (Aug. 1999).

Fagan, J. L., "Experiments in Automatic Phrase Indexing for Document Retrieval: A Comparison of Syntactic and Non–Syntactic Methods," Ph.D. Thesis 87–868, Department of Computer Science, Cornell University, Ithaca, New York (1987).

Fayyad, U., Piatetsky–Shapiro, G., and Smyth, P., "The KDD Process for Extracting Useful Knowledge from Volumes of Data," Communications of the ACM, vol. 39, No. 11, (Nov. 1996).

Foltz, P. W. and Dumais, S. T., "Personalized Information Delivery: An Analysis of Information Filtering Methods," Communications of the ACM, vol. 35, No. 12, (1992).

Gauch, S. and Wang, J., "Corpus Analysis for TREC 5 Query Expansion," Proc. TREC 5, NIST SP 500–238, (1996).

Gelbart, D. and Smith, J. C., "Beyond Boolean Search: FLEXICON, A Legal Text–Based Intelligent System," University of British Columbia Faculty of Law Artificial Intelligence Research Project, ACM (1991).

Gey, F. C. and Chen, A., "Phrase Discovery for English and Cross–Language Retrieval at TREC–6," Proc. TREC 6, NIST SP 500–240, (1997).

Godby, J., "Two Techniques for the Identification of Phrases in Full Text," Annual Review of OCLC Research, Online Computer Library Center, Dublin, Ohio (1994).

Gutwin, C., Paynter, G., Witten, I. H., Nevill–Manning, C., and Frank, E., "Improving Browsing in Digital Libraries With Keyphrase Indexes," TR 98–1, Computer Science Department, University of Saskatchewan (1998).

Hawking, D. and Thistlewaite, P., "Proximity Operators— So Near and Yet so Far," Proc. TREC 4 NIST SP 500–236, (Dec. 6, 1995).

Hawking, D. and Thistlewaite, P., "Relevance Weighting Using Distance Between Term Occurrences," *Joint Computer Science Technical Report Series,* TR–CS–96–08, Department of Computer Science, The Australian National University, Canberra ACT 0200 Australia (Jan. 25, 1996).

Jing, Y. and Croft, W. B., "An Association Thesaurus for Information Retrieval," CIIR TR IR–47, University of Massachusetts (1994).

Jones, S. and Staveley, M. S., "Phrasier: A System for Interactive Document Retrieval Using Keyphrases," ACM SIGIR, Berkeley, California (Aug. 1999).

Kitani, T., Eriguchi, Y., and Hara, M., "Pattern Matching and discourse Processing in Information Extraction from Japanese Text," *Journal of Artificial Intelligence Research 2,* AI Access Foundation and Morgan Kaufmann Publishers (1994).

Lineback, J. R., "TSMC to Acquire WSMC Foundry," EETimes.com, www.eetimes.com (Jan. 2000).

Luhn, H. P., "A statistical Approach to Mechanized Encoding and Searching of Literary Information," *IBM Journal* (Oct. 1957).

McDonald, J., Ogden, W., and Foltz, P., "Interactive Information Retrieval Using Term Relationship Networks," Proc. TREC 6 NIST SP 500–240, (1997).

McGreevy, M., "An Ethnographic Object–Oriented Analysis of Explorer Presence in a Volcanic Terrain Environment: Claims and Evidence," NASA Technical Memorandum 108823, NASA Ames Research Center, Moffett Field, California (May 1994).

McGreevy, M. W., "A Practical Guide to Interpretation of Large Collections of Incident Narratives Using the Quorum Method," NASA Technical Memorandum 112190, NASA Ames Research Center, Moffett Field, California (Mar. 1997).

McGreevy, M. W., "The Presence of Field Geologists in Mars–Like Terrain," *Presence,* vol. 1, No. 4, MIT Press, (Fall 1992).

McGreevy, M. W., "A Relational Metric, Its Application to Domain Analysis, and an Example Analysis and Model of a Remote Sensing Domain," NASA Technical Memorandum 110358< NASA Ames Research Center, Moffett Field, California (Jul. 1995).

McGreevy, M. W., "Reporter Concerns in 300 Mode–Related Incident Reports from NASA's Aviation Safety Reporting System," NASA Technical Memorandum 110413, NASA Ames Research Center, Moffett Field, California (Jul. 1996).

McGreevy, M. W., "Searching the ASRS Database Using QUORUM Keyword Search, Phrase Search, Phrase Generation, and Phrase Discovery," NASA Technical Memorandum 210913, NASA Ames Research Center, Moffett Field, California (2001).

McGreevy, M., Kanki, B., Stephenson, H., and Pantankar, K., "Initial Computer–Aided Analysis of the KSC Shuttle Processing Events Database," (Dec. 1999).

McGreevy, M. W. and Statler, I.C., "Rating the Relevance of Quorum–Selected ASRS Incident Narratives to a 'Controlled Flight Into Terrain' Accident," NASA Technical Memorandum 208749, NASA Ames Research Center, Moffett Field, California (Sep. 1998).

Normore, L., Bendig, M., and Godby, C. J., "WordView: Understanding Words in Context," Proc. Intelligence User Interface (1999).

Salton, G., "A Blueprint for Automatic Indexing," *SIGIR Forum,* vol. 31, No. 1, ACM Press (1997).

Turpin, A. and Moffat, A., "Statistical Phrases for Vector–Space information Retrieval," ACM SIGIR,, Berkeley, California (Aug. 1999).

Xu, J. and Croft, W. B., "Query Expansion Using Local and Global Document Analysis," *SIGIR,* ACM, Zurich, Switzerland (1996).

Zamir, O. and Etzioni, O., "Grouper: A Dynamic Clustering Interface to Web Search Results," Proc. $8^{th}$ International World Wide Conference (1999).

Zorn, P., Emanoil, M., Marshall, L., and Panek, M., "Advanced Searching: Tricks of the Trade," *Online,* Online Inc. (May 1996).

*Pin.Point, Solutionizing Web Navigation,* Pinpoint.com, Inc. (2000).

W. Bruce Croft et al., Proceedings of ACM/SIGIR Conference on Research & Develoment in Information Retrieval, Oct. 13, 1991, 32–45, Chicago, Illinois.

Steve Jones, et al., Phrasier: a System for Interactive Document Retrieval Using Keyphrases, Proceedings of ACM/SIGIR, 1999, XP–002248406.

* cited by examiner

SYSTEM, METHOD AND APPARATUS FOR CONDUCTING A PHRASE SEARCH

FIELD OF THE INVENTION

The present invention relates to relational analysis and representation, database information retrieval and search engine technology and, more specifically, a system and method of analyzing data in context.

BACKGROUND OF THE INVENTION

The vast amount of text and other types of information available in electronic form have contributed substantially to an "information glut." In response, researchers are creating a variety of methods to address the need to efficiently access electronically stored information. Current methods are typically based on finding and exploiting patterns in collections of text. Variations among the methods and the factions are primarily due to varying allegiances to linguistics, quantitative analysis, representations of domain expertise, and the practical demands of the applications. Typical applications involve finding items of interest from large collections of text, having appropriate items routed to the correct people, and condensing the contents of many documents into a summary form.

One known application includes various forms of, and attempts to improve upon, keyword search type technologies. These improvements include statistical analysis and analysis based upon grammar or parts of speech. Statistical analysis generally relies upon the concept that common or often-repeated terms are of greater importance than less common or rarely used terms. Parts of speech attach importance to different terms based upon whether the term is a noun, verb, pronoun, adverb, adjective, article, etc. Typically a noun would have more importance than an article therefore nouns would be processed where articles would be ignored.

Other known methods of processing electronic information include various methods of retrieving text documents. One example is the work of Hawking, D. A. and Thistlewaite, P. B.: Proximity Operators—So Near And Yet So Far. In D. K. Harman, (ed.) Proc. Fourth Text Retrieval Conf. (TREC), pp 131–144, NIST Special Publication 500-236, 1996. Hawking, D. A. and Thistlewaite, P. B.: Relevance Weighting Using Distance Between Term Occurrences. Technical Report TR-CS-96-08, Department of Computer Science, Australian National University, June 1996 (Hawking and Thistlewaite (1995, 1996)) on the PADRE system.

The PADRE system applies complex proximity metrics to determine the relevance of documents. PADRE measures the spans of text that contain clusters of any number of target words. Thus, PADRE is based on complex, multi-way ("N-ary") relations. PADRE's spans and clusters have complex, non-intuitive, and somewhat arbitrary definitions. Each use of PADRE to rank documents requires a user to manually select and specify a small group of words that might be closely clustered in the text. PADRE relevance criteria are based on the assumption that the greatest relevance is achieved when all of the target words are closest to each other. PADRE relevance criteria are generated manually, by the user's own "human free association." PADRE, therefore, is imprecise and often generates inaccurate search/comparison results.

Other prior art methods include various methodologies of data mining. See for example: Fayyad, U.; Piatetsky-Shapiro, G.; and Smyth, P: The KDD Process for Extracting Useful Knowledge from Volumes of Data. Comm. ACM, vol. 39, no. 11, 1996, pp. 27–34 (Fayyad, et al., 1996). Search engines Zorn, P.; Emanoil, M.; Marshall, L; and Panek, M.: Advanced Web Searching: Tricks of the Trade. ONLINE, vol. 20, no. 3, 1996, pp. 14–28, (Zorn, et al., 1996). Discourse analysis Kitani, T.; Eriguchi, Y.; and Hara, M.: Pattern Matching and Discourse Processing in Information Extraction from Japanese Text. JAIR, vol. 2, 1994, pp. 89–100, (Kitani, et al., 1994). Information extraction Cowie, J. and Lehnert, W.: Information Extraction. Comm. ACM, vol. 39, no. 1, 1996, pp. 81–91, (Cowie, et al., 1996). Information filtering Foltz, P. W. and Dumais, S. T.: Personalized Information Delivery—An Analysis of Information Filtering Methods. Comm. ACM, vol. 35, no. 12, 1992, pp. 51–60, (Foltz, et al., 1992). Information retrieval Salton, G.: Developments in Automatic Text Retrieval, Science, vol. 253, 1991, pp. 974–980, (Salton Developments . . . 1991) and digital libraries Fox, E. A.; Akscyn, R. M.; Furuta, R. K.; and Leggett, J. J.: Digital Libraries—Introduction. Comm. ACM., vol. 38, no. 4, pp. 22–28, 1995 (Fox, et al. 1995). Cutting across these approaches are concerns about how to subdivide words and collections of words into useful pieces, how to categorize the pieces, how to detect and utilize various relations among the pieces, and how transform the many pieces into a smaller number of representative pieces.

Most keyword search methods use term indexing such as used by Salton, G.: A blueprint for automatic indexing. ACM SIGIR Forum, vol. 16, no. 2, 1981. Reprinted in ACM SIGIR Forum, vol. 31, no. 1, 1997, pp. 23–36. (Salton, A blueprint . . . 1981), where a word list represents each document and internal query. As a consequence, given a keyword as a user query, these methods use merely the presence of the keyword in documents as the main criterion of relevance. Some methods such as Jing, Y. and Croft, W. B.: An Association Thesaurus for Information Retrieval. Technical Report 94-17, University of Massachusetts, 1994 (Jing and Croft, 1994); Gauch, S., and Wang, J.: Corpus analysis for TREC 5 query expansion. Proc. TREC 5, NIST SP 500-238, 1996, pp. 537–547 (Gauch & Wang, 1996); Xu, J., and Croft, W.: Query expansion using local and global document analysis. Proc. ACM SIGIR, 1996, pp. 4–11. (Xu and Croft, 1996); McDonald, J., Ogden, W., and Foltz, P.: Interactive information retrieval using term relationship networks. Proc. TREC 6, NIST SP 500-240, 1997, pp. 379–383 (McDonald, Ogden, and Foltz, 1997), utilize term associations to identify or display additional query keywords that are associated with the user-supplied keywords. This results in, "query drift". Query drift occurs when the additional query keywords retrieve documents that are poorly related or unrelated to the original keywords. Further, term index methods are ineffective in ranking documents on the basis of keywords in context.

In the proximity indexing method of Hawking and Thistlewaite (1996, 1996), a query consists of a user-identified collection of words. These query words are compared with the words in the documents of the database. The search method seeks documents containing length-limited sequences of words that contain subsets of the query words. Documents containing greater numbers of query words in shorter sequences of words are considered to have greater relevance. Further, as with other conventional term indexing schemes, the method of Hawking et al. allows a single query term to be used to identify documents containing the term, but cannot rank the identified documents containing the single query term according to the relevance of the documents to the contexts of the single query term within each document.

Most phrase search and retrieval methods that currently exist, such as Fagan, J. L.: Experiments in automatic phrase indexing for document retrieval: A comparison of syntactic and non-syntactic methods. Ph.D. thesis TR87–868, Department of Computer Science, Cornell University, 1987 (Fagan (1987)); Croft, W. B., Turtle, H. R., and Lewis, D. D.: The use of phrases and structure queries in information retrieval. Proc. ACM SIGIR, 1991, pp. 32–45 (Croft, Turtle, and Lewis (1991)); Gey, F. C., and Chen, A.: Phrase discovery for English and cross-language retrieval at TREC 6. Proc. TREC 6, NIST SP 500-240, 1997, pp. 637–644 (Gey and Chen (1997); Gutwin, C., Paynter, G., Witten, I. H., Nevill-Manning, C., and Frank E.: Improving browsing in digital libraries with keyphrase indexes. TR 98-1, Computer Science Department, University of Saskatchewan, 1998 (Gutwin, Paynter, Witten, Nevill-Manning, and Frank (1998)); Jones, S., and Stavely, M.: Phrasier: A system for interactive document retrieval using keyphrases. Proc. ACM SIGIR, 1999, pp. 160–167 (Jones and Staveley (1999)), and Jing and Croft (1994) all treat query phrases as single terms, and typically rely on lists of key phrases that have been generated at some previous time, to represent each document. This approach allows little flexibility in matching query phrases with similar phrases in the text, and this approach requires that all possible phrases be identified in advance, typically using statistical or "natural language processing" (NLP) methods.

NLP phrase search methods are subject to problems such as mistagging, as described by Fagan (1987). Statistical phrase search methods, such as in Turpin, A., and Moffat, A.: Statistical phrases for vector-space information retrieval. Proc. ACM SIGIR, 1999, pp. 309–310 (Turpin and Moffat (1999)), depend on phrase frequency, and therefore are ineffective in searching for most phrases because most phrases occur infrequently. Croft, Turtle, and Lewis (1991) also dismisses the concept of implicitly representing phrases as term associations. Further, the pair-wise association metric of Croft, Turtle, and Lewis (1991) does not include or suggest a measurement of degree or direction of word proximity. Instead, the association method of Croft, Turtle, and Lewis (1991) uses entire documents as the contextual scope, and considers any two words that occur in the same document as being related to the same extent that any other pair of words in the document are related.

There are several methods of displaying phrases contained in collections of text as a way to assist a user in domain analysis or query formulation and refinement. Known methods such as Godby, C. J.: Two techniques for the identification of phrases in full text. Annual Review of OCLC Research. Online Computer Library Center, Dublin, Ohio, 1994 (Godby (1994)); Normore, L., Bendig, M., and Godby, C. J.: WordView: Understanding words in context. Proc. Intell. User Interf., 1999, pp. 194 (Normore, Bendig, and Godby (1999)); Zamir, E., and Etzioni, E.: Grouper: A dynamic clustering interface to web search results. Proc. 8th International World Wide Web Conference (WWW8), 1999 (Zamir and Etzioni, (1999)); Gutwin, Paynter, Witten, Nevill-Manning, and Frank (1998); and Jones and Staveley (1999), maintain explicit and incomplete lists of phrases. Some phrase generation methods such as Church, K., Gale, W., Hanks, P., and Hindle, D.: Using statistics in lexical analysis. In U. Zemik (ed.), Lexical Acquisition: Using On-Line Resources To Build A Lexicon. Lawrence Earlbaum, Hillsdale, N.J., 1991 (Church, Gale, Hanks, and Hindle (1991)); Gey and Chen (1997); and Godby (1994), use contextual association to identify important word pairs, but do not identify longer phrases, or do not use the same associative method to identify phrases having more than two words. Some known methods such as Gelbart, D., and Smith, J. C.: Beyond boolean search: FLEXICON, a legal text-based intelligent system. Proc. ACM Artificial Intelligence & Law, 1991, pp. 225–234 (Gelbart and Smith (1991)); Gutwin, Paynter, Witten, Nevill-Manning, and Frank (1998); and Jones and Staveley (1999) rely on manual identification of phrases at a critical point in the process.

The "natural language processing" (NLP) methods such as Godby (1994); Jing and Croft (1994); Gutwin, Paynter, Witten, Nevill-Manning, and Frank (1998); Jones and Staveley (1999); and de Lima, E. F., and Pedersen, J. O.: Phrase recognition and expansion for short, precision-biased queries based on a query log. Proc. ACM SIGIR, 1999, pp. 145–152 (de Lima and Pedersen (1999)), classify words by part of speech using grammatical taggers and apply a grammar-based set of allowable patterns. These methods typically remove all punctuation and stopwords as a preliminary step, and most then discover only simple or compound nouns leaving all other phrases unrecognizable.

Keyphind and Phrasier methods of Gutwin, Paynter, Witten, Nevill-Manning, and Frank (1998) and Jones and Staveley (1999), identify some of the phrases in sets of documents that are relevant to initial user queries, and require users to select among the identified phrases to refine subsequent searches. Keyphind and Phrasier then rely on Natural Language Processing (NLP) methods of grammatical tagging and require pre-existing lists of identifiable phrases. In addition, Keyphind and Phrasier apply very restrictive limits on usable phrases, which significantly reduces the number and types of phrases that can be identified in documents. Keyphind and Phrasier's methods restrict the amount of phrase information available for determinations of document relevance.

SUMMARY OF THE INVENTION

In accordance with one aspect of the present invention, a phrase search is a method of searching a database for subsets of the database that are relevant to an input query. First, a number of relational models of subsets of a database are provided. A query is then input. The query can include one or more sequences of terms. Next, a relational model of the query is created. The relational model of the query is then compared to each one of the relational models of subsets of the database. The identifiers of the relevant subsets are then output.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
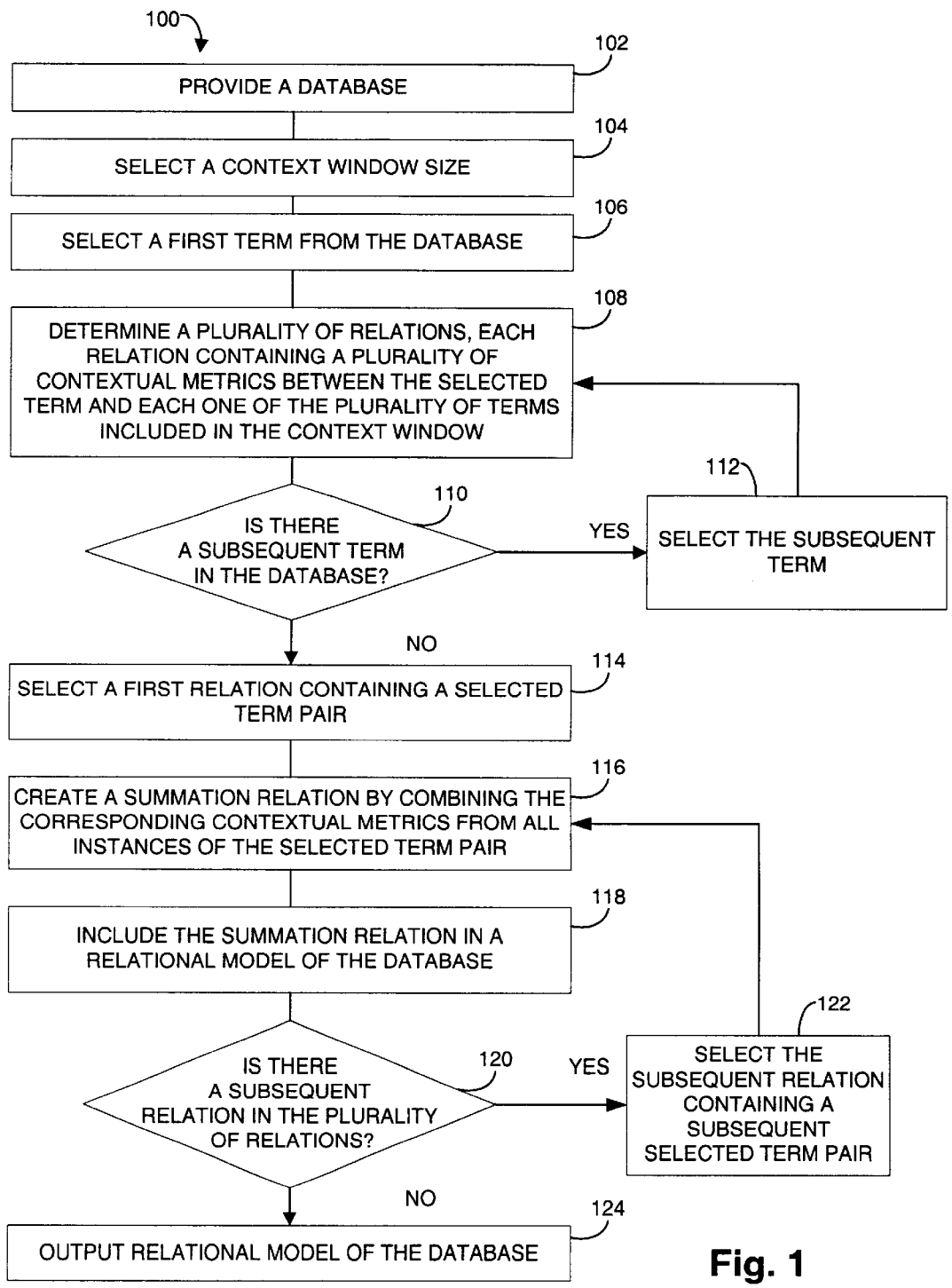
FIG. 1 illustrates one embodiment of a process 100 of producing a relational model of a database.

As will be described in more detail below, various methods of searching and extracting information from a database are described. The first described method is a method of contextually analyzing and modeling a database. The second described method is a method a searching a model of a database for subsets of the database that are relevant to a keyterm. The third described method is a method a searching a model of a database for subsets of the database that are relevant to a phrase. The fourth method described is a method of generating a list of phrases from a model of a database. The fifth described method is a method of discovering phrases in a database. Additional, alternative embodiments are also described.

Modeling a Database

A method and apparatus for contextually analyzing and modeling a database is disclosed. The database and/or a model of the database can also be searched, compared and portions extracted therefrom. For one embodiment, contextual analysis converts bodies of data, such as a database or a subset of a database, into a number of contextual associations or relations. The value of each contextual relation can be expressed as a metric value. Further, metric values can also include a directional metric value or indication.

For one embodiment, the contextual associations of a term provide contextual meaning of the term. For example, the term "fatigue" can refer to human physical tiredness such as "Fatigue impaired the person's judgment." Or "fatigue" can refer to breakdown of the structure of a material such as "Metal fatigue caused the aluminum coupling to break." A first aggregation of associations between term pairs such as: "fatigue" and "person", "fatigue" and "impaired", and "fatigue" and "judgment" can be clearly differentiated from a second aggregation of associations such as "metal" and "fatigue", "fatigue" and "aluminum", "fatigue" and "coupling", and "fatigue" and "break". Thus, when searching a database of subsets for subsets containing the notion of "fatigue" in the sense of human physical tiredness, subsets having greater similarity to the first aggregation of associations are more likely to include the appropriate sense of "fatigue", so these subsets would be retrieved. Further, the contextual associations found in the retrieved subsets can both refine and extend the contextual meaning of the term "fatigue".

The database to be modeled can include text and the examples presented below use text to more clearly illustrate the invention. Other types of data could also be equivalently used in alternative embodiments. Some examples of the types of data contemplated include but are not limited to: text (e.g. narratives, reports, literature, punctuation, messages, electronic mail, internet text, and web site information); linguistic patterns; grammatical tags; alphabetic, numeric, and alphanumeric data and strings; sound, music, voice, audio data, audio encoding, and vocal encoding; biological and medical information, data, representations, sequences, and patterns; genetic sequences, representations, and analogs; protein sequences, presentations, and analogs; computer software, hardware, firmware, input, internal information, output, and their representations and analogs; and patterned or sequential symbols, data, items, objects, events, causes, time spans, actions, attributes, entities, relations, and representations.

Modeling a database can also include representing the database as a collection or list of contextual relations, wherein each relation is an association of two terms, so that each relation includes a term pair. A model can represent any body or database of terms, wherein a term is a specific segment of the data from the database. Using a text database, a term could be a word or a portion of a word such as a syllable. A term in a DNA database for example, could be a particular DNA sequence or segment or a portion thereof. A term in a music database could be one or more notes, rests, chords, key changes, measures, or passages. Examples of databases that could be modeled include a body of terms, such as a collection of one or more narrative documents, or only a single term, or a single phrase. A collection of multiple phrases could also be modeled. In addition, combinations and subdivisions of the above examples could also be modeled as described in more detail below.

Relevance ranking a collection of models is a method of quantifying the degree of similarity of a first model (i.e., a criterion model) and each one of the models in the collection, and assigning a rank ordering to the models in the collection according to their degree of similarity to the first model. The same rank ordering can also be assigned, for example, to the collection of identifiers of the models in the collection, or a collection of subsets of a database represented by the models of the collection. The features of the criterion model are compared to the features of each one of the collection of other models. As will be described in more detail below, the features can include the relations and the contextual measurements, i.e. the relational metric values of the relations in the models. The collection of other models is then ranked in order of similarity to the criterion model. As an example: the criterion model is a model of a query. The criterion model is then compared to a number of models of narratives. Then each one of the corresponding narratives is ranked according to the corresponding level of similarity of that narrative's corresponding model to the criterion model. As another alternative, the criteria model can represent any level of text and combination of text, or data from the database, or combination of segments of sets of databases.

Relations and Relational Metrics

A relation includes a pair of terms also referred to as a term pair, and a number of types of relational metrics. The term pair includes a first term and a second term. Each one of the types of relational metrics represents a type of contextual association between the two terms. A relation can be represented in the form of: term1, term2, metric1, metric2, . . . metricN. One example of a relation is: crew, fatigue, 6, 4, . . . 8.

A relation can represent different levels of context in the body of text within which the term pair occurs. At one level, the relation can describe the context of one instance or occurrence of the term pair within a database. In another level, a summation relation can represent a summation of all instances of the term pair within a database or within a set of specified subsets of the database. A model of a database is a collection of such summation relations that represent all occurrences of all term pairs that occur within the database being modeled.

For one embodiment, a term from a database is selected and the contextual relationship between the selected term and every other term in the database can be determined. For example, given a database of 100 terms, the first term is selected and then paired with each of the other 99 terms in the database. For each of the 99 term pairs the metrics are calculated. This results in 99 relations. Then the second term is selected and paired with each of the other 99 terms and so forth. The process continues until each one of the 100 terms in the database has been selected, paired with each one of the other 99 terms and the corresponding metric values calculated. As the database grows larger, the number of relations created in this embodiment also grows exponentially larger. As the number of terms separating the selected term from the paired term increases, the relationship between the terms becomes less and less significant. In one alternative, if a term is one of a group of terms to be excluded, then no relations containing the term are determined.

The contextual analysis can be conducted within a sliding window referred to as a context window. The context window selects and analyzes one context window-sized portion of the database at a time and then the context window is incremented, term-by-term, through the database to analyze all of the term pairs in the database. For example, in a 100-term database, using a 10-term context window, the context window is initially applied to the first 10 terms, terms 1–10. The relations between each one of the terms and the other 9 terms in the context window are determined. Then, the context window is shifted one term to encompass terms 2–11 of the database and the relations between each one of the terms and the other 9 terms in the context window are determined. The process continues until the entire database has been analyzed. A smaller context window captures the more local associations among terms. A larger context window captures more global associations among terms. The context window can be centered on a selected term. In one alternative, redundant relations can be eliminated by including only a single relation between a term in one position within the database and another term in another position in the database.

In one embodiment of contextual analysis, a term in the sequence of terms in a database or subset of a database is selected. Relations are determined between the selected term and each of the other terms in a left context window associated with the selected term, and relations are also determined between the selected term and each of the terms in a right context window associated with the selected term. In one alternative, the left context window can contain L terms and the right context window can contain R terms. In another alternative, each context window can contain C terms, that is, L=R=C. A left context window of size C can include the selected term, up to C−1 of the terms that precede the selected term, and no terms that follow the selected term. A right context window of size C can include the selected term, and up to C−1 of the terms that follow the selected term, and no terms that precede the selected term. A context window of size C can include fewer than C terms if the selected term is at or near the beginning or end of the sequence of terms. For example, if the selected term is the $6^{th}$ term in a sequence, then only 5 terms precede the selected term, and if the left context window is of size C=10, only 6 terms, the selected term and the 5 terms that precede the selected term, appear in the left context window. In a similar example, if the selected term is the $95^{th}$ term in a sequence of 100 terms, then only 5 terms follow the selected term, and if the right context window is of size C=10, only 6 terms, the selected term and the 5 terms that follow the selected term, appear in the right context window. After relations are determined for a selected term, a subsequent term can be selected from the terms that have not yet been selected from the sequence of terms, and relations can be determined for the new selected term as described above. The process can continue until all terms in the sequence of terms have been selected, and all relations have been determined for the selected terms. Alternatively, the process can continue until all of the terms in the sequence of terms that are also in a collection of terms of interest have been selected, and all relations have been determined for the selected terms. In one alternative, redundant relations can be eliminated by including only a single relation between a term in one position within the database and a term in another position within the database.

FIG. 1 illustrates one embodiment of a process 100 of producing a relational model of a database. A database to be modeled is provided in process block 102. A context window is selected in block 104. Alternatively, the size of the context window can be varied. The size of the context window can be manually selected. The context window can automatically adjust to an average size of a portion of the database being modeled. For example, the portion could be a sentence, a phrase, a paragraph or any other subset of the database. The size of the context window can vary as a function of the data being scanned.

A first term from the database is selected in block 106. Several relations are determined in block 108. Each relation includes a number of types of contextual metrics between the selected term and each one of the terms included in the context window. Various processes to determine various types of contextual metrics are described more fully below. Next, a subsequent term is selected in blocks 110, 112 and the relations that include the new selected term are determined.

When the relations including the last term from the database have been determined, there are no subsequent terms so the collected relations are summarized. A first relation having a selected term pair is selected in block 114. All other instances of the relations having the selected term pair are then summarized into a summation relation in block 116. The summation relation includes the term pair and a number of types relational summation metrics (RSMs). Each one of the types of RSMs includes a summation of the corresponding types of metrics of each instance of the term pair. The RSM can be a sum of the corresponding types of metrics of each instance of the term pair. Alternatively, the RSM can be a normalized sum of the corresponding types of metrics of each instance of the term pair. For another alternative, the RSM can be a scaled sum of the corresponding types of metrics of each instance of the term pair. The RSM can also be equal to the metric value of one type of contextual metric for the one instance of the term pair that has the highest magnitude of the selected type of contextual metric, of all instances of the term pair. Other methods of producing a summation metric of the corresponding types of metrics of each instance of the term pair as known to one skilled in the art are also contemplated as various additional embodiments.

The summation relation is then included in a relational model of the database in block 118. The process of summarizing relations continues in blocks 120, 122, until a last relation is summarized and then the relational model of the database is output at block 124. The relational model of the database can be output in the form of a list of relations, or a sorted list of relations or, one of the types of RSMs can be selected and the relations sorted in the order of the selected RSM. Alternatively, the summation relations can be accumulated, as each instance of a relation is determined.

Figure 2:
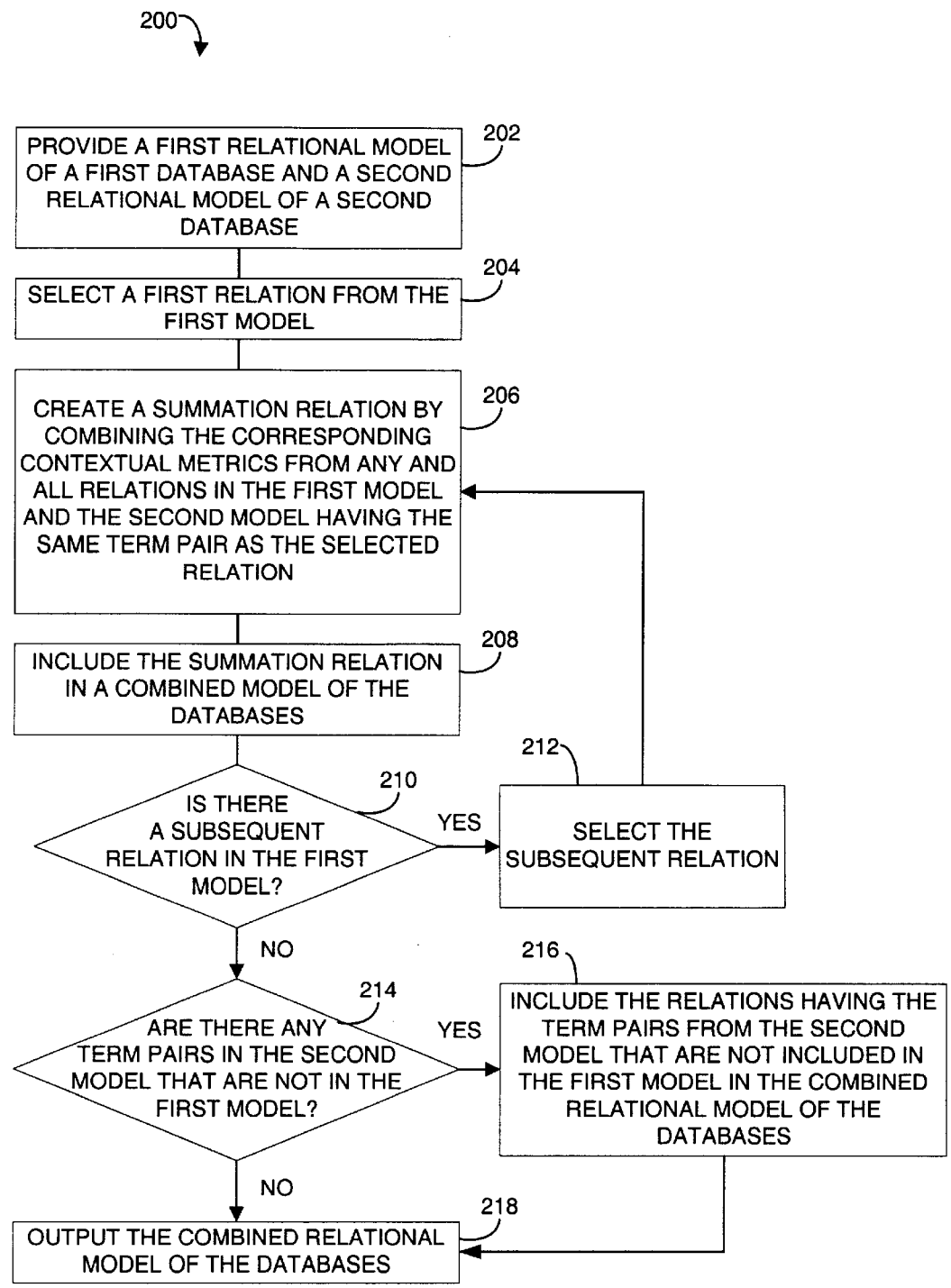
FIG. 2 illustrates one embodiment of a process 200 to combine a number of relational models of databases to produce one relational model.

FIG. 2 illustrates one embodiment of a process 200 to combine a number of relational models of databases to produce one relational model. FIG. 2 illustrates combining a first relational model of a first database and a second relational model of a second database in block 202 but additional models can be easily combined through a similar process or through iterative use of the process 200. A first summation relation from the first relational model is selected in block 204. A combined summation relation including the term pair from the selected summation relation is then determined by reviewing each of the relations in the second relational model that include the term pair from the selected relation in block 206. The combined summation relation is determined as described above in FIG. 1. The combined summation relation is then included in the combined relational model. The process continues through each one of the summation relations in the first model in blocks 210, 212. Then, each one of the summation relations in the second relational model that contain term pairs that are not included the first relational model are then included in the combined relational model in blocks 214, 216. The combined relational model is then output at block 218.

Various types of relational metrics are contemplated. Some examples of the types of relational metrics are described in more detail below. The examples described are merely illustrative of the types of relational metrics contemplated and should not be read as exhaustive or limited to the examples described. One of the types of relational metrics is a standard relational metric, also referred to as a non-directional contextual metric (NDCM). Another type of relational metric is a left contextual metric (LCM). Another type of relational metric is a right contextual metric (RCM). Yet another type of relational metric is a directional contextual metric (DCM). Still another type of relational metric is a scaled frequency metric (SFM). Each of the above-described metrics is more fully described below. Additional types of relational metrics are also contemplated and one skilled in the art could conceive of several additional contextual metrics that could be also used as described below.

A relation with a term pair and multiple types of contextual metrics can be presented in any form. One form of expressing such a relation is the term pair followed by a list of the contextual metric values. Examples include: term1, term2, NDCM, or term1, term2, NDCM, LCM, RCM, or term1, term2, NDCM, DCM, SFM, or term1, term2, NDCM, LCM, RCM . . . "Nth" contextual metric.

Calculating Metric Values

Figure 3:
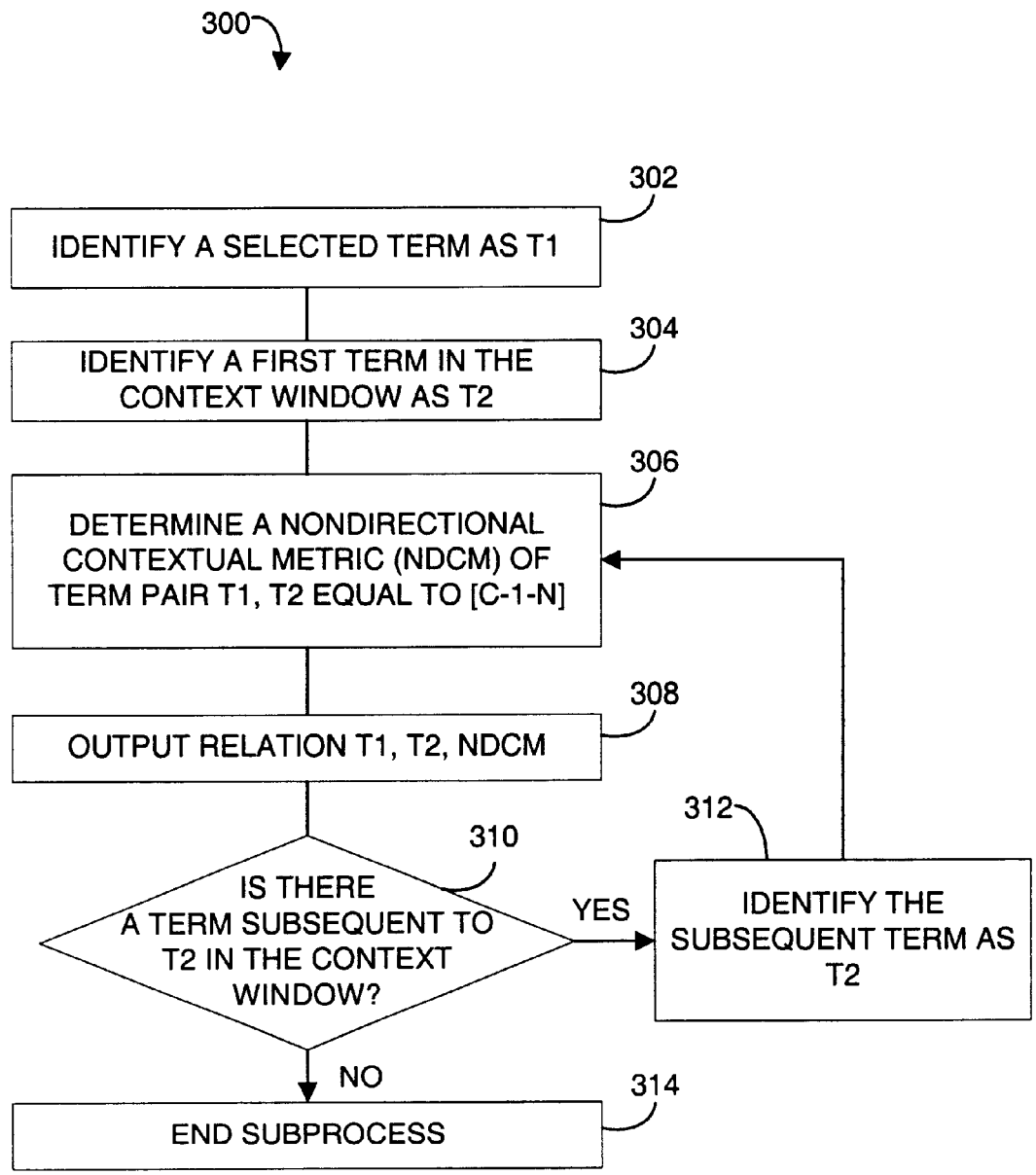
FIG. 3 illustrates one embodiment of a process 300 to determine a non-directional contextual metric (NDCM) for each one of the term pairs within a context window.

FIG. 3 illustrates one embodiment of a process 300 to determine a non-directional contextual metric (NDCM) for each one of the term pairs within a context window. First, a starting term T1 is selected and identified in block 302. A first term in the context window is identified as T2 in block 304. An NDCM is then determined in block 306. The NDCM=C−1−N, where C is equal to a number of terms in the context window, and N is equal to a number of terms occurring between a first term and a second term of the term pair. The relation containing the term pair T1, T2 and the NDCM is then output in block 308. The process 300 continues to determine NDCMs for each of the remaining term pairs whose first terms occur within the context window and that start with T1, in blocks 310, 312. For example, the non-directional contextual metric of a term pair (A, B) is measured with respect to the number N of terms that occur between the terms A and B. If terms A and B are immediately adjacent, no terms are between A and B and therefore N=0 and the NDCM is equal to C−1−0.

Figure 4:
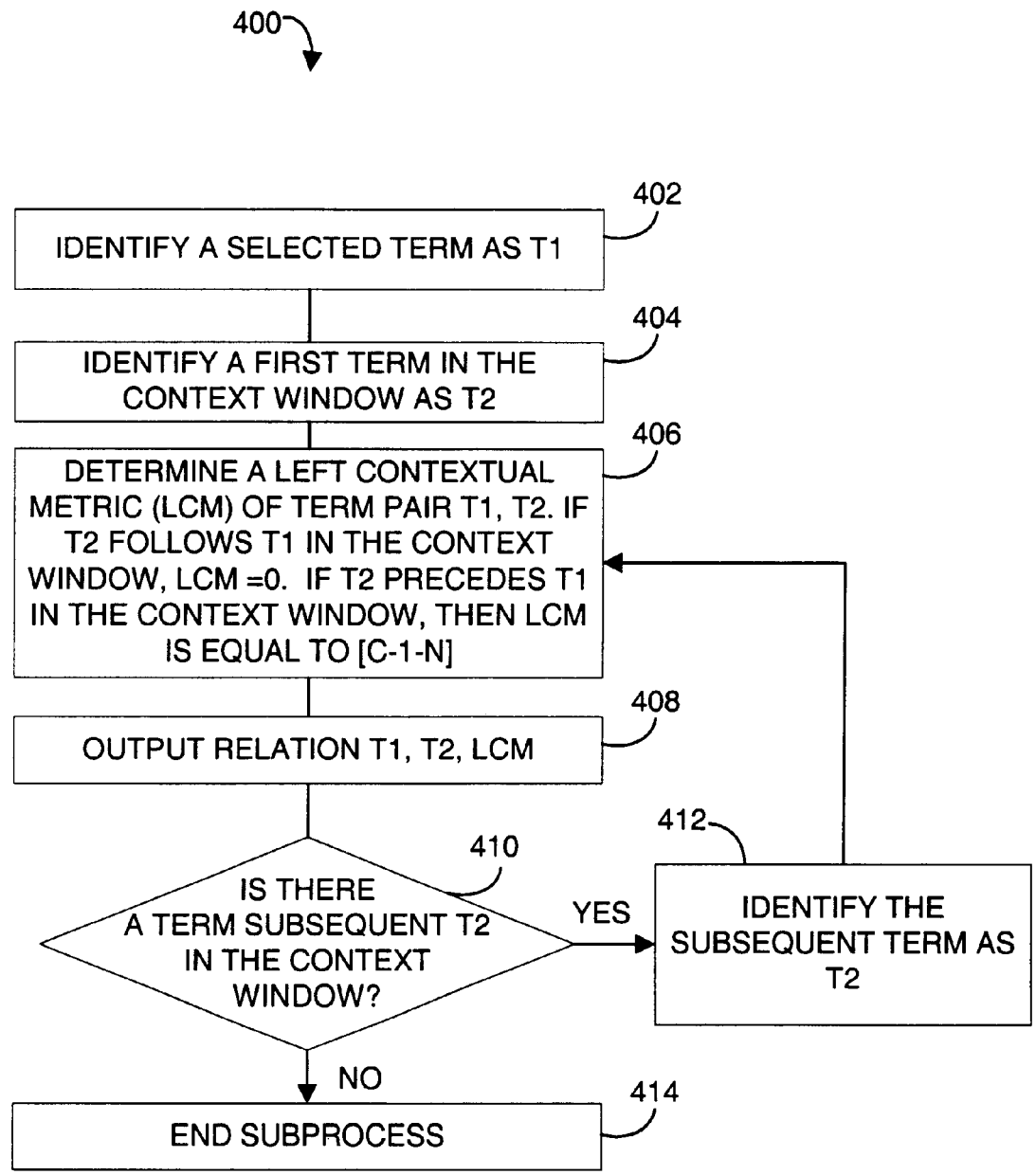
FIG. 4 illustrates one embodiment of a process 400 to determine a left contextual metric (LCM) for each one of the term pairs within a context window.

FIG. 4 illustrates one embodiment of a process 400 to determine a left contextual metric (LCM) for each one of the term pairs within a context window. First a starting term T1 is selected and identified in block 402. A first term in the context window is identified as T2 in block 404. A LCM is then determined in block 406. The LCM value associated with a particular occurrence of a term pair (T1, T2) in a subset is LCM(T1, T2). If T2 follows T1 in a subset, then LCM(T1, T2) is equal to 0. If T2 precedes T1 in the subset, then LCM(T1, T2) is equal to C−1−N, where C is equal to a number of terms in the context window, and N is equal to a number of terms occurring between T1 and T2. The relation containing the term pair T1, T2 and the LCM is then output in block 408. The process 400 continues to determine LCMs for each of the remaining term pairs in the context window that start with T1 in blocks 410, 412. If, for example, the terms T1 and T2 occur in the order of T2 followed by T1 and T2 occurs 3 terms to the left of T1, and a context window is 8, then the LCM(T1, T2) would be C−1−N=8−1−2=5. For another example, if terms T1 and T2 occur in the order of T1 and then T2 and a context window is 8, then T2 occurs to the right of T1, then the LCM(T1, T2) is equal to zero since LCM(T1, T2) is zero for all occurrences of T2 that follow this occurrence of T1 within the context window.

Figure 5:
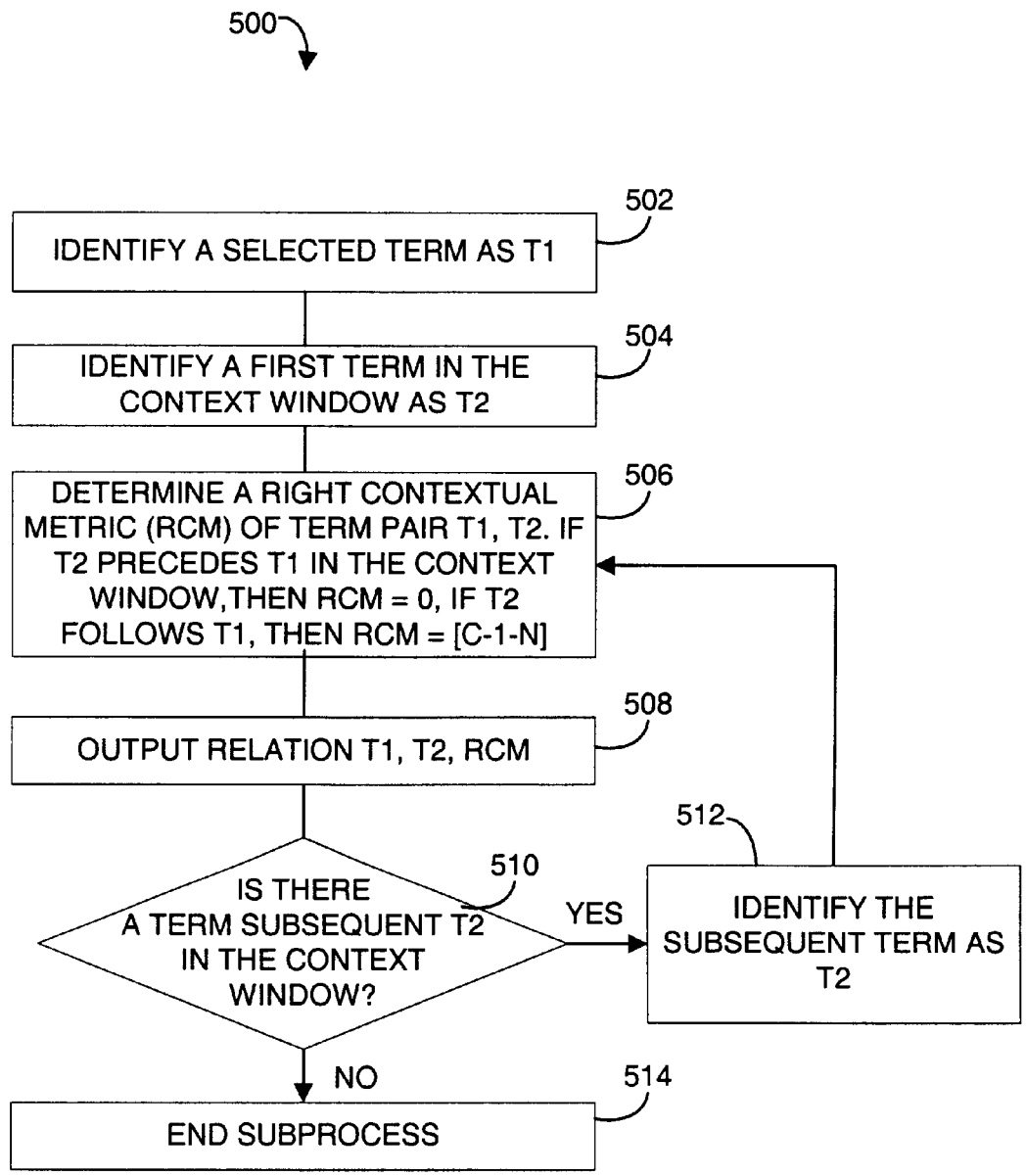
FIG. 5 illustrates one embodiment of a process 500 to determine a right contextual metric (RCM) for each one of the term pairs within a context window.

FIG. 5 illustrates one embodiment of a process 500 to determine a right contextual metric (RCM) for each one of the term pairs within a context window. First a starting term T1 is selected and identified in block 502. A first term in the context window is identified as T2 in block 504. An RCM is then determined in block 506. The RCM value associated with a particular occurrence of a term pair (T1, T2) in a subset is RCM(T1, T2). If T2 precedes T1 in the subset, then RCM(T1, T2)=0. If T2 follows T1 in the subset, then RCM(T1, T2) is equal to C−1−N, where C is equal to a number of terms in the context window, and N is equal to a number of terms occurring between T1 and T2. The relation containing the term pair T1, T2 and the RCM is then output in block 508. The process 500 continues to determine RCMs for each of the remaining term pairs in the context window that start with T1 in blocks 510, 512. If, for example the terms T1 and T2 occur in the order of T1 and then T2, and T2 occurs 3 terms to the right of T1, and a context window is 8, then the RCM(T1, T2) would be C−1−N=8−1−2=5. For another example, if the terms T1 and T2 occur in the order of T2 and then T1 and a context window is 8, then the RCM(T1, T2) is equal to 0, because the RCM(T1, T2) is zero for all occurrences of T2 that precede this occurrence of T1 in the context window.

Figure 6:
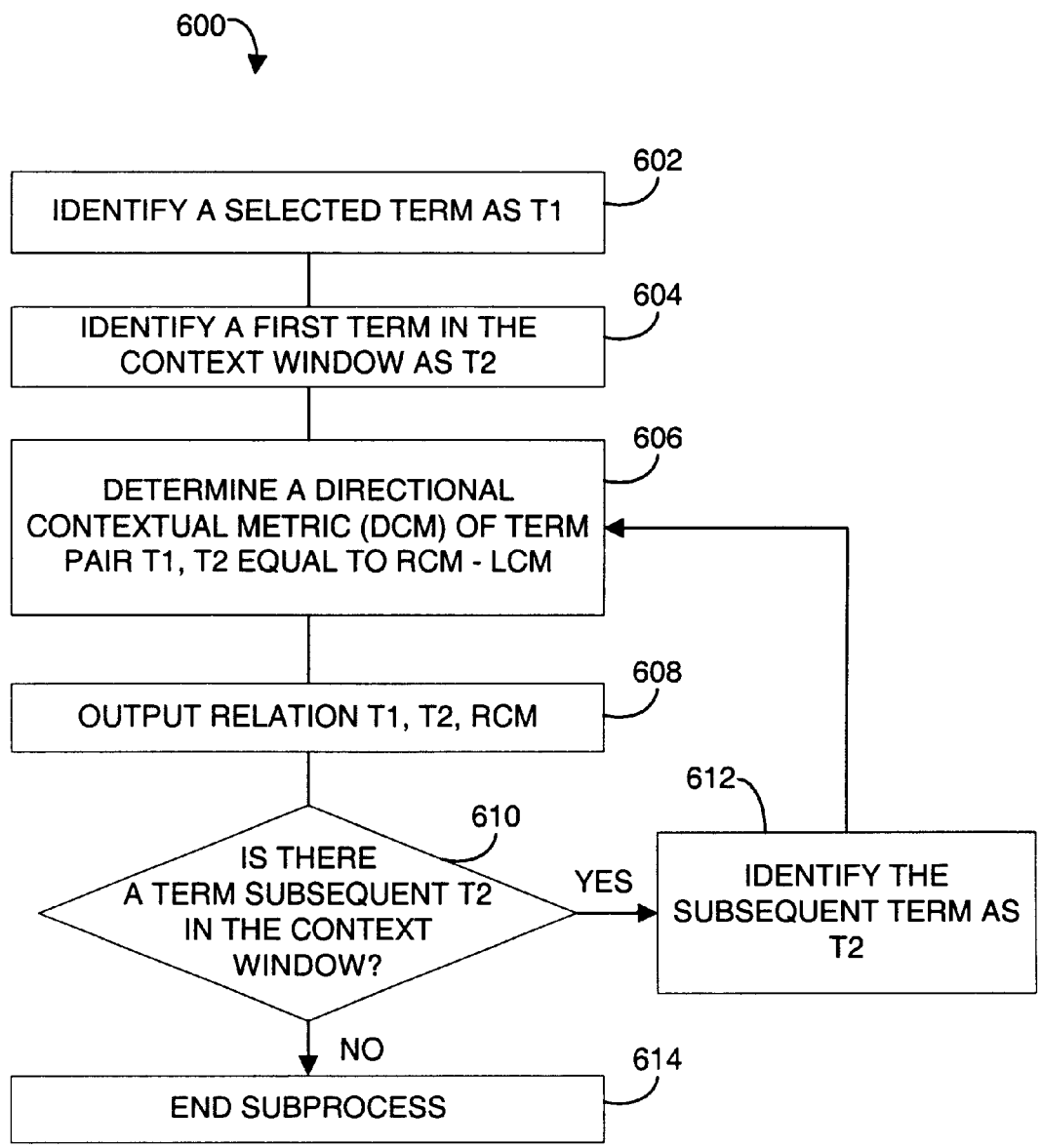
FIG. 6 illustrates one embodiment of a process 600 to determine a directional contextual metric (DCM) for each one of the term pairs within a context window.

FIG. 6 illustrates one embodiment of a process 600 to determine a directional contextual metric (DCM) for each one of the term pairs within a context window. First a starting term T1 is selected and identified in block 602. A first term in the context window is identified as T2 in block 604. A DCM is then determined in block 606. The DCM(T1, T2) is equal to RCM(T1, T2)−LCM(T1, T2) and is applied to relations whose terms are ordered to ensure that RCM is greater than or equal to LCM. Alternatively, DCMs of less than zero can be accommodated. The relation containing the term pair T1, T2 and the DCM is then output in block 608. The process 600 continues to determine DCMs for each of the remaining term pairs in the context window that start with T1 in blocks 610, 612.

The scaled frequency metric (SFM) is equal to $(C-1-N) * \{(2F_M - F_1 - F_2)/2F_M\}$. C is equal to the number of terms in the context window. N is equal to the number of terms occurring between a first term and a second term of the term pair. $F_M$ is equal to a frequency of occurrences of a most frequent term in the database. $F_1$ is equal to a frequency of occurrences of a first term of the term pair in the database. $F_2$ is equal to a frequency of occurrences of a second term of the term pair in the database.

In the following example sentence, which contains one instance of the term ENGLISH followed by one instance of the term PHRASEOLOGY, the term PHRASEOLOGY is in the right context of the term ENGLISH, and the term ENGLISH is in the left context of the term PHRASEOLOGY.

BETTER ENGLISH SPEAKING FOREIGN CTLRS AND USE OF STD PHRASEOLOGY IS NEEDED.

Using a context window (C) equal to 10 terms, treating the sentence as the entire database, and observing that there are N=7 terms between ENGLISH and PHRASEOLOGY, the corresponding metrics have the following values:

The NDCM(ENGLISH, PHRASEOLOGY), or the measure of the extent that ENGLISH and PHRASEOLOGY are in the same context, is equal to:

$$C-1-N=10-1-7=2 \qquad \text{Equation 1}$$

The NDCM(ENGLISH, PHRASEOLOGY) is the same as NDCM(PHRASEOLOGY,ENGLISH) since direction does not matter for calculating the NDCM.

The RCM(ENGLISH, PHRASEOLOGY), or the measure of the contextual association of ENGLISH followed by PHRASEOLOGY, is equal to:

$$C-1-N=10-1-7=2 \qquad \text{Equation 1.1}$$

The LCM(ENGLISH, PHRASEOLOGY), or the measure of the contextual association of ENGLISH preceded by PHRASEOLOGY, is equal to 0 since there are no incidences of PHRASEOLOGY which precede an incidence of ENGLISH.

The RCM(PHRASEOLOGY, ENGLISH) or the measure of the contextual association of PHRASEOLOGY followed by ENGLISH, is equal to 0 since there are no incidences of ENGLISH which follow an incidence of PHRASEOLOGY.

The LCM(PHRASEOLOGY, ENGLISH), the measure of the contextual association of PHRASEOLOGY preceded by ENGLISH, is equal to:

$$C-1-N=10-1-7=2 \qquad \text{Equation 1.2}$$

The above example describes how to determine the types of contextual metrics for one instance of one term pair in a database of terms. Typically, a single term pair occurs multiple times throughout a database. One embodiment of a summation relation includes a summation of the corresponding types of contextual metrics for each one of several occurrences of a term pair throughout the database.

The following is an example of combining multiple relations for the same term pair across all of the shared contexts in a database to determine a single summation relation that represents that term pair in that database. Table 1.1 illustrates three schematic lines of text representing excerpts from a database being modeled, where the items "t" are terms that are not terms of interest and do not include term A or term B, and the contextual relationship between terms A and B is the relation of interest. No other instances of terms A and B occur within the database.

TABLE 1.1

| 1. | ... | t | t | t | A | B | t | t | t | ... |
| 2. | ... | t | t | A | t | B | A | t | t | ... |
| 3. | ... | t | t | t | B | B | A | t | t | ... |

Table 1.2 illustrates the relations of each instance of the paired terms A and B, using a context window of C=3 terms. The line numbering indicates the line number containing the relation. For example, "2.1" is the first relation from line 2 above, and "2.2" is the second relation from that line. Each relation can take either of the two forms, as shown. The forms are equivalent.

TABLE 1.2

| | term_1 | term_2 | NDCM | LCM | RCM | | term_1 | Term_2 | NDCM | LCM | RCM |
|---|---|---|---|---|---|---|---|---|---|---|---|
| 1.0. | A | B | 2 | 0 | 2 | same as | B | A | 2 | 2 | 0 |
| 2.1. | A | B | 1 | 0 | 1 | same as | B | A | 1 | 1 | 0 |
| 2.2. | A | B | 2 | 2 | 0 | same as | B | A | 2 | 0 | 2 |
| 3.1. | A | B | 1 | 1 | 0 | same as | B | A | 1 | 0 | 1 |
| 3.2. | A | B | 2 | 2 | 0 | same as | B | A | 2 | 0 | 2 |
| RSM | | | 8 | 5 | 3 | | | | 8 | 3 | 5 |

If lines 1–3 were the only lines in the database containing terms A and B, the above relations would be summed to produce a summation relation (RS) having relational summation metrics (RSMs) representing the overall contextual association of terms A and B in the database. The summation relation can be expressed in either one of two equivalent forms shown in Table 1.3:

TABLE 1.3

| | term_1 | term_2 | NDCM | LCM | RCM | | term_1 | term_2 | NDCM | LCM | RCM |
|---|---|---|---|---|---|---|---|---|---|---|---|
| RS | A | B | 8 | 5 | 3 | same as | B | A | 8 | 3 | 5 |

Often the term pairs occur in varying orders. The first term in a term pair A, B is A in one occurrence, and B in another occurrence. Several of the relational metrics such as RCM and LCM, have a direction component, i.e. that the direction or order of the term pair is significant to the metric value as described above. Therefore, to create an accurate summation relation of A, B of all occurrences of the term pair A, B in the database, a direction or order of each occurrence of the term pair A, B must be adjusted to the same direction.

The order of term pairs in the relations of models is most preferably shown in the same order as the typical reading order in the database. That is:

If RCM(A, B)>LCM(A, B), then the summation relation is preferably expressed as: A, B, NDCM(A, B), LCM(A, B), RCM(A, B).

Conversely:

If RCM(B, A)>LCM(B, A) then the summation relation is preferably expressed as B, A, NDCM(B,A), LCM(B,A), RCM(B,A).

In this instance (Table 1.3) the RCM(B, A) is greater than the LCM(B, A) and therefore B followed by A is in the typical reading order (i.e. left to right). Therefore, Table 1.4 shows the form of the expressing relationship between terms A and B that would be used in the model representing the summation relation (RS) of the term pair (A, B) within the database:

TABLE 1.4

| term_1 | term_2 | NDCM | LCM | RCM |
|---|---|---|---|---|
| B | A | 8 | 3 | 5 |

The above summation relation could also be interpreted as saying that when terms A and B are contextually associated, term A tends to follow term B and to a lesser extent A precedes B, with the degree of contextual association indicated by the metrics. This relationship can be observed in text lines 1–3 of Table 1.2. A model of a database consists of a collection of such relations for all term pairs of interest which exist within the database.

For one embodiment of a relation expressed in terms of A followed by B, the relation is preferably written in the form: A, B, NDCM(A,B), LCM(A,B), RCM(A,B). If for some reason the above relation must be expressed in terms of B followed by A, then the relation can be rewritten in the form of: B, A, NDCM(B,A), LCM(B,A), RCM(B,A), where NDCM(B, A)=NDCM(A, B), LCM(B, A)=RCM (A, B), and RCM(B, A)=LCM(A, B). Of course, if additional types of metrics were included in the relation and those additional types of metrics included a directional component, then those additional types of metrics would also have to be recalculated when the written expression of the relation is reversed.

The context window used to calculate the above-described metric values can have any one of a number of sizes. A context window can have a pre-selected number of terms. Typically, a context window is equal to a level of context desired by the user. Examples include: an average sentence length, or an average paragraph length, or an average phrase length, or a similar relationship to the text or the database. For an alternative embodiment, the context window can be entirely independent from the any relation to the database being analyzed such as a pre-selected number chosen by a user or a default process setting. Alternatively, the context window can vary as a function of the position of the context window within the text, or the contents of the context window.

Figure 6A:
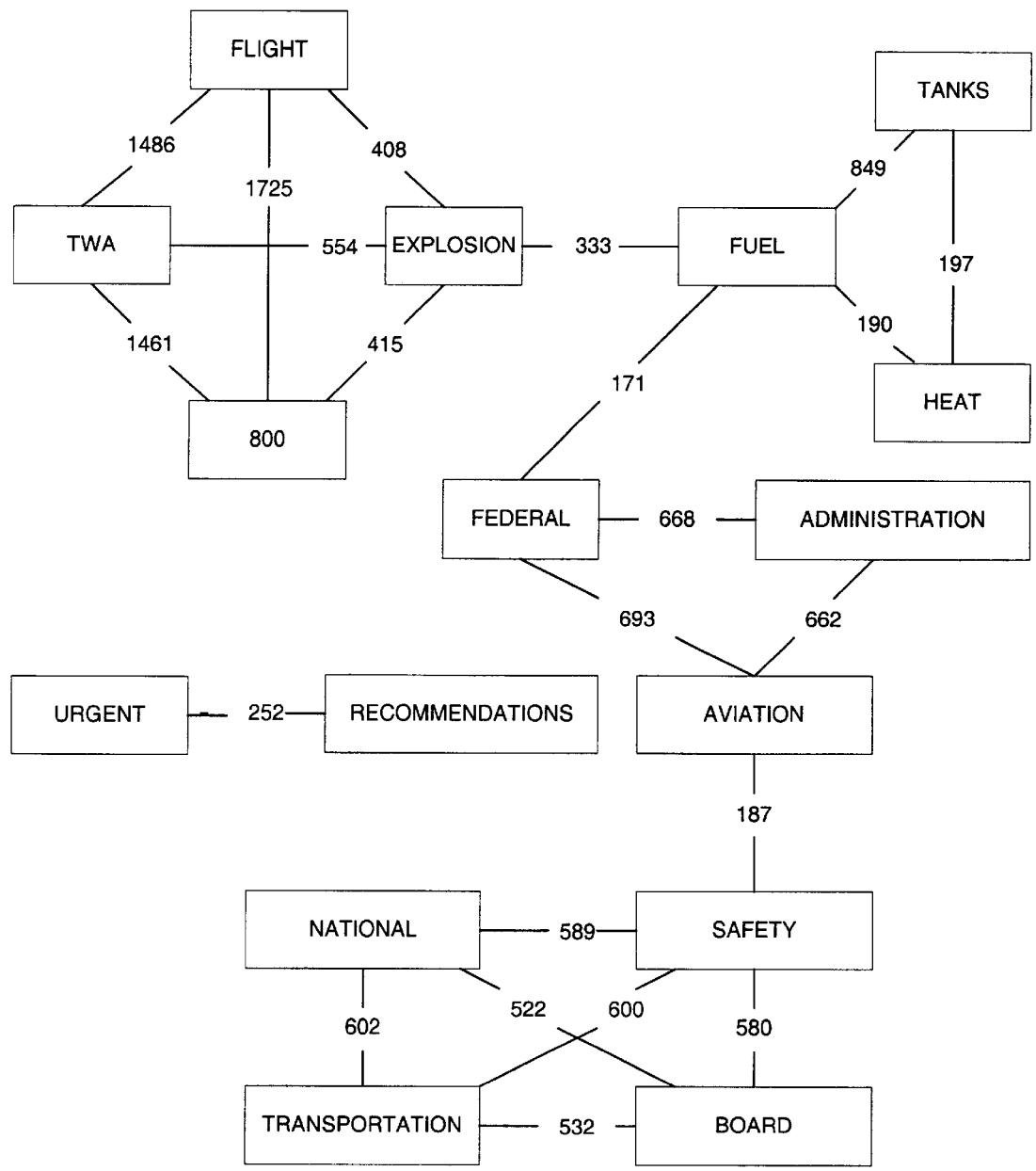
FIG. 6A shows one embodiment of a relational model represented in a network model diagram.

A model of a database or subset includes summation relations and each summation relation includes several types of the relational summation metrics (RSMs) for each term pair. A model of a database or subset can be represented in a variety of forms including, but not limited to, a list of relations, a matrix of relations, and a network of relations. An example of a list representation of relations is shown in Table 1.5. An example of a matrix representation of the relations of Table 1.5 is shown in Table 1.6. An example of a network representation of the relations in Tables 1.5 and 1.6 is shown in FIG. 6A.

TABLE 1.5

| term_1 | term_2 | NDCM |
|---|---|---|
| Flight | 800 | 1725 |
| TWA | Flight | 1486 |
| TWA | 800 | 1461 |
| fuel | tanks | 849 |
| Aviation | Federal | 693 |
| Federal | Administration | 668 |
| Aviation | Administration | 662 |
| National | Transportation | 602 |
| Safety | Transportation | 600 |
| National | Safety | 589 |
| Safety | Board | 580 |
| TWA | Explosion | 554 |
| Transportation | Board | 532 |
| National | Board | 522 |
| 800 | Explosion | 415 |
| Flight | Explosion | 408 |
| Fuel | Explosion | 333 |
| Recommendations | Urgent | 252 |
| Tanks | Heat | 197 |
| Fuel | Heat | 190 |
| Aviation | Safety | 187 |
| Fuel | Federal | 171 |

TABLE 1.6

| | TWA | FLIGHT | 800 | FUEL | TANKS | HEAT | FEDERAL | AVIATION | ADMINISTRATION | NATIONAL | TRANSPORTATION | SAFETY | BOARD | EXPLOSION | URGENT | RECOMMENDATIONS |
|---|---|---|---|---|---|---|---|---|---|---|---|---|---|---|---|---|
| TWA | | 1486 | 1461 | | | | | | | | | | | 554 | | |
| Flight | | | 1725 | | | | | | | | | | | 408 | | |
| 800 | | | | | | | | | | | | | | 415 | | |
| Fuel | | | | | 849 | 190 | 171 | | | | | | | 333 | | |
| Tanks | | | | | | 197 | | | | | | | | | | |
| Heat | | | | | | | | | | | | | | | | |
| Federal | | | | | | | | | 668 | | | | | | | |
| Aviation | | | | | | | | 693 | 662 | | | 187 | | | | |
| Administration | | | | | | | | | | | | | | | | |
| National | | | | | | | | | | | 602 | 589 | 522 | | | |
| Transportation | | | | | | | | | | | | | 532 | | | |
| Safety | | | | | | | | | | | 600 | | 580 | | | |
| Board | | | | | | | | | | | | | | | | |
| Explosion | | | | | | | | | | | | | | | | |
| Urgent | | | | | | | | | | | | | | | | |
| Recommendations | | | | | | | | | | | | | | | | 252 |

At the extreme, the contextual relations of all term pairs in a database could be determined, but this is not necessary because a database or subset can be effectively modeled by retaining only those relations having stronger contextual relations as indicated by larger values of the relational metrics. Thus, the potentially large number of relations can be reduced to a smaller and more manageable number of relations. Appropriate methods of reducing the number of relations in a model are preferably those that result in the more representative relations being retained and the less representative relations being eliminated.

A threshold value can be used to reduce the number of relations in a relational model eliminating those relations having a metric value below a certain threshold value. Alternatively, a specific type of metric or summation metric value can be selected as the metric to compare to the threshold value. Another method to reduce the number of relations in a relational model is by selecting a pre-selected number of the relations having the highest metric values. First, one of the types of metric values or summation metric values is selected. Then the pre-selected number of relations having a greatest value of the selected type of metric value is selected from the relations in the relational model.

Keyterm Search

Keyterm search is a method of retrieving from a database a number of subsets of the database that are most relevant to a criterion model derived from one or more keyterms. The retrieved subsets can also be ranked according to their corresponding relevance to the criterion model. One embodiment of a keyterm search is a method of searching a database. First, several relational models are provided. Each one of the relational models includes one relational model of at least one subset of the database. Next, a query is input. A criterion model is then created. The criterion model is a relational model that is based on the query. The criterion model is then compared to each one of the relational models of subsets. The identifiers of the subsets relevant to the query are then output.

Figure 7:
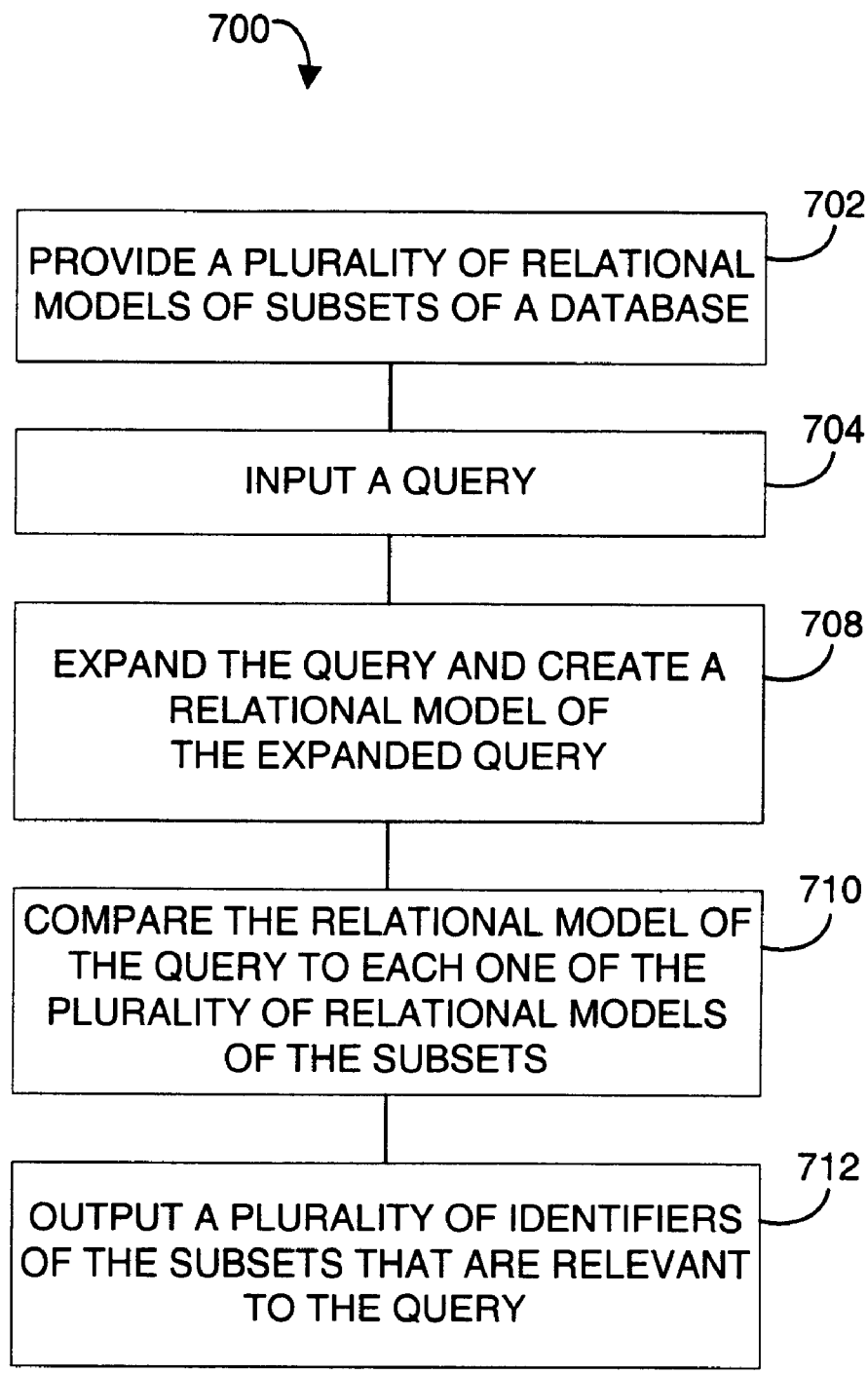
FIG. 7 illustrates one embodiment of an overview of a keyterm search process.

FIGS. 7–10 show various embodiments of applying keyterm searching to several relational models of a database. FIG. 7 illustrates one embodiment of an overview of a keyterm search process 700. First, a number of relational models of subsets of a database are provided in block 702. The subsets can be any level of subset of the database from at least two terms to the entire database. Each one of the relational models includes one relational model of at least one subset of the database. A query is input in block 704 for comparing to the relational models of subsets of the database. The query can include one term or multiple terms. Next, the query is expanded and modeled to create a criterion model in block 708, as will be more fully described below. The criterion model is then compared to each one of the relational models of subsets of the database in block 710 that is also described in more detail below. The identifiers of the relevant subsets are then output in block 712.

As an alternative form of input to the keyterm search process, the input query can consist of a query model. A query model can provide detailed control of the relevance criteria embodied in an input query. As a further alternative, the input query can consist of a selected portion of a previously output query model. One alternative method of selecting a portion of an output query model includes selecting a number of relations whose term pairs contain any of a selected group of terms. Another alternative method of selecting a portion of an output query model includes selecting a number of relations having selected metrics greater than a selected threshold value. As another alternative, the input query model can be a model of a subset of a database. As another alternative, the input query model can be a model of a subset of a database having relational metrics that have been multiplied by one or more of a collection of scale factors. As a further alternative, the input query model can be created by manually creating term pairs and corresponding metric values. When a query model is used as an input query, the process of expanding the query and creating a relational model of the query shown in block 708 includes passing the input query model to the comparing process shown in block 710.

Many alternative forms of outputs of the keyterm search process are useful. Outputting the identifiers of the relevant subsets 712 can also include outputting the types of relevance metrics corresponding to each one of the subsets. It is also useful to select one of the types of relevance metrics, to sort the identifiers of subsets in order of magnitude of the selected type of relevance metric, and then to output the identifiers of subsets in order of magnitude of the selected type of relevance metric. For another alternative, the selected type of relevance metric can include a combination of types of relevance metrics. The selected type of relevance metric can also include a weighted sum of types of relevance metrics or a weighted product of the types of relevance metrics.

Outputting the identifiers of the relevant subsets in block 712 can also include normalizing each one of the corresponding intersection metrics of all intersection relations. Outputting the identifiers of the relevant subsets in block 712 can also include outputting the relational model of the query, i.e. the criterion model. Outputting the criterion model is useful to assist a user in directing and focusing additional keyterm searches. Outputting the identifiers of the relevant subsets can also include displaying a pre-selected number of subsets in order of magnitude of a selected type of relevance metric.

Another useful alternative output is displaying or highlighting the term pairs or term pair relations that indicate the relevance of a particular subset. For example, one or a selected number of the shared term pairs in each one of the subsets are highlighted, if the terms within each one of the shared term pairs occur within the context window. To reduce the number of displayed shared term pairs, only those shared term pairs that have the greatest magnitude of a selected type of relevance metric are displayed or highlighted. Still another useful output is displaying the shared term pairs that occur in the corresponding subsets. For example, outputting the identifiers of the relevant subsets in block 712 can also include displaying one or a selected number of shared term pairs that occur in each one of the subsets, wherein the terms within each one of the shared term pairs occur within a context window.

Displaying metric values associated with the displayed shared term pairs is also useful. For example, the output display can also include, for each one of the shared term pairs, displaying an $NDCM_{Q1}$, and $NDCM_{S1}$ and a product equal to $[\ln NDCM_{Q1}]*[\ln NDCM_{S1}]$. The $NDCM_{Q1}$ is equal to a non-directional contextual metric of the shared term pair in the query, and the $NDCM_{S1}$ is equal to a non-directional contextual metric of the shared term pair in the subset. The $NDCM_{Q1}$ and the $NDCM_{S1}$ must each be greater than 1.

As described above, the input query can include a single term or multiple terms. The query can also be transformed when first input. Transforming the query is useful for standardizing the language of a query to the terms used in the database, to which the query derived criterion model will be compared. For example, if an input query was "aircraft, pilot" and the database used only the corresponding abbreviations "ACFT, PLT", then applying a criterion model based on the input query "aircraft, pilot" would not be very useful. Therefore a transformed query, which transformed "aircraft, pilot" to "ACFT, PLT", would yield useful results in a keyterm search.

Transforming the query includes replacing a portion of the first query with an alternate portion. One embodiment of replacing a portion of the query with an alternate portion is a method of finding an alternate portion that is cross-referenced in a look-up table such as a hash table. A hash table includes a number of hash chains and each one of the hash chains corresponds to a first section of the portion of the query and includes several terms or phrases beginning with that first section of the query. The hash chain includes several alternative portions. Each of the alternative portions corresponds to one of the first portions of the query. The subsets of the database can also be transformed, as described above, with respect to the query.

Often a query is very short and concise, such as a single term. Another useful alternative is to expand the query to include terms related to the input query term or terms. Many approaches have attempted to expand the query through various methods that typically result in query drift, i.e. where the query begins to include very broad concepts and several unrelated meanings. A query expanded in such a manner is not very useful as the resulting searches produce subsets that are not directly related to the input query. The method of expanding the query described below, substantially maintains the focus and directness of the query while still expanding the query to obtain results including very closely related concepts.

Figure 8:
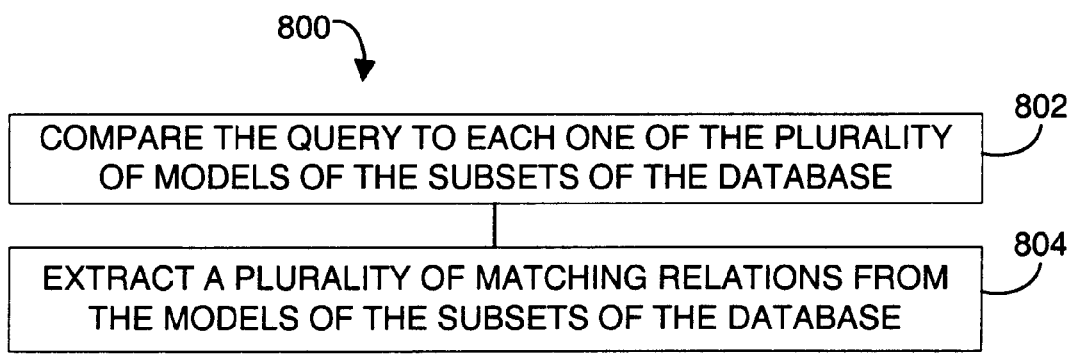
FIG. 8 illustrates one embodiment of expanding the query.

Expanding the query is also referred to as creating a gleaning model of the query. FIG. 8 illustrates one embodiment of expanding the query 800 and includes a process of first comparing the query to each one of the models of the subsets of the database in block 802. The matching relations are extracted from the models of the subsets of the database. Each one of the matching relations has a term pair, including a term that matches at least one term in the query, and a related term, in block 804. The matching relation also includes a number of relational summation metrics.

In one embodiment, a matching term is identical to a query term. For example, the term "fatigue" matches the query term "fatigue". Alternatively, a term that contains a query term can also match that query term. For example, the terms "fatigued" and "fatigues" are matching terms to the query term "fatigue". In another alternative, a term that is either identical to a query term, or a term that contains a query term, matches that query term. For example, three terms that match the query term "fatigue" are "fatigue", "fatigues", and "fatigued". As a further example, four terms that match the query term "fatigu" are "fatigue", "fatigues", "fatigued", and "fatiguing". The matching relations found when expanding the query can also be reduced to only the unique relations, by eliminating any repeating relations from the matching relations.

Figure 9:
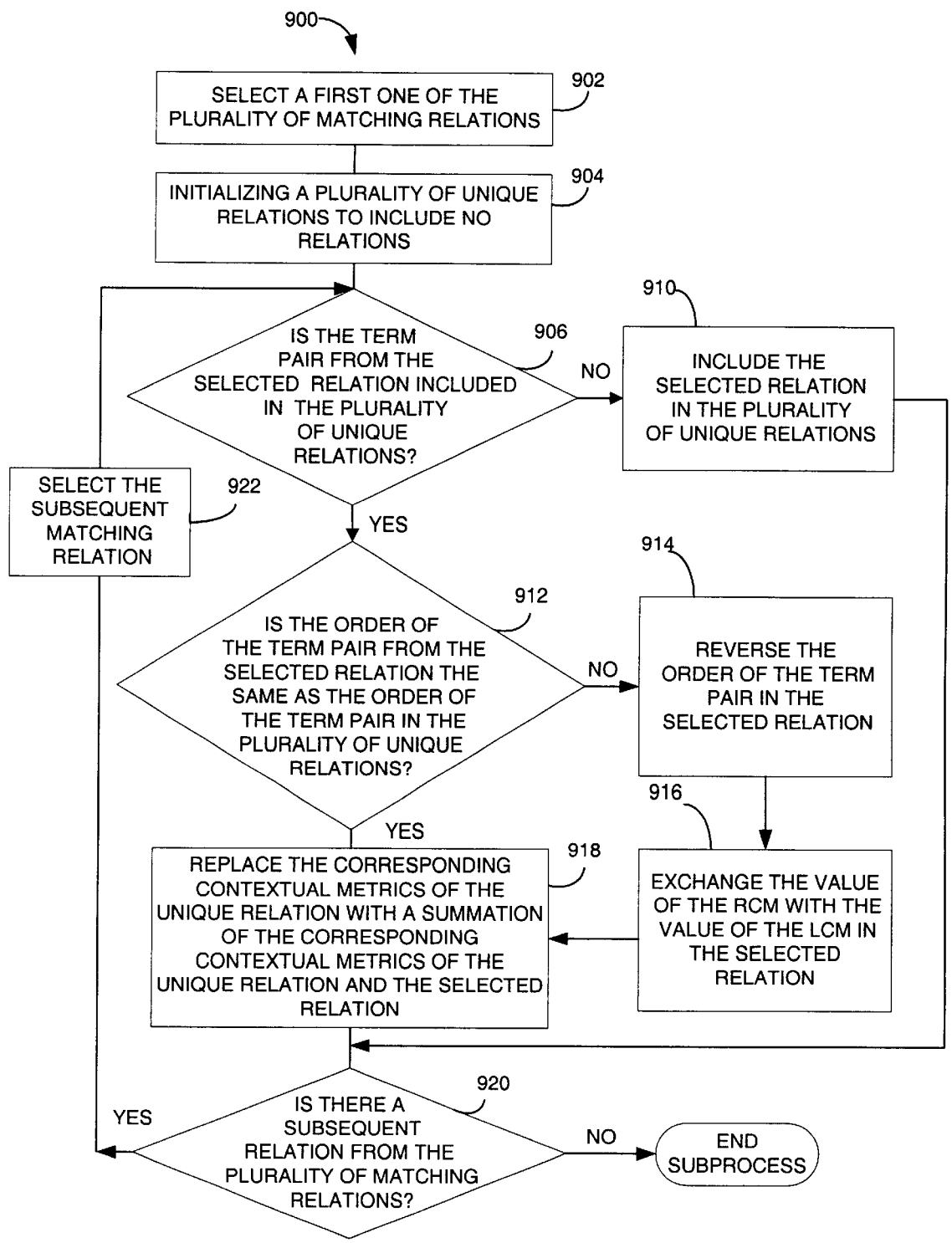
FIG. 9 illustrates one process of reducing the number of matching relations to a number of unique relations.

FIG. 9 illustrates one process 900 of reducing the number of matching relations to a number of unique relations. The process 900 includes first, selecting one of the matching relations in block 902. The next step is determining if a term pair from the selected matching relation is included in one of the unique relations in block 906. If the selected term pair is not included in one of the unique relations, then the selected matching relation is included in the unique relations in block 910. If the selected term pair is included in one of the unique relations in block 906, then the order of the term pair in the matching relation must be compared to the order of the term pair in the unique relation in block 912. If the order is not the same in both the selected matching relation and the unique relation, then the order of the term pair in the selected matching relation is reversed in block 914 and the corresponding metrics containing directional elements are recalculated in block 916, as described above. For example, the values of the LCM and the RCM of the selected matching relation must be exchanged when the stated order of the term pair is reversed. Once the order of the term pair in the selected matching relation and the order of the term pair in the unique relation are the same, then the types of relational summation metrics (RSMs) for the unique relation are replaced with a summation of the corresponding types of RSMs of the selected matching relation and the previous corresponding types of RSMs of the unique relation in block 918. In short, the RSMs are accumulated in the unique relation having the same term pair. The process 900 then repeats for any subsequent matching relations in blocks 920, 922.

Another approach to reducing the number of matching relations can also include eliminating each one of the matching relations having a corresponding type of RSM less than a threshold value. Still another approach to reducing the number of matching relations can also include extracting matching relations from a pre-selected quantity of relational models. Each one of the matching relations that has a corresponding type of RSM less than a threshold value is then eliminated. Further, selecting a pre-selected number of matching relations that have the greatest value of the corresponding type of RSM can also reduce the number of matching relations.

Another aspect of expanding the query can also include determining a typical direction for each one of the matching relations. The typical direction is the most common direction or order of the term pair in the text represented by the relation. If the RCM is greater than the LCM, then the typical direction is the first term followed by the second term. If the LCM is greater than the RCM, then the typical direction is the second term followed by the first term. In one alternative of determining a typical direction, if the LCM is larger than the RCM, then the order of the term pair in the matching relation is reversed, and the value of the RCM is exchanged with the value of the LCM.

Expanding the query can also include sorting the unique relations in order of prominence. Prominence is equal to a magnitude of a selected metric.

Figure 10:
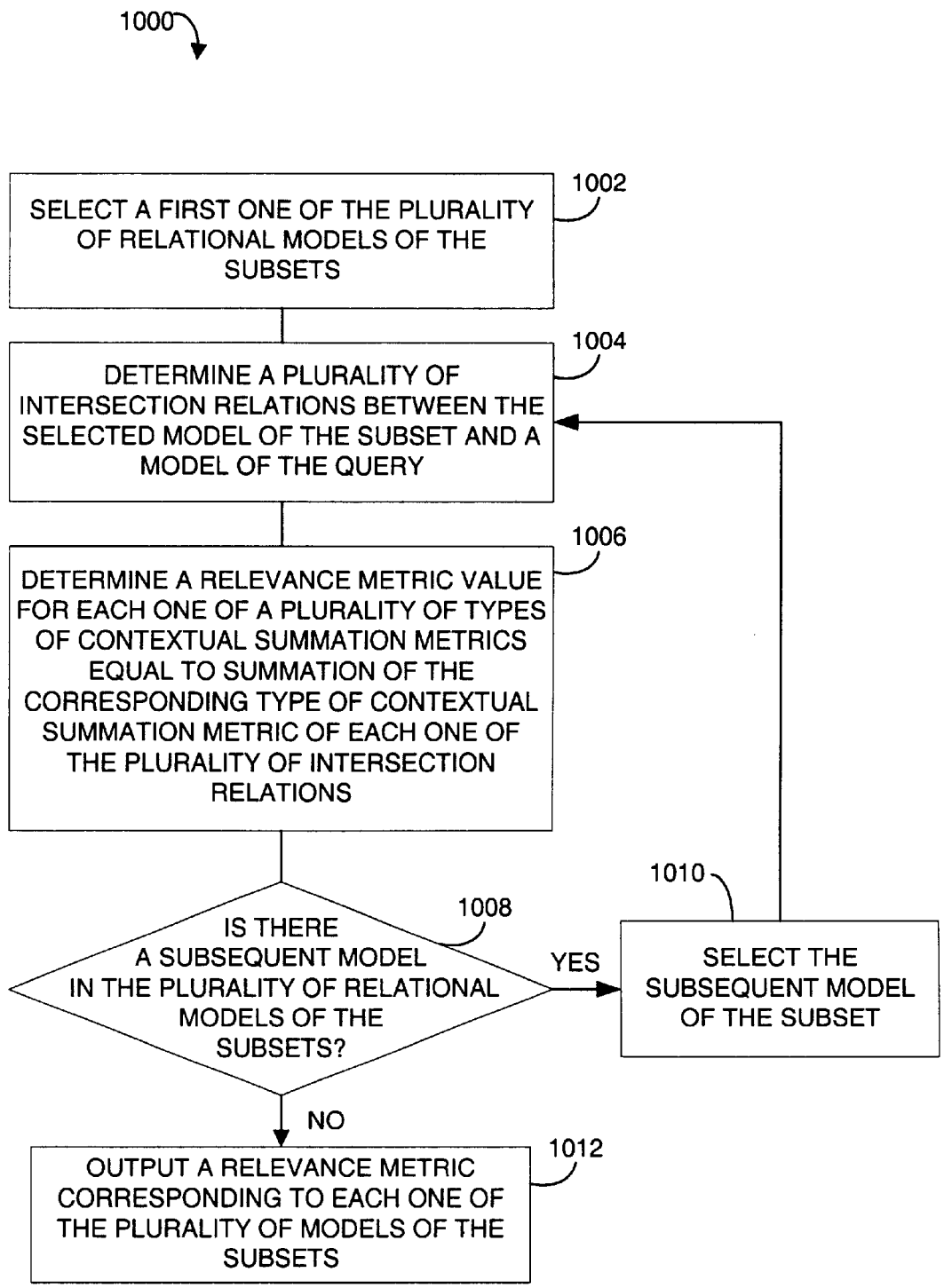
FIG. 10 illustrates one embodiment of a process of comparing a relational model of the query to each one of the relational models of subsets.

FIG. 10 illustrates one embodiment of a process 1000 of comparing a relational model of the query to each one of the relational models of subsets. The process 1000 includes determining the relevance metrics for each one of the relational models of the subsets. This is initiated by determining an intersection model of the relational model of the query and the model of the first subset. Determining an intersection model can include determining a number of intersectional relations in block 1004. Each one of the intersectional relations has a shared term pair and the shared term pair is present in at least one relation in each of the query model and the first subset relational model. Each intersection relation also has a number of intersection metrics (IM). Each IM is equal to a function of $RSM_{Q1}$ and $RSM_{S1}$. $RSM_{Q1}$ is a type of relational summation metric in the relational model of the query and $RSM_{S1}$ is a corresponding type of relational summation metric in the relational model of the first one of the relational models of the subsets. Next, a relevance metric for each one of the types of relational summation metrics is determined. Each one of the relevance metrics includes a function of the corresponding type of relational summation metrics of each one of the intersection relations in block 1006. The process repeats in blocks 1008 and 1010 for any additional models of subsets.

The function of $RSM_{Q1}$ and $RSM_{S1}$ could alternatively be equal to $[\ln RSM_{Q1}]*[\ln RSM_{S1}]$, if $RSM_{Q1}$ and $RSM_{S1}$ are each greater than or equal to 1. For another alternative embodiment function of $RSM_{Q1}$ and $RSM_{S1}$ could equal $[RSM_{Q1}]*[RSM_{S1}]$.

Determining an intersection model can also include applying a scaling factor to the summation of the corresponding IMs. One scaling factor is a subset emphasis factor (SEF)=$S_s/R$, wherein $S_s$ is equal to a sum of a selected type of relational metrics from the subset for all shared relations and R is equal to a sum of the selected type of relational metric in the subset. Another scaling factor is a query emphasis factor (QEF)=$S_q/Q$. $S_q$ is equal to a sum of a selected type of relational metrics from the query for all shared relations. Q is equal to a sum of the selected type of relational metric in the relevance model of the query. Another scaling factor is a length emphasis factor (LEF)= $L_s/T$ where, $L_s$ is equal to a number of terms in the subset and T is equal to a number greater than a number of terms in a largest subset of the database. Still another scaling factor is an alternate length emphasis factor $(LEF_{alt})=L_{cap}/T$ where, $L_{cap}$ is equal to the lesser of either a number of terms in the subset or an average number of terms in each one of the subsets, and T is equal to a number greater than a number of terms in a largest subset of the database.

For another alternative output, a representation of the model of the query or a model of a subset can be output. Such representations can include table-formatted text, or a network diagram, or a graphical representation of the model.

For another alternative embodiment of keyterm search, multiple queries can be applied to the keyterm search processes described above. A first query is processed as described above. Next, a second query is input, and then a relational model of the second query is created. Then the relational model of the second query is compared to each one of the relational models of the subsets. A second set of identifiers of the subsets relevant to the second query is then output. Finally, the second set of relevance metrics for the second query is combined with the relevance metrics for the first query to create a combined output. An alternative embodiment can also include determining a third set of identifiers of the subsets consisting of identifiers of the subsets present in both the first and second sets of subsets.

A selected combined relevance metric for each one of the identifiers of the subsets that is present in both the first set of identifiers of the subsets and the second set of identifiers of the subsets is greater than zero. Combining the sets of identifiers can also include calculating a product of a first type of first relevance metric and a first type of a second relevance metric.

Another alternative also includes determining a third set of identifiers of the subsets consisting of identifiers of the subsets present in either the first or second set of subsets. A selected combined relevance metric for each one of the identifiers of the subsets that is present in either the first set of identifiers of the subsets or the second set of identifiers of the subsets, or both, is greater than zero. In one embodiment, combining the sets of identifiers also includes calculating a summation of a first type of first relevance metric and a first type of a second relevance metric.

This application is intended to cover any adaptations or variations of the present invention. For example, those of ordinary skill within the art will appreciate that the keyterm search process can be executed in varying orders instead of being executed in the order as described above.

Using keyterm search is easy. All that is required is to provide the keyterm or keyterms of interest. Then the subsets of a database, such as the narratives of the Aviation Safety Reporting System (ASRS) database, are sorted according to their relevance to the query, the most relevant narratives are displayed with the relevant sections highlighted. Examples of keyterm search applied to the ASRS database are shown below to illustrate several important details.

Using a query term "engage" to find narratives relevant to "engage", the keyterm "engage" is input to the keyterm search and the most relevant narratives, with their relevant sections highlighted, are displayed. Additional outputs can include a complete list of relevant narratives, and the criterion model used to search the ASRS database. The following is an example of a relevant narrative:

ON FEBRUARY/XX/95 AT ABOUT XA00 PM SAN JUAN TIME WE DEPARTED RWY 8 ENRTE TO MIAMI. WE INTERCEPTED THE JAAWS 9 DEP, AND SHORTLY AFTER PASSING THROUGH 10000 FT WE WERE CLRED DIRECT (RNAV) TO JUNUR, WHICH IS A POINT IN THE CLAMI 1 ARR INTO MIAMI. I THEN ENGAGED THE AUTOPLT AND TURNED THE ACFT IN THE DIRECTION OF THE WAYPOINT (JUNUR) WE WERE CLRED TO. AT THIS POINT I AM NOT SURE IF I ENGAGED THE AUX NAV PORTION OF THE AUTOPLT. THE REASON I SAY THIS IS BECAUSE APPROX 1 HR LATER WE DISCOVERED THAT THE AUX NAV PORTION OF THE AUTOPLT WAS NOT ENGAGED AND WE HAD DRIFTED ABOUT 45 NM OFF COURSE. IT IS UNKNOWN WHETHER THE AUX NAV WAS NEVER ENGAGED OR IF THE KNOB WAS SOMEHOW KNOCKED OFF DURING THE FLT. I DO REMEMBER PASSING ALMOST DIRECTLY OVER GTK VOR WHICH IS ALONG THE NORMAL RTE THE ACFT WOULD TAKE IF THE OMEGA WERE ENGAGED. 2 SCENARIOS ARE POSSIBLE. THE OMEGA WAS NEVER ENGAGED, AND DUE TO LIGHT HIGH ALT WINDS, THE ACFT AFTER INITIALLY BEING POINTED IN THE CORRECT DIRECTION, ONLY BEGAN TO DRIFT DRAMATICALLY AFTER PASSING GTK VOR. OR, THE AUX NAV KNOB WAS ACCIDENTLY DISENGAGED AND WAS NOT NOTICED. THERE IS NO AURAL OR OTHER TYPE WARNING WHEN THE OMEGA BECOMES DISENGAGED. THERE IS A GREEEN 'AUX NAV' LIGHT THAT IS ILLUMINATED WHEN ENGAGED, BUT THE LIGHT IS NOT VERY OBVIOUS TO THE CREW. SOME TYPE OF OBVIOUS WARNING (HAD IT BEEN AVAILABLE) WOULD HAVE ALERTED THE CREW IN THE EVENT OF AN INADVERTENT DISCONNECT. ONE THING WE FOUND UNUSUAL DURING OUR FLT WAS THAT ATC NEVER SAID A WORD TO US DURING OUR SMALL DETOUR. (300563)

The default pattern-matching behavior of keyterm search is a "contained match". This means that any term that contains the string of characters "engage" is considered to be a match. So, narratives containing the following terms are retrieved:

| | | | | |
|---|---|---|---|---|
| engage | engaged | disengage | disengaged | reengage |
| reengaged | engagement | disengagement | | |

In the example narrative, the term "engaged" appears 7 times, "disengaged" appears twice, and "engage" does not appear. This shows the value of allowing the "contained match" as the default. A user need not know the various forms of the term that appear in the narratives, but can find the narratives that are clearly relevant to the input keyterm "engage."

Not only are the various forms of the term "engage" highlighted in the example narrative, but other terms are also highlighted. These other terms are often found in the context of "engage" in the ASRS database. Highlighting can be limited to a pre-selected number of the most prominent contextual associations of the keyterm in the database. The default number is 1000. Of course the keyterm search could limit highlighting to just the keyterm(s), or to contextual associations that have some fraction of the prominence of the most prominent association in the database or the particular narrative.

The display of the most relevant narratives can suffice, but a deeper understanding of which contextual associations contribute to the relevance of each narrative can also be presented. By referring to a data table that is displayed after each narrative, it is possible to identify the terms in the narrative that are most often found in the context of the query term(s). Table 2.1 shows a top portion of a data table for the example narrative:

TABLE 2.1

| W1 | W2 | A | B | C |
|---|---|---|---|---|
| ENGAGED | AUTOPLT | 17905 | 70 | 41.6048 |
| NOT | ENGAGED | 2484 | 72 | 33.4334 |
| NAV | ENGAGED | 898 | 94 | 30.8952 |
| ENGAGED | ALT | 6015 | 27 | 28.6804 |
| ENGAGED | LIGHT | 508 | 74 | 26.8164 |
| OMEGA | ENGAGED | 386 | 87 | 26.5982 |
| DISENGAGED | NOT | 896 | 39 | 24.9047 |
| ENGAGED | BUT | 984 | 24 | 21.902 |
| NEVER | ENGAGED | 159 | 73 | 21.7479 |
| AUX | ENGAGED | 117 | 94 | 21.636 |
| CLRED | ENGAGED | 364 | 26 | 19.2135 |
| ENGAGED | COURSE | 239 | 32 | 18.98 |
| OMEGA | DISENGAGED | 202 | 34 | 18.7189 |
| WARNING | DISENGAGED | 202 | 34 | 18.7189 |

Each line in Table 2.1 represents a contextual association between two terms (i.e., the terms in columns W1 and W2).

Column A is a measure of the strength of the contextual association of the term pair in the whole ASRS database. Column B is a measure of the strength of the same contextual association in this narrative. Column C is a combination of these two metrics and represents a measure of the contextual association of the paired terms. In this table, C is the product of the natural logarithms of A and B. The value of C is large when the values of both A and B are large. The relations are sorted on column C.

Term pairs toward the top of the list have stronger contextual associations. The top relation, for example, is between ENGAGED and AUTOPLT (i.e., autopilot). This relation is at the top of the list because AUTOPLT is very often found in the context of ENGAGED in the ASRS database (as indicated by 17905 in column A) and that relationship is also relatively prominent in this narrative (as indicated by 70 in column B). The term ENGAGED is in column W1, and the term AUTOPLT is in W2 because ENGAGED tends to precede AUTOPLT in the narratives of the ASRS database. In general, each pair of terms appears in the more typical order.

The contextual relationship between ENGAGED and AUTOPLT can be seen in the following excerpts from the example narrative:

I THEN ENGAGED THE AUTOPLT

IF I ENGAGED THE AUX NAV PORTION OF THE AUTOPLT

THE AUX NAV PORTION OF THE AUTOPLT WAS NOT ENGAGED

An additional advantage of the contained match rule is that a term such as "engage" can be used as a query. This would match several forms of "engage", including not only those listed earlier, but also "engaging" and "disengaging". Alternatively, an exact match can also be required so that only narratives containing the term "engage" would be retrieved.

A search for narratives relevant to "rest" requires the use of the "exact match" option. That is because the default "contained match" option that worked so well in the previous example becomes a liability when the query is contained in too many terms. "Rest" is such a query, as indicated by the following long list of terms from the ASRS database that contain "rest":

PLTS) GETS FORGOTTEN! TRY AND FIGURE THIS ONE. 2 DAY PAIRING SCHEDULE FOR 10 PLUS 09, THE FIRST DAY SHOW TIME IS LATE EVENING AND FLT TIME IS SCHEDULED FOR 3 PLUS 44. DUE TO MECHANICAL PROBLEM WE PUSHED: 20 LATE, WX IN THE AREA DELAYED OUR TKOF. WITH AN UNSCHEDULED FUEL STOP WE LANDED AND PARKED AT THE DEST GATE 1 PLUS 51 LATE. ORIGINALLY WE WERE SCHEDULED FOR 10 PLUS 16 LAYOVER. OUR COMPANY'S STD RESPONSE WHEN CALLED TO CHK CREW REST IS 8 PLUS 44 BLOCK TO BLOCK (XX AND 8 PLUS 44=A PUSH TIME OF XXY) SINCE OUR PUSH TIME WAS SCHEDULED FOR XXY THERE WAS NOT A CONFLICT IN OUR THINKING. AT EARLY SCHEDULING AWOKE THE CAPT, INFORMING HIM THAT THE FO AND SO 'REQUIRED 9 PLUS 45' BLOCK TO BLOCK CREW REST. WE ALL SHOWED AS PLANNED THE PREVIOUS EVENING FOR SCHEDULED VAN. THE CAPT INFORMED FO AND I ABOUT CALL FROM SCHEDULES, IT JUST DID NOT MAKE SENSE. WE FLEW 4 PLUS 13 THE NIGHT BEFORE AND WERE SCHEDULED TO FLY 6 PLUS 25 THIS DAY. WHAT WERE WE TO DO? GO BACK TO OUR ROOMS AND SLEEP FOR ANOTHER 45 MINS? WE SHOWED ON THE ACFT (8 PLUS 51 FROM BLOCK IN) ACFT WAS BOARDED NORMALLY AND WE SAT WITH THE PARKING BRAKE SET SO AS NOT TO TRIP ACARS UNTIL SCHEDULING GOT THEIR IMPOSED 9 PLUS 45 BLOCK TO BLOCK, HOWEVER, I SEE THAT 1) THEY INTERRUPTED CAPT CREW REST. 2) THEIR REST INTERPRETATION WAS SOMEHOW FLAWED (ALTHOUGH APPRECIATED WHEN WE GET 'MORE' REST). 3) 'MORE' REST I DO NOT NEED SPENT SITTING 54 MINS WITH PARKING BRAKE SET—WAITING TO BE LEGAL. MY AIRLINE USES FAR MIN REST AS NORMAL PRACTICE AND ROUTINELY VIOLATES CREW REST FOR PERHAPS MISINTERPRETED REST REGS REQUIRED. I FEEL 1) FAA MUST MAKE BOTH FLT TIME AND DUTY TIME HENCE REST TIMES EASIER TO UNDERSTAND (THROW OUT INTERPRETATIONS)! 2) HOLD CREW SCHEDULERS ACCOUNTABLE FOR

| RESTR | REST | RESTRICTION | RESTRICTIONS |
|---|---|---|---|
| NEAREST | RESTART | RESTRS | INTEREST |
| RESTARTED | RESTORED | INTERESTED | INTERESTING |
| RESTATED | ARRESTED | RESTED | ARREST |
| RESTORE | UNRESTRICTED | RESTRICT | FOREST |
| RESTRICTING | RESTRICTIVE | UNRESTR | RESTING |
| RESTAURANT | ARRESTING | RESTROOM | RESTRICTED |
| RESTS | CRESTVIEW | RESTARTING | CREST |
| INTERESTS | RESTATE | RESTRICTS | PRESTART |
| INTERESTINGLY | RESTORING | RESTRAINT | RESTRAINED |
| RESTRAINTS | BREST | OVERESTIMATED | RESTATING |
| RESTORATION | RESTRAINING | ARMREST | RESTLESS |
| UNDERESTIMATED | | | |

To find narratives relevant to "rest", input the keyterm "rest" to keyterm search and select the "exact match" option. The most relevant narratives are displayed, with their corresponding relevant sections highlighted. The following is one of the most relevant narratives:

CREW REST REGS: UNFORTUNATELY, EVERY ONCE IN A WHILE FOR A VARIETY OF REASONS, THIS REG (DESIGNED TO ENSURE PROPERLY RESTED

VIOLATIONS OF CREW REST, A GOOD SCHEDULE PRACTICE WOULD HAVE BEEN TO INFORM US ON ARR THE PREVIOUS NIGHT OF REST REQUIRED. (183457)

The terms CREW, REQUIRED, BLOCK, NOT, DUTY, CAPT (i.e., captain), FAR (i.e., Federal Aviation Regulations), REGS (i.e., regulations), LEGAL, FAA (i.e., Federal Aviation Administration), NIGHT, FEEL, SCHEDULED, and others are highlighted in the narrative because they are often found in the context of REST in the narratives of the ASRS database.

The needs of many users will be satisfied by the display of the most relevant narratives, but others might wish to better understand the relevance of each narrative. The data table that is displayed after each narrative includes the relative association of REST with the terms found most often in the context of REST. The following Table 2.2 is a top portion of a data table for the example narrative:

TABLE 2.2

| term1 | term2 | A | B | C |
|-------|-----------|------|-----|---------|
| CREW | REST | 9241 | 264 | 50.9163 |
| REST | REQUIRED | 2281 | 115 | 36.6896 |
| BLOCK | REST | 1181 | 124 | 34.0992 |
| REST | NOT | 4639 | 44 | 31.9471 |
| DUTY | REST | 4595 | 43 | 31.7172 |
| CAPT | REST | 1302 | 66 | 30.0468 |
| FAR | REST | 1534 | 56 | 29.5285 |
| REST | REGS | 643 | 93 | 29.3084 |
| LEGAL | REST | 1606 | 47 | 28.4199 |
| REST | FAA | 1207 | 54 | 28.3054 |
| NIGHT | REST | 2375 | 34 | 27.4095 |
| REST | FEEL | 462 | 60 | 25.1211 |
| REST | SCHEDULED | 2372 | 24 | 24.6982 |
| REST | NEED | 693 | 42 | 24.4482 |
| REST | SCHEDULE | 852 | 35 | 23.99 |

The format of Table 2.2 was described in the previous example. In this case Table 2.2 indicates, for example, that CREW is often found in the context of REST in both the database and in this narrative, and CREW typically precedes REST in the database. Further, since the value in column C is greater than that for any of the other term pairs, the contextual association of CREW and REST is stronger than that of any of the other term pairs. The other contextual associations can be interpreted in a similar fashion.

To find narratives relevant to "emergency", the keyterm "emergency" is input to keyterm search and the most relevant narratives are retrieved and displayed, with the corresponding relevant sections highlighted. The following is an example narrative:

A FEW MINS AFTER REACHING FL350 CABIN RAPIDLY DEPRESSURIZED. COCKPIT CREW VERIFIED RAPID DECOMPRESSION, BEGAN EMER DSCNT, DECLARED AN EMER CONDITION WITH ARTCC AND SIMULTANEOUSLY REQUESTED A DIRECT VECTOR TO THE NEAREST SUITABLE ARPT WHICH WAS DETERMINED BY CAPT TO BE STL 110 MI AWAY. ALL EMER CHECKLISTS AND NORMAL CHECKLISTS COMPLETED AND AN UNEVENTFUL APCH AND LNDG WAS MADE. NO INJURIES. I HAVE UNFORTUNATELY DONE 2 EMER DSCNTS IN THE LAST 18 MONTHS DUE TO THE SAME COMPUTER FAILURE OF THE PRESSURIZATION SYS. THE ODDS AGAINST THAT ARE STAGGERING. I BELIEVE THIS ACFT'S AUTO CABIN CTLRS SHOULD BE LOOKED AT CAREFULLY. ALSO, EMER PROC TRAINING AT MY COMPANY FOR EMER DSCNTS NEEDS TO BE REVIEWED AND MODIFIED AS WELL AS THOUGHT GIVEN TO MANY FACTORS NEVER DISCUSSED DURING TRAINING. (110788)

The term "emergency" does not appear in the narrative because the ASRS abbreviates the term "emergency" as "emer". Keyterm search automatically maps or transforms the input keyterm to the ASRS abbreviations, as long as those transformations or mappings are contained in the mapping file used by keyterm search. The mapping file can also be updated or disabled. The highlighted terms include the keyterm (as abbreviated by the ASRS) and those terms that are often found in the context of the query in the narratives of the ASRS database.

A search for narratives relevant to "language", "English", or "phraseology" in a database can be initiated by inputting the keyterms "language", "English", and "phraseology" to keyterm search. Keyterm search then retrieves and ranks the narratives of the database according to their relevance to the typical or selected contexts of these terms in the database. The following is an example of one of the most relevant narratives retrieved and displayed by keyterm search of the ASRS database:

TKOF CLRNC WAS MISUNDERSTOOD BY CREW. TWR CTLR'S ENGLISH WAS NOT VERY CLR AND HE USED INCORRECT PHRASEOLOGY WHICH CAUSED AN APPARENT ALT 'BUST.' ATC CLRNC WAS TO 9000 FT, WHICH IS NORMAL FOR THEM. WE WERE USING RWY 21. TKOF CLRNC WAS 'CLRED FOR TKOF, RWY HDG 210 DEGS, CONTACT DEP.' DEP SAID WE WERE CLRED TO 2100 FT (AS WE WERE PASSING 3000 FT). EVIDENTLY THE '21' AFTER 'RWY HDG' WAS MEANT AS AN AMENDED ALT CLRNC. IF PROPER PHRASEOLOGY HAD BEEN USED, I AM SURE WE WOULD HAVE EITHER UNDERSTOOD OR ASKED FOR A CLARIFICATION. PROPER PHRASEOLOGY IS EVEN MORE IMPORTANT WHEN SPEAKING TO PEOPLE WHOSE PRIMARY LANGUAGE IS NOT ENGLISH. PLTS SHOULD UNDERSTAND THIS BECAUSE OF TRYING TO GIVE POS RPTS, ETC, TO SO MANY DIFFERENT PEOPLE. (236336)

The following are some relevant sentences from other highly relevant narratives:

EXTREMELY DIFFICULT TO COPY CLRNC BECAUSE OF POOR ENGLISH OF CTLR AND NO SPANISH BY PLTS. (306637)

I THINK AN IMMEDIATE REVIEW OF RELATED FIX NAMES FOR SIMILAR SOUNDING NAMES AS PRONOUNCED BY THE LCL SPEAKER'S LANGUAGE IS ESSENTIAL. (242971)

THE COM BTWN THE FRENCH CTLRS AND ENGLISH SPEAKING PLTS HAS BEEN POOR FOR SOME TIME, AND IS GETTING WORSE. (301205)

FLYING A LOT OF TIME IN CENTRAL AND S AMERICA, I EXPERIENCE THAT ATC CTLRS DON'T HAVE FLUENT TALKING AND UNDERSTANDING OF THE ENGLISH LANGUAGE, AS THE WAY HAS TO BE CONSIDERING THAT ENGLISH IS THE UNIVERSAL AND INTL LANGUAGE IN AVIATION. (302310)

THE RPTR SAID THAT HE OFTEN HEARS IMPROPER PHRASEOLOGY DURING HIS FOREIGN OPS. (352400)

MAIQUETIA ATC IS MOST ASSUREDLY BELOW THE ICAO STD FOR ENGLISH SPEAKING CTLRS. (318067)

ALTHOUGH ENGLISH IS THE OFFICIAL LANGUAGE OF TRINIDAD, LCL DIALECT MAKES IT DIFFICULT TO UNDERSTAND CTLRS. (294060)

BETTER ENGLISH SPEAKING FOREIGN CTLRS AND USE OF STD PHRASEOLOGY IS NEEDED. (268223)

SITUATIONAL AWARENESS IS NONEXISTENT WHEN CTLRS SPEAK TO EVERYONE ELSE IN A FOREIGN LANGUAGE AND TO YOU IN BROKEN ENGLISH! (344832)

TWR PHRASEOLOGY WAS NON STD AND HIS COMMAND OF ENGLISH WAS LIMITED, BUT WE WERE CLRED TO LAND. (332620)

Given the keyterms used in this search, the top-ranked narratives typically describe incidents involving miscommunication between air traffic controllers and flight crews due to language barriers, including poor use of the English language and the use of non-standard phraseology. For each search keyterm, here are some of the typical contexts, as indicated by the query models and reflected in the excerpts above:

"Language" is often found in the context of barriers, English and Spanish, clearances, air traffic controllers, ATC, problems, differences, and difficulties.

"English" is often found in the context of speaking and understanding; these attributes of English: poor, broken, or limited; Spanish and French; air traffic controllers; and pilots.

"Phraseology" is often found in the context of standard or proper usage, ATC, air traffic controllers, towers, clearances, and runways.

While the top narratives retrieved in this search all involve "ATC language barrier factors" it should be noted that there was no requirement that the narratives should involve ATC. Since the typical contexts of language barrier factors do, in fact, involve ATC, the top narratives also involved ATC. As a consequence, however, as one goes further down the list of relevant narratives, at some point reports will be found that involve language barrier factors but not ATC.

Keyterm search will take any number of keyterms as queries, as in the above examples, but each term is treated individually. A search on the keyterms "frequency congestion" will return narratives that contain either one or both of these keyterms and their corresponding contexts. There is no guarantee, however, that both of the keyterms will appear in the top-ranked narratives because the search treats each query term as an independent item.

To address this kind of situation, keyterm search can also include a logical intersection of multiple searches. The query for each search can be specified by one or more keyterms. In this example, the "frequency" search uses the query "freq freqs" and requires an exact match. This query avoids matches on terms such as "frequently". The "congestion" search uses the query "congestion congested" and requires an exact match. This query avoids matches on "uncongested". Keyterm search then retrieves and relevance-ranks narratives that contain both "frequency" in context and "congestion" in context.

The following are excerpts from some of the most relevant narratives:

SEVERAL ATTEMPTS WERE MADE TO CONTACT TWR, BUT DUE TO EXTREME CONGESTION ON THIS FREQ NO LNDG CLRNC WAS OBTAINED . . . FREQ 124.15 WAS SO CONGESTED THAT NO ACFT COULD XMIT ON THIS REQ . . . CORRECTIVE ACTIONS: . . . NOTAM FREQ 124.75 AS AN ALTERNATE FREQ ON ATIS [.] DECREASE CONGESTION OF TWR FREQ. (151711)

I FINALLY SWITCHED BACK TO THE ORIGINAL CTLR FREQ BUT, DUE TO CONGESTED FREQ, I SWITCHED TO THE TWR FREQ TO GET THROUGH, WHICH I FINALLY DID . . . MAYBE ON SUBSEQUENT FLTS, IF THIS PROB SHOULD COME ABOUT, IT MIGHT BE A GOOD IDEA TO ALWAYS LEAVE ONE OF THE RADIOS SET TO THE LAST FREQ TO GO BACK TO WHEN THE FREQ GETS BUSY OR WHEN NOBODY SEEMS TO BE WORKING THAT FREQ. (237353)

AFTER CLRING RWY 33L, WE WERE UNABLE TO CONTACT GND CTL DUE TO FREQ CONGESTION . . . TAXIING INBND WITHOUT FIRST RECEIVING A CLRNC IS NOT AT ALL UNUSUAL AT FREQ CONGESTED ARPTS. IN SIMILAR SITS AT BWI AND ELSEWHERE, IF THE FREQ IS BLOCKED AND A CUSTOMARY TAXI RTE IS KNOWN AND CLR OF TFC, NEARLY AL[L] CAPTS I HAVE OBSERVED WOULD PROCEED SLOWLY, AS WE DID. WE PROGRESSED FARTHER THAN MOST ONLY BECAUSE THE FREQ WAS CONGESTED LONGER, IN PART BECAUSE THE CTLR WOULD NOT UNKEY HIS MIC WHILE MAKING MULTIPLE XMISSIONS. (173324)

BECAUSE OF EXTREME FREQ CONGESTION, ABBREVIATED TAXI INSTRUCTIONS ARE GIVEN AT ORD . . . THE FREQ CONGESTION AND CTLR WORKLOAD AT ORD MAKE IT HARD TO VERIFY INSTRUCTIONS THAT ARE UNCLR. WE ATTEMPTED CONTACT A FEW TIMES BEFORE BEING TOLD TO TURN NEAR THE BARRICADES, BUT WERE THEN GIVEN AN IMMEDIATE FREQ CHANGE WHICH PREVENTED PROMPT FEEDBACK FROM THE CTLR WHO GAVE US THE INSTRUCTIONS. TO THEIR CREDIT, THEY DID SPOT THE ERROR QUICKLY AND CALLED ON TWR FREQ WITH NEW INSTRUCTIONS. (WE MAY NOT HAVE HEARD SOME CALLS DUE TO RECEPTION PROBS.) THE CONGESTION AT ORD WOULD BE TOUGH TO FIX, BUT BETTER ARPT SIGNS SHOWING TAXI RTES THROUGH THE CONSTRUCTION AREAS WILL DEFINITELY CUT DOWN ON FUTURE PROBS. (252779)

These and other relevant narratives indicate that the topics "frequency" and "congestion" are often found in the same contexts, but that the exact phrase "frequency congestion" is not always present. Instead, many forms are found, such as:

CONGESTION ON THIS FREQ
FREQ 124.15 WAS SO CONGESTED
CONGESTION OF TWR FREQ
CONGESTED FREQ
FREQ CONGESTION
FREQ CONGESTED
FREQ WAS CONGESTED

A phrase search would also be useful for finding narratives relevant to "frequency congestion". The preceding phrases suggest that an effective search would use a variety of phrase forms as queries, including:

FREQ CONGESTION
FREQ CONGESTED
CONGESTION FREQ
CONGESTED FREQ

Additional phrases include the plural form, "freqs".
FREQS CONGESTION
FREQS CONGESTED
CONGESTION FREQS
CONGESTED Most keyword search methods use term indexing such as used by Salton, 1981, where a word list represents each document and internal query. As a consequence, given a keyword as a user query, these methods use the presence of the keyword in documents as the main criterion of relevance. In contrast, keyterm search described herein uses indexing by term association, where a list of contextually associated term pairs represents each document and internal query. Given a keyterm as a user query, keyterm search uses not only the presence of the keyterm in the database being searched but also the contexts of the keyterm as the criteria of relevance. This allows retrieved documents to be sorted on their relevance to the keyterm in context.

Some methods such as Jing and Croft (1994), Gauch and Wang (1996), Xu and Croft (1996), and McDonald, Ogden, and Foltz (1997), utilize term associations to identify or display additional query keywords that are associated with the user-input keywords. These methods do not use term association to represent documents and queries, however, and instead rely on term indexing. As a consequence, "query drift" occurs when the additional query keywords retrieve documents that are poorly related or unrelated to the original keywords. Further, term index methods are ineffective in ranking documents on the basis of keyterms in context.

Unlike the keyterm search method described herein, the proximity indexing method of Hawking and Thistlewaite (1996, 1996) does not create a model of the query or models of the documents of the database. In the Hawking and Thistlewaite (1996, 1996) method, a query consists of a user-identified collection of words. These query words are compared with the words in the documents of the database. This search method of Hawking and Thistlewaite (1996, 1996) seeks documents containing length-limited sequences of words that contain subsets of the query words. Documents containing greater numbers of query words in shorter sequences of words are considered to have greater relevance. This is substantially different from the method of keyterm search described herein.

Further, as with conventional term indexing schemes, the method of Hawking and Thistlewaite (1996, 1996) allows a single query term to be used to identify documents containing the term, but unlike the keyterm search method described herein, the Hawking and Thistlewaite (1996, 1996) method cannot rank the identified documents containing the term according to the relevance of the documents to the contexts of the single query term within each document.

Phrase Search

Although phrase search is similar in many aspects to keyterm search described above, there are two major differences between them. First, the form and interpretation of the query in phrase search are different from the form and interpretation of the query in keyterm search. Second, the method of assembly of the query model in phrase search is different from the method of assembly of the query model in keyterm search.

A phrase search query includes one or more query fields, and each query field can contain a sequence of terms. When applied to text, each phrase search query field can include a sequence of words such as two or more words, a phrase, a sentence, a paragraph, a document, or a collection of documents. In the following description, the word "phrase" is intended to be representative of any sequence of terms. Phrase search utilizes relationships among the terms in each phrase in forming the query model. In contrast, keyterm search includes no concept of query fields, and a keyterm query includes one or more terms that are treated as separate terms. Like keyterm search, phrase search can be applied to any type of sequential information.

A phrase search query model is assembled differently from a keyterm search query model. The keyterm query model is based on a gleaning process that expands the query by collecting matching relations and then reducing those relations to a unique set of relations. In phrase search, each query field in a phrase search query is modeled using the process of self-modeling a database as described above, and then the models of the phrase search query fields are combined as will be described in detail below to form a single phrase search query model.

Figure 11:
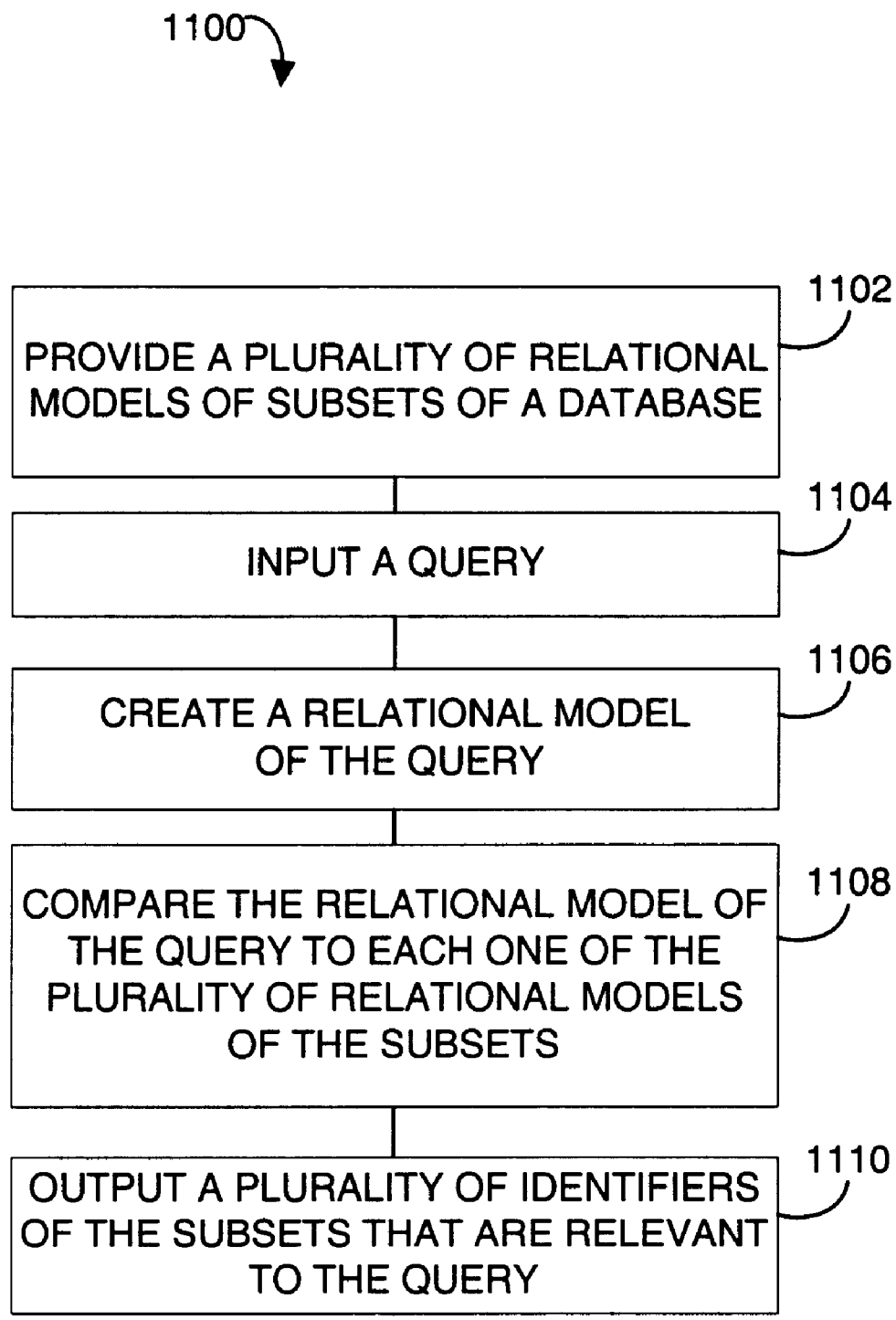
FIG. 11 illustrates an overview of one embodiment of the phrase search process.

FIGS. 11–15 illustrate various embodiments of phrase search. FIG. 11 illustrates an overview of one embodiment of the phrase search process 1100. First, a number of relational models of subsets of a database are provided in block 1102. Each one of the relational models includes one relational model of one subset of the database. A query is input in block 1104 to be compared to the relational models of subsets of the database. For one embodiment, the query includes one phrase. For another embodiment, the query includes multiple phrases. Next, a relational model of the query is created in block 1106. The relational model of the query is then compared to each one of the relational models of subsets of the database in block 1108 that is described in more detail below. The identifiers of the relevant subsets are then output in block 1110. For an alternative embodiment, the query can also be transformed as described above in keyterm search.

Figure 12:
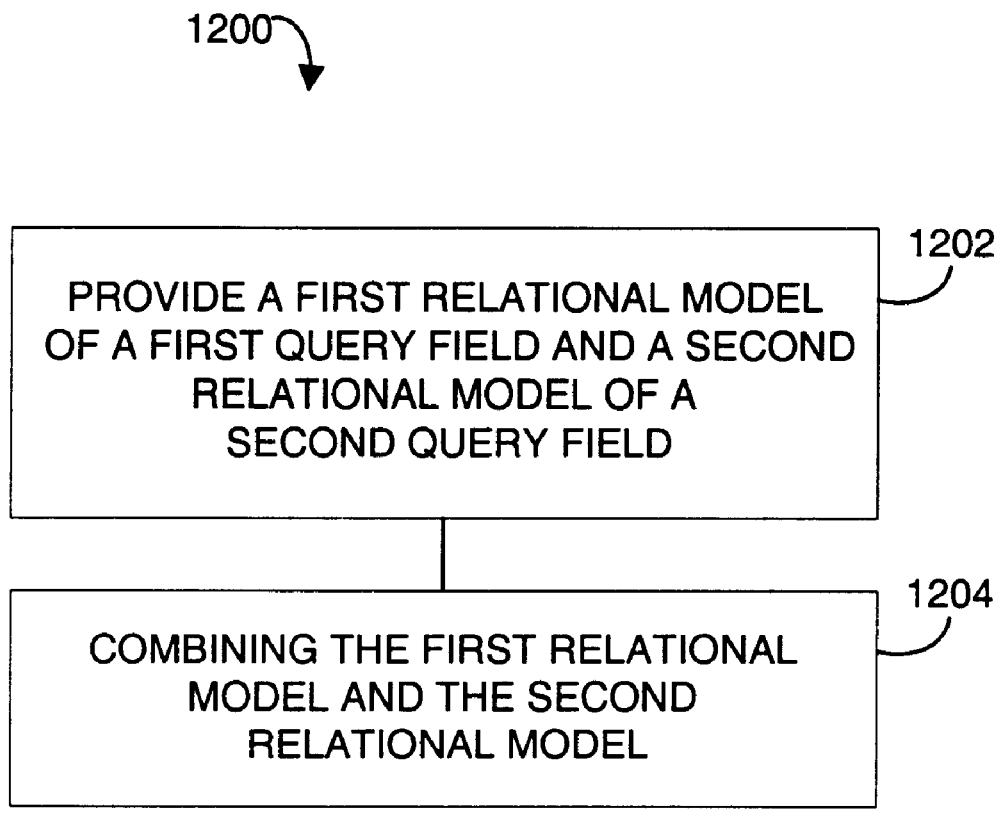
FIG. 12 shows one process where the query includes a number of query fields.
Figure 13:
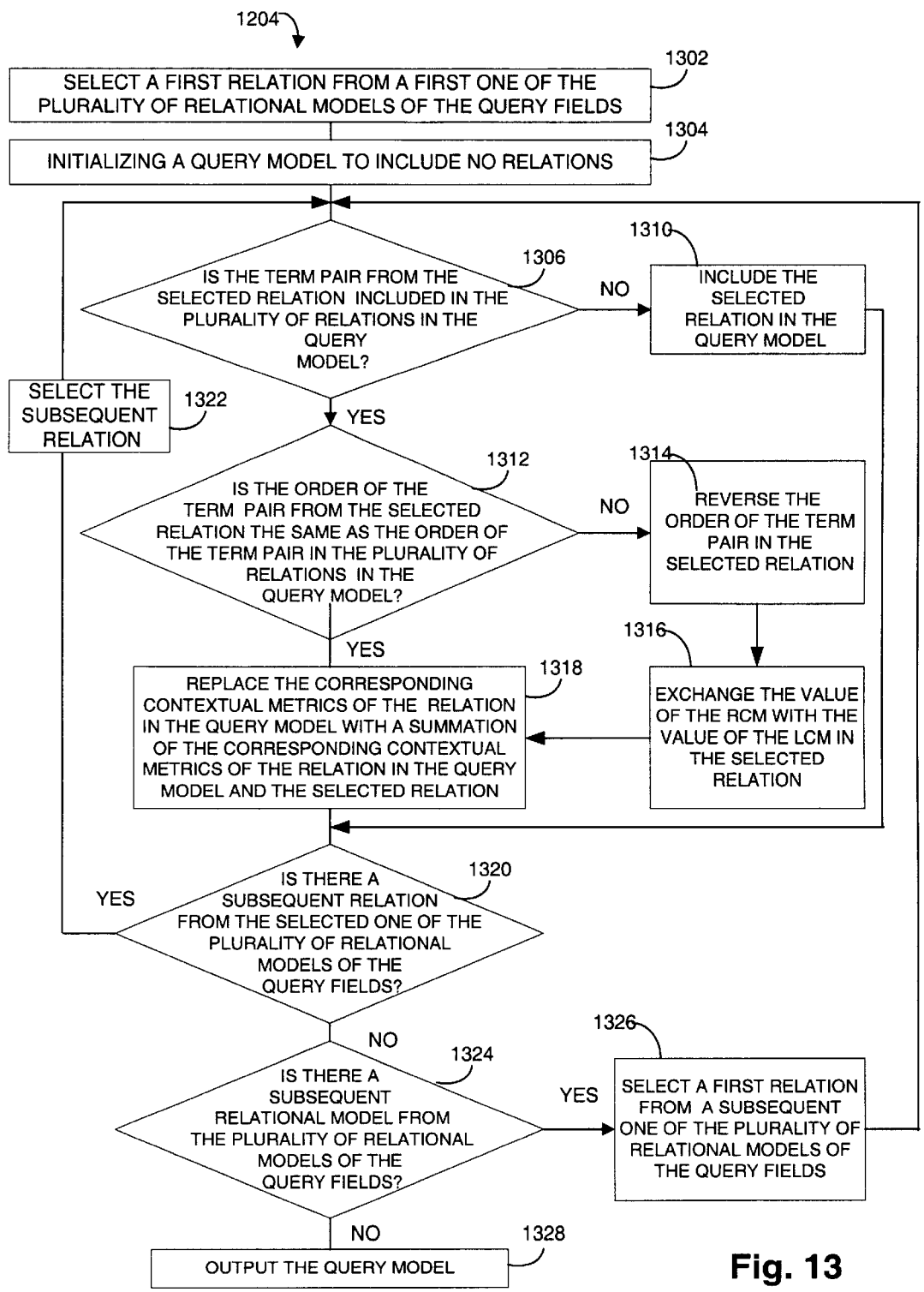
FIG. 13 illustrates a method of combining the query field models.

FIG. 12 shows one process 1200 where the query includes a number of query fields. A relational model of the contents of each one of the query fields is created in block 1202. Next, in block 1204, the models of query fields are combined. FIG. 13 illustrates one embodiment of a method 1204 of combining the query field models. A first relation from a first one of the query field models is selected in block 1302. A query model is initialized as being empty in block 1304. Then the term pair from the selected query model is compared to the relations in the query model in block 1306. If the term pair is not already in a relation in the query model, then the selected relation is included in the query model in block 1310. If the term pair is already included in one of the relations of the query model, then the order of the term pair in the selected relation and the order of the term pair in the query model are compared in block 1312. If the order is not the same, then the order of the term pair in the selected relation is reversed in block 1314 and the directional metrics recalculated in block 1316, i.e. the value of LCM and the value of RCM of the selected relation are exchanged. Once the order of the term pair in the selected relation and the order of the term pair in the query model are the same, then each of the corresponding types of relational metrics of the relation in the query model and the selected relation is combined in a summation of each type and the summation results replace the previous values of the corresponding types of metrics in the relation in the query model in block 1318. This process continues through the remainder of the relations in the selected query field model in blocks 1320, 1322. Once all relations of the first query field model have been processed then a subsequent query field model is selected in block 1324 and a first relation from the subsequent query field model is selected in block 1326 and this query field model is processed in blocks 1306-1322. Once all of the query field models have been processed, then the resulting query model is output in block 1328.

Inputting the query can also include assigning a weight to at least one of the query fields. Each one of the RSMs corresponding to the selected query field is scaled by a factor determined by the assigned weight. This allows each query field to be given an importance value relative to the other query fields.

Stopterms play an important role in phrase search because some queries will contain one or more stopterms. Stopterms can include any terms, but in one alternative, stopterms include words such as "a", "an", "the", "of", "to", and "on". In phrase search, the user can add terms to, or remove terms from, the list of stopterms.

In one alternative of phrase search, a search finds subsets that contain a particular phrase that includes particular stopterms, such as "on approach to the runway". In another alternative of phrase search, stopterms are ignored and a search finds subsets containing phrases whose non-stopterms match the query phrase or phrases. For example, in the query "We were on approach to the runway at LAX" the words "we", "were", "on", "to", "the", and "at" could, if the user so indicated, be considered to be stopterms, and the query would match subsets containing sequences such as "He was on approach to runway 25L, a mile from LAX". In another embodiment, a query "on approach to the runway" matches all occurrences in subsets of "on approach to the runway" as well as similar phrases in subsets such as "on approach to runway 25R". Preferably the exact matches are listed first in the output.

In phrase search, a query model can be modified as a function of the stopterms in the query. Recall that each query model contains relations, and each relation contains a term pair and associated relational summation metrics (RSMs). When a query model is created based on a query such as "on approach to the runway", that query model can include query model term pairs such as "on, approach", "on, to", "approach, runway", as well as others. One alternative is to eliminate all relations containing stopterms. As another alternative, stopterms can be retained and treated just like any other term. In yet another alternative, relations containing one or more stopterms can be differentiated from others. For example, in order to adjust the weight of each relation to favor topical term pairs such as "approach, runway" over terms pairs containing one stopterm such as "the, runway", and term pairs containing two stopterms such as "on, to", it is possible to modify the metrics of each relation as a function of the stopterms contained in the term pairs.

If neither a first term in the query model term pair nor a second term in the query model term pair is one of the stopterms then the RSMs are increased. For another embodiment, if both a first term in the query model term pair and a second term in the query model term pair are included in the set of stopterms then the RSMs are decreased. Alternatively, if either but not both a first term in the query model term pair or a second term in the query model term pair is one of the sets of stopterms then the RSMs are unchanged.

A set of emphasis terms can also be provided. Emphasis terms are terms that are used to provide added emphasis to the items that contain the emphasis terms. The set of emphasis terms can include any terms. Typically the set of emphasis terms includes terms of greater importance in a particular search. For one embodiment, if both a first term in the query term pair and a second term in the query term pair are included in the set of emphasis terms then the RSMs are increased. For another embodiment, if either but not both a first term in the query term pair or a second term in the query term pair is one of the set of emphasis terms then the RSMs are unchanged.

For still another alternative if neither a first term in the query model term pair nor a second term in the query model term pair is one of the emphasis terms then the RSMs are decreased.

Another alternative embodiment includes a list of stop relations. A stop relation is a relation that does not necessarily include stopterms but is treated similarly to a stopterm in that stop relations may be excluded, or given more or less relevance weighting, etc., as described above for stopterms. Each one of the stop relations includes a first term and a second term and a number of types of relational metrics. For one embodiment, any stop relations in the relational model of the query are eliminated from the query. Eliminating a stop relation blocks the collection of the related concepts described by the stop relation. For example, returning to the fatigue example described above, a stop relation might include the term pair "fatigue" and "metal". Eliminating the "fatigue, metal" stop relation from the model of the query results in removing that contextual association from consideration as a relevant feature.

Figure 14:
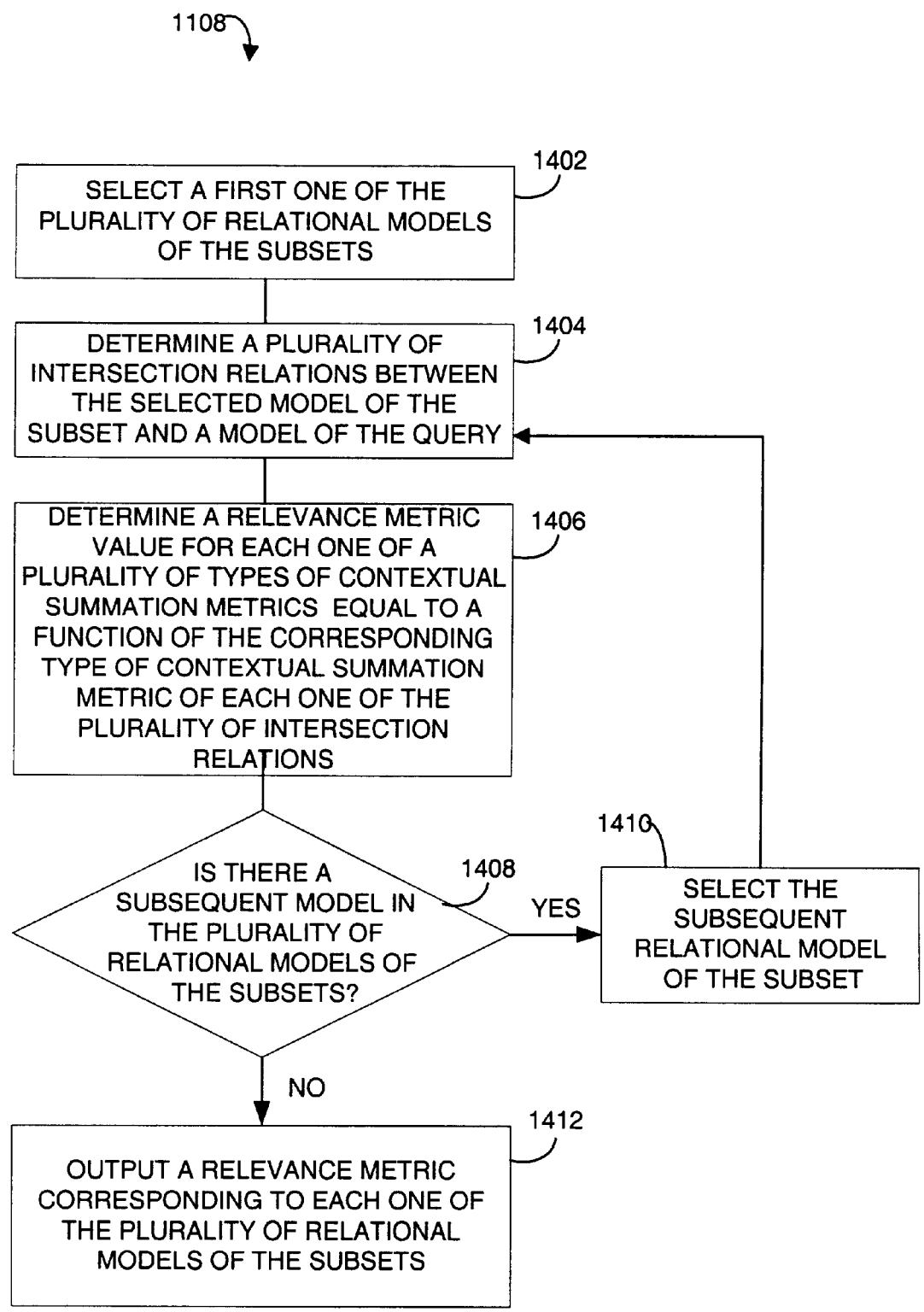
FIG. 14 illustrates one embodiment of comparing a query model to each one of the relational models of subsets.

FIG. 14 illustrates one embodiment 1108 of comparing a query model to each one of the relational models of subsets. The process 1400 includes determining the relevance metrics for each one of the relational models of the subsets. This is initiated by determining an intersection model of the relational model of the query and the model of the first subset. Determining an intersection model can include determining the intersectional relations in block 1404. Each one of the intersectional relations has a shared term pair. The shared term pair is present in at least one relation in each of the query model and the first subset relational model. Each intersectional relation also has a number of intersection metrics (IMs). Each IM is equal to a function of $RSM_{Q1}$ and $RSM_{S1}$. $RSM_{Q1}$ is a type of relational summation metric in the relational model of the query, and $RSM_{S1}$ is a corresponding type of relational summation metric in the relational model of the first one of the relational models of the subsets. Next, a relevance metric for each one of the types of relational summation metrics is determined. Each one of the relevance metrics includes a function of the corresponding type of relational summation metrics of each one of the intersection relations in block 1406. The process is repeated in blocks 1408 and 1410 for any additional models of subsets. Alternatively, the function of $RSM_{Q1}$ and $RSM_{S1}$ is equal to $[RSM_{Q1}]*[RSM_{S1}]$. The function of the corresponding IMs of all intersection relations can also include a summation of all of the $RSM_{Q1}$ of each one of the first query relations that are included in the intersection relations.

Determining an intersection model can also include applying a scaling factor to the function of the corresponding intersection metrics. Various embodiments of applying the scaling factor are described above in the keyterm search and are similarly applicable to phrase search.

Calculating a set of first relevance metrics for a first one of the relational models of the subsets can also include assigning a zero relevance to a particular subset if all term pairs of the relational model of the first query are not included in the relational model of the particular subset.

Figure 15:
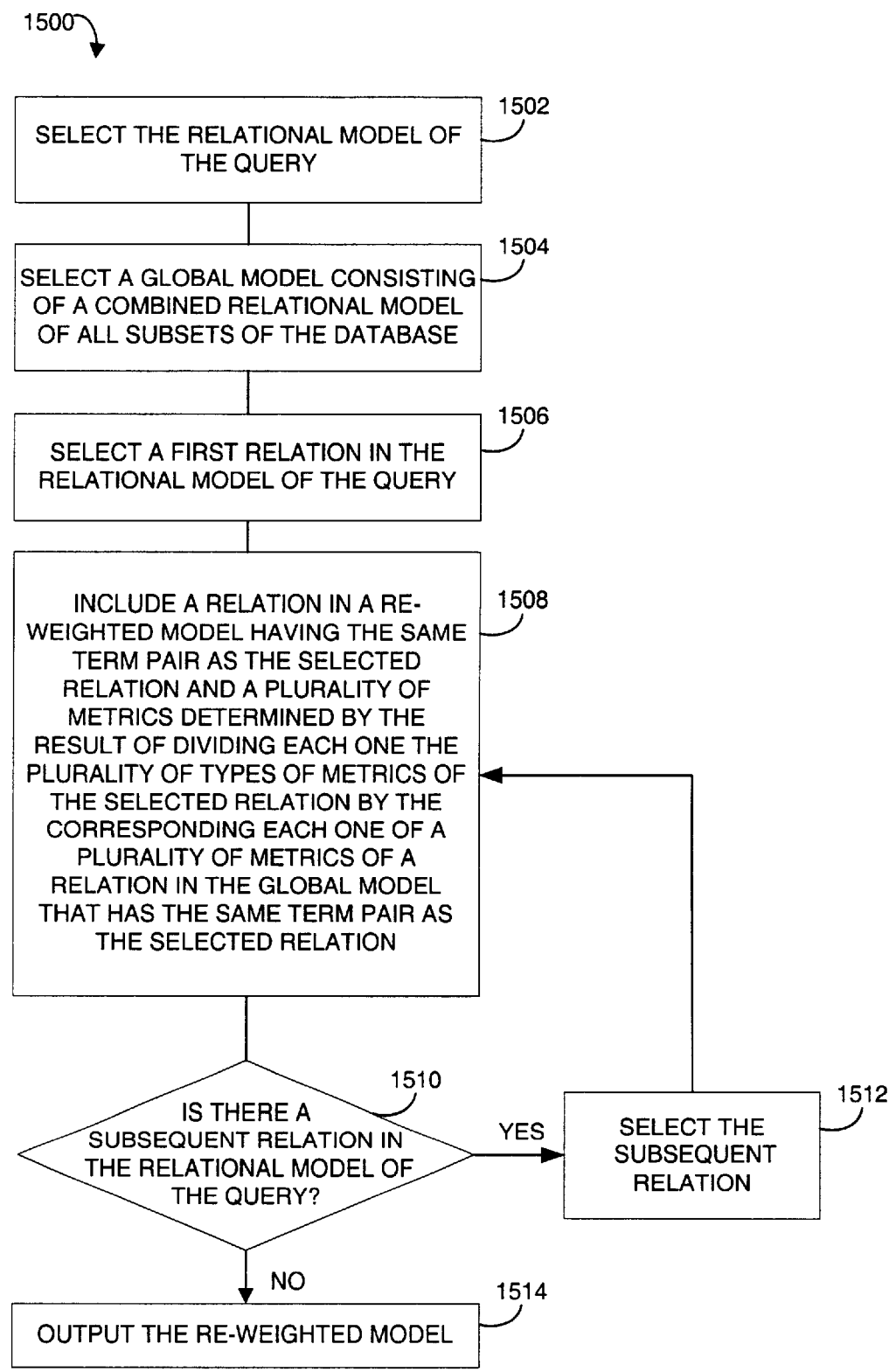
FIG. 15 illustrates one embodiment of a process of re-weighting a query model.

FIG. 15 illustrates one embodiment of a process of re-weighting a query model 1500. First, the query model is selected in block 1502. Then a global model is selected in block 1504. The global model is a model of a large fraction of a database, an entire database, or a number of databases. The modeled database or databases can include a number of subsets that are similar to, or identical to, the subsets to which the query model will be compared. Alternatively, the global model can include a number of relations in common with the selected query model. Next, a first relation in the selected model of the query is selected in block 1506. Next, a relation is included in a re-weighted query model in block 1508. The relation in the re-weighted query model includes the same term pairs as the selected relation. Each one of the corresponding types of metrics of the relation in the re-weighted query model are equal to the result of dividing the corresponding type of metric in the selected relation by the corresponding type of metric in the relation from the global model. The process continues in blocks 1510 and 1512 until all relations in the query model are re-weighted. Then the re-weighted query model is output in block 1514.

The resulting metrics in the re-weighted query models can each be multiplied by the frequencies, within a selected collection of subsets, of each term of the term pair of the relation. Alternatively, the resulting metrics are each multiplied by the frequencies, within a selected collection of query fields, of each term of the term pair of the relation. For another alternative, the resulting metrics are multiplied by the frequency of one of the terms of the term pair.

The primary effect of re-weighting the query model is to reduce the influence of relations that are prominent in large numbers of subsets relative to those that are less prominent in those subsets. This effect is combined with the already present range of influence of relations in the query model, as indicated by the range of magnitudes of the corresponding metrics of the relations, which is a function of the degree of contextual association of those relations in the query. Re-weighting ensures that common and generic relations are reduced in influence in the re-weighted query model relative to less common and less generic relations. For example, the relation between "approach" and "runway" is very common among subsets of the ASRS database, while the relation between "terrain" and "FMS" (flight management system) is much less common. As a consequence, in a re-weighted query model, the relation between "approach" and "runway" would be reduced in influence relative to the relation between "terrain" and "FMS". The additional and optional effect of multiplying by the frequencies of the terms is to favor those relations whose individual terms are more prominent in a particular selected collection of subsets, or within a particular selected collection of query fields. This disfavors relations with terms that are less prominent in the collection, even if the relations are relatively rare among large numbers of subsets.

Many alternative forms of output of the phrase search process are useful, and the alternative forms are similar to those described above in keyword search. A difference in the phrase search output is the determination of metric values associated with the displayed shared term pairs. The output display for phrase search can also include, for each one of the plurality of shared term pairs, 1) displaying a feedback metric of the query (FBM$_{Q1}$) equal to a combination of an LCM$_{Q1}$ and an RCM$_{Q1}$, and 2) displaying a feedback metric of the subset FBM$_{S1}$ equal to a combination of an LCM$_{S1}$ and an RCM$_{S1}$, and 3) displaying a product equal to [FBM$_{Q1}$]*[FBM$_{S1}$]. LCM$_{Q1}$ is equal to a left contextual metric of the shared term pair in the query. RCM$_{Q1}$ is equal to a right contextual metric of the shared term pair in the query. LCM$_{S1}$ is equal to a left contextual metric of the shared term pair in the subset. RCM$_{S1}$ is equal to a right contextual metric of the shared term pair in the subset.

For another alternative embodiment of phrase search, multiple queries can be applied to the phrase search processes described above, with each phrase search query including multiple query fields. The processes of performing multiple queries in phrase search are similar to the processes of performing multiple queries in keyterm search, as described above in keyterm search.

This application is intended to cover any adaptations or variations of the present invention. For example, those of ordinary skill within the art will appreciate that the phrase search process can be executed in varying orders instead of being executed in the order as described above.

The use of phrase search is illustrated below by various searches of the Aviation Safety Reporting System (ASRS) database of incident report narratives. As described below, phrase search easily finds incident narratives in the ASRS database that contain phrases of interest. As examples, and to illustrate some important considerations, several phrase searches are presented here, including: "conflict alert", "frequency congestion", "cockpit resource management", "similar sounding callsign(s)", and "fit crew fatigue". These examples are representative of phrase searches that would be useful to the ASRS.

The simplest phrase search uses a single phrase as the query. This can be helpful when looking for a thing, concept, or action that is expressed using multiple terms, such as "conflict alert." A "conflict alert" is "A function of certain air traffic control automated systems designed to alert radar controllers to existing or pending situations recognized by the program parameters that require his immediate attention/action." (DOT: Air Traffic Control, Air Traffic Service, U.S. Dept. of Transportation, 7110.65C, 1982.)

A search for the narratives that contain the phrase "conflict alert" is simple. The user merely enters the phrase. Phrase search retrieves and displays the most relevant narratives, with instances of the phrase highlighted. An additional output includes the highlighted narratives, a complete list of relevant narratives, and the criterion model used to search the phrase database. The following is one of the most relevant narratives found by phrase search:

THIS ASRS RPT IS ADDRESSED TO THE ARTS IIA CONFLICT ALERT FEATURE USED IN MANY TRACONS IN THE COUNTRY. THIS FEATURE IS DESIGNED TO BE AN AID TO CTLRS IN PREDICTING IMPENDING CONFLICTIONS OF AIR TFC. THE ACTUAL OP OF THE CONFLICT ALERT IS THAT IT DOES NOT ACTIVATE, IN THE MAJORITY OF CASES, UNTIL THE ACFT ARE IN VERY CLOSE PROX OR HAVE ALREADY PASSED EACH OTHER. THE LATEST VERSION (A2.07) BECAME OPERATIONAL LAST MONTH AND THE PROB STILL EXISTS. THE SOFTWARE PROGRAM MUST BE IMMENSE AND I'M SURE THAT IT MUST BE A MONUMENTAL TASK TO DEBUG, HOWEVER, IT MUST BE DONE TO MAKE THE CONFLICT ALERT FEATURE A USABLE TOOL FOR CTLRS. A UCR RPT HAS BEEN SUBMITTED TO THE FAA. THE CONFLICT ALERT IS SUPPOSED TO PROJECT ACFT COURSES AND RATES OF CLB AND ALARM WHEN AN IMMINENT CONFLICT IS DETECTED. MY PAST EXPERIENCES WITH ARTS III AND ARTS IIIA PROVED THIS TO BE THE CASE. UNFORTUNATELY THE ARTS IIA SYS HAS NEVER FUNC-

TIONED AS WELL FROM THE ONSET TO THE PRESENT DAY. ARTS IIA VERSION A2.07 IS CURRENTLY IN USE AND THE CONFLICT ALERT HAS, IN MY ESTIMATION, LIMITED USE TO THE CTLR AS AN AID IN PREDICTING CONFLICTS. IT FUNCTIONS MORE AS AN IMMINENT COLLISION ALERT OR AN 'AFTER THE FACT ALERT' (YOU JUST HAD A DEAL). THE AURAL/VISUAL ALARM DOES NOT ACTIVATE UNTIL THE ACFT ARE IN VERY CLOSE PROX AND IMMEDIATE ACTION IS REQUIRED TO PREVENT A COLLISION, OR THE ACFT HAVE ALREADY PASSED EACH OTHER AND NOTHING CAN BE DONE (EXCEPT TURN YOURSELF IN)! ! THE MAJORITY OF DATA CONCERNING CONFLICT ALERT ALARMS WAS RECEIVED ON ACFT UTILIZING VISUAL SEPARATION METHODS (WHEN THE SEPARATION IS VASTLY REDUCED). THE CONFLICT ALERT FEATURE COULD BE A VALUABLE SEPARATION TOOL FOR THE CTLR IF IT WERE TO OPERATE AS DESIRED. THIS SHORTCOMING MUST HAVE SURFACED IN THE TESTING OF ARTS IIA BEFORE GOING OPERATIONAL. I ASSUME 'DEBUGGING' A PROGRAM OF THIS SIZE MUST BE A MONUMENTAL TASK AND THIS IS WHY I HAVE WAITED THIS LONG TO INITIATE THE PAPERWORK. VERSION A2.07 WAS JUST RELEASED IN AUGUST AND THERE WAS NO CHANGE IN THE OP OF THE CONFLICT ALERT FEATURE. (251367)

Since the phrase "conflict alert" is found in exactly the form of the query, and since there are many occurrences of the phrase, this narrative is considered to be highly relevant.

A search for the narratives that contain the phrase "frequency congestion" is also simple. Inputting the phrase "frequency congestion" initiates the phrase search. In the keyterm search described above on "frequency" and "congestion", however, multiple forms of the phrase "frequency congestion" were found in the ASRS database and others are possible. The forms include:

FREQ CONGESTION
FREQ CONGESTED
CONGESTION FREQ
CONGESTED FREQ
FREQS CONGESTION
FREQS CONGESTED
CONGESTION FREQS
CONGESTED FREQS

If the user provides these phrases as the query, phrase search finds the narratives that contain one or more of them, then displays the most relevant narratives, with instances of the phrase highlighted. The following is one of the highly relevant narratives retrieved by phrase search:

WE WERE CLRED A CIVET 1 ARR TO LAX. THE ARR ENDS AT ARNES AT 10000 FT WITH THE NOTE 'EXPECT ILS APCH.' WE WERE SWITCHED TO APCH CTL AROUND ARNES. THERE WAS AN ACFT COMING BACK TO LAND AFTER TKOF AND THUS THE FREQ WAS CONGESTED. WE WERE BLOCKED ON SEVERAL ATTEMPTS TO CONTACT APCH CTL AND WERE UNABLE TO CHK IN. WE CONTINUED OUR DSCNT MEETING THE ALT CONSTRAINTS FOR ILS RWY 25L. SOMEWHERE AFTER 'FUELR,' APCH CTL CALLED US AND TOLD US TO LEVELOFF AT 7000 FT AND THAT WE WERE ONLY CLRED TO 10000 FT. THE QUESTION IS, 'IF YOU ARE UNABLE TO CONTACT APCH CTL, ARE YOU IN A LOST COM SIT?' IF YOU LEVELOFF AT ARNES, YOU VERY QUICKLY FIND YOURSELF TOO HIGH TO LAND. DO YOU FLY ALL THE WAY TO THE ARPT AT 10000 FT OR DO YOU FLY THE ILS APCH? IS FREQ CONGESTION A LEGITIMATE LOST COM SIT? CALLBACK CONVERSATION WITH RPTR REVEALED THE FOLLOWING INFO: RPTR SENT 2 CAPT RPTS TO HIS COMPANY QUESTIONING THE PROC, BUT AS YET, NO ANSWER. HE WAS NOT SURE WHAT WAS HIS CLRNC LIMIT BECAUSE THE CIVET 1 ARR ENDS AT ARNES WITH A NOTE TO 'EXPECT ILS APCH.' THE RPTR THOUGHT THAT PERHAPS WHEN UNABLE TO OBTAIN APCH CLRNC PRIOR TO ARNES AND IF IT WAS A CLRNC LIMIT, THEN HE SHOULD ENTER HOLDING AS DEPICTED ON THE CHART. TO CLARIFY, THE SOCAL APCH CTLR SUPVR WAS CONTACTED AND HE SAID THAT THE ACFT WAS CLRED TO THE ARPT AS PART OF THE ORIGINAL CLRNC AND THAT THE ARR IS NOT A CLRNC LIMIT. ALSO, THAT THE ACFT MUST MAINTAIN THE LAST ASSIGNED ALT AND, IF APCH CTLR MESSES UP AND DOESN'T GIVE THE APCH CLRNC, THEN THE ACFT IS EXPECTED TO MAINTAIN ALT AND CONTINUE INBOUND ON THE LOC COURSE. THE SUPVR SAID THAT THE ACFT DEFINITELY SHOULD NOT ENTER HOLDING, BUT CONTINUE INBOUND AT THE LAST ASSIGNED ALT. (306082)

The above narrative is relevant because it contains two of the query phrases. One is in exact form ("FREQ CONGESTION") and one is nearly in exact form ("FREQ WAS CONGESTED").

A search for the narratives that contain the phrase "cockpit resource management" is simple, but it raises two issues. First, the ASRS uses many abbreviations, and the term "management" is one of the terms abbreviated. To save the user from having to know the abbreviations, phrase search maps terms to ASRS abbreviations as described above. The second issue raised by a search for narratives containing the phrase "cockpit resource management" is the fact that the phrase has more than 2 terms. As a consequence, the phrase search can retrieve narratives containing only part of the phrase. The default, however, is to require that the whole phrase be present in each retrieved narrative.

Inputting the phrase: "cockpit resource management" initiates the phrase search. Phrase search maps the vocabulary of the phrase to the vocabulary of the ASRS narratives. In this case, the result is "cockpit resource mgmnt", and this phrase is used as the actual query phrase. Phrase search then retrieves the narratives containing the phrase "cockpit resource mgmnt", and the most relevant narratives are displayed with all instances of the phrase highlighted. The following is an example:

COPLT'S BRASH ATTITUDE HAD BEEN A SORE SPOT WITH ME ALL MONTH AND REPEATED DISCUSSION WITH HIM HAD FAILED TO ACHIEVE ANY RESULTS. ALTHOUGH I NOTICED EARLY ON THAT HIS PLTING SKILLS DIDN'T JUSTIFY HIS CONFIDENCE LEVEL AND I HAD RECOGNIZED THE NEED TO CONTINUALLY MONITOR HIS PERF, I HAD TO TAKE MY EYES OFF OF HIM FOR ABOUT 2 MINS (2 MINS!!). IN THAT PERIOD OF TIME HE

DEVIATED OFF OUR RTING BY ABOUT 8 MI PROMPTING AN INQUIRY FROM ZAU. THE FO'S ATTITUDE WAS 'OK, I MADE A MISTAKE—SO WHAT?' I BELIEVE (DUE TO INTERACTING WITH THIS INDIVIDUAL ON PREVIOUS TRIPS) THAT HE FELT HIS ROLE IN THE COCKPIT WAS ONE OF DECISION MAKER. ALTHOUGH I EXPLAINED TO HIM THAT WE WERE A TEAM, AND EACH MEMBER OF THE TEAM WAS ESSENTIAL TO OUR SAFETY, IT IS IN THE CAPT'S JOB DESCRIPTION AS BEING THE FINAL AUTHORITY AS TO THE OP OF THE FLT. WITH THE ADVENT OF COCKPIT RESOURCE MGMNT I'VE NOTICED A TENDENCY WITH SOME FO'S TO IGNORE THE FACT THAT THERE IS A HIERARCHY WITHIN THE COCKPIT, TO THE POINT OF CONSIDERING THEMSELVES AUTONOMOUS (AS IN THIS EXTREME CASE). WHILE THE INTENT OF COCKPIT RESOURCE MGMNT IS OK, I MUST SAY THAT THE CREW'S RELATIONSHIP WITH THE CAPT IS ONE OF ORDINATE-SUBORDINATE, AND COCKPIT RESOURCE MGMNT TENDS TO OVERLOOK OR MINIMIZE THIS CONCEPT. IF MY ASSESSMENT IS CORRECT, COCKPIT RESOURCE MGMNT SHOULD BE MODIFIED TO REFLECT THE REALITIES OF LINE OPS. (222230)

The narratives considered to be the most relevant are the ones that have the best and the most matches to the query phrase. Phrase search can optionally provide narratives that contain only a fragment of the phrase, such as "resource management". In that case, narratives containing only fragments of the phrase would be added at the bottom of the list of relevant narratives. The following are some example excerpts from narratives containing only fragments of the phrase "cockpit resource management":

THIS AIRLINE HAS EXERTED A LOT OF ENERGY TO PROMOTE CREW RESOURCE MGMNT, BUT ALL OF MY EFFORT TO PROVIDE USEFUL INPUT FAILED. ALL DURING THIS INCIDENT I WAS WELL AWARE OF PREVIOUS ACCIDENTS IN WHICH NO ONE CHALLENGED THE CAPT AS HE MADE IMPROPER DECISIONS. I WANTED TO MAKE SURE THAT THIS WOULD NOT HAPPEN DUE TO MY INACTION. I DISCOVERED MY LIMITATIONS IN THE FACE OF A CAPT WHO MADE IMPROPER DECISIONS. (279099)
FO IS LOW TIME AND [CAPT] ADMITS HE EXERCISED POOR COCKPIT MGMNT. SHOULD HAVE INSISTED THAT FO HELP WITH TAXI VIGILANCE. (202096)
. . . NEW HIRES OFTEN BITE THEIR TONGUES RATHER THAN CONFRONT CAPTS ABOUT COCKPIT CREW MGMNT PROBS, BECAUSE OF THE POSSIBILITY OF A NEGATIVE EVALUATION BEING SENT TO THE COMPANY, WHICH COULD EFFECT YOUR BEING KEPT ON THE JOB BEYOND PROBATION. MY RELUCTANCE TO WORK THIS OUT CAUSED ME TO PUT UP WITH A COCKPIT ENVIRONMENT THAT WAS LESS THAN SATISFACTORY. (143981)
LACK OF TRAINING COVERING COCKPIT MGMNT RESOURCES. (206734)
COCKPIT RESOURCES MGMNT HAS HELPED IN THE ACFT; MAYBE MORE PERSONAL CONTACT BTWN ATC AND PLTS WOULD DO THE SAME. (141625)

The benefit of matching phrase fragments is that a greater number of relevant reports can be found, even when the author of the narrative didn't get some standard phrase exactly right. Some of these reports can be highly relevant to the topics of interest.

A search for the narratives that contain the phrase "similar sounding callsign" raises three issues. The first issue is that the ASRS uses various forms of some terms and phrases. Sometimes "call sign" is used, while other times "callsign" is used. Similarly, "descent" is sometimes abbreviated as "dscnt" while other times it is "dsnt". And there are other such examples. To achieve consistency, phrase search standardizes usage in the database and also in the query. This is accomplished using the same mapping technique that is applied to handle ASRS abbreviations. That is, the various forms of some terms are mapped to standard forms. Since "call sign" is more common, that is the form used consistently by phrase search. Thus, "callsign" is mapped to "call sign". Similarly, "callsigns" is mapped to "call signs".

The second issue involves singular and plural forms of phrases. Specifically, if a singular form is specified in the input, the plural form is often of interest as well, and vice versa. In this case, narratives containing the phrase "similar sounding call sign" (singular), "similar sounding call signs" (plural), or both might be of interest. Phrase search can require the user to input all forms of a phrase that are to be used as a query.

The third issue raised by this search involves phrase search's ranking of narratives when searching for long and/or multiple phrases. In the case of "similar sounding call sign(s)", some narratives will contain both singular and plural forms of the phrase. Some narratives will contain only one of the forms. Some narratives will contain only fragments, such as "similar call sign", or "call signs". Phrase search's rank ordering of narratives containing these various forms is done in the order just described, as will be shown. This is a useful order, as it is in accordance with an intuitive sense of what constitutes a good match to the query phrases. The following are excerpts from some of the most relevant narratives:

BECAUSE WE HAD BEEN ON TWR FREQ FOR SO LONG, WE HAD NO AWARENESS OF THE OTHER ACFT WITH A SIMILAR CALL SIGN . . . THE FOLLOWING ARE CONTRIBUTING FACTORS. SIMILAR SOUNDING CALL SIGNS . . . DURING SIMULTANEOUS INTERSECTING RY DEPS, EXTREME CARE SHOULD BE TAKEN WITH ACFT HAVING LIKE CALL SIGN . . . THEY HAD MISUNDERSTOOD TKOF CLRNC FOR AN ACFT WITH A SIMILAR SOUNDING CALL SIGN, ON ANOTHER RWY. (198106)
WHILE INBOUND TO DTW METRO ARPT FROM KALAMAZOO, Mich., ON COMPANY XX50 THERE WERE 2 OTHER COMPANY FLTS: COMPANY XX53 AND COMPANY X50 WITH SIMILAR SOUNDING CALL SIGNS AS OURS . . . APPARENTLY WE WERE FOLLOWING A CLRNC FOR AN ACFT OF A SIMILAR SOUNDING CALL SIGN. I DID READ BACK THE ORIGINAL CLRNC WITH OUR OWN CALL SIGN, HOWEVER. THERE WAS MUCH CONFUSION WITH SIMILAR CALL SIGNS. (192640)
I VERIFIED THE ALT AND FREQ AS BEING CORRECT BUT DID NOT CATCH THE CALL SIGN . . . ALTHOUGH I DID NOT CLARIFY THE CORRECT CALL SIGN . . . I CANNOT IMAGINE WHY ANY PLT WOULD CLB WITHOUT QUESTION WHEN HE HAD JUST BEEN ISSUED 2 CONVERGING TARGETS AT ALTS ABOVE HIM . . . WE WERE INFORMED BY OUR UNION SAFETY CHAIRMAN THAT WE HAD ACCEPTED THE 13000 FT CLB AND FREQ CHANGE FOR ANOTHER FLT, ACR X, WITH A SIMILAR SOUNDING CALL SIGN . . . CORRECTIVE ACTION: REDUCE, IF NOT ELIMINATE, SIMILAR SOUNDING CALL SIGNS. (255236)

HE THEN STATED HE HAD ANOTHER COMPANY WITH A SIMILAR SOUNDING CALL SIGN ON THE FREQ . . . THIS SAME CTLR WAS ALSO WORKING 2 OTHER PAIRS OF OUR COMPANY FLTS WITH SIMILAR CALL SIGNS . . . MULTIPLE FLTS WITH SIMILAR SOUNDING SIGNS IN TODAY'S CONGESTED ATC ENVIRONMENT IS DANGEROUS, AND OUR COMPANY HAS A BAD PRACTICE OF DOING THIS. I BELIEVE THEY DO IT FOR MARKETING REASONS, BUT RUNNING BANKS OF FLTS INTO A HUB AT PEAK HRS WITH SIMILAR SOUNDING CALL SIGNS IS NOT A GOOD PRACTICE, AND SHOULD BE STOPPED, THUS HELPING TO AVOID SOMEONE FROM MISUNDERSTANDING AND TAKING SOME OTHER FLT'S CLRNC. THIS HAS THE POTENTIAL TO CREATE A VERY SERIOUS SIT. THIS CALL SIGN USAGE BY OUR COMPANY HAS RAISED THE IRE OF MANY PLTS, BUT OUR COMMENTS AND COMPLAINTS HAVE FALLEN ON DEAF EARS AT THE COMPANY. (236716)

THIS WAS A SIMILAR ENOUGH SOUNDING CALL SIGN THAT I BELIEVE SOME EFFORT SHOULD BE MADE TO DISTINGUISH BTWN THEM . . . FLT #S SHOULD BE READ READ DIGIT BY DIGIT AND WARNINGS SHOULD BE ISSUED FOR SIMILAR SOUNDING CALL SIGNS. (173196)

PROBS THAT NEED TO BE IDENTED: TOO MANY SIMILAR SOUNDING CALL SIGNS BY SAME COMPANY IN SAME VICINITY AT THE SAME TIME . . . NO ONE HAD SAID THERE WAS AN ACFT ON FREQ WITH A SIMILAR CALL SIGN AND WE HAD HEARD NO CALLS TO COMPANY ACR. WHEN THE FIRST CALL WAS MADE, THE FO WAS DISTR BY A FLT ATTENDANT IN THE COCKPIT ASKING ABOUT THE TEMP OF THE CABIN AND HE DID NOT HEAR THE CALL SIGN READ BY CTR. SUPPLEMENTAL INFO FROM ACN 224896: OUR CALL SIGN SAME COMPANY ACR SIMILAR TO ACR X . . . (224992)

The narratives considered the most relevant to multiple query phrases are the ones that best match, in whole or in part, the query phrases. The following observations illustrate the quality of the phrase matches relative to the rank ordering of the narratives. The narratives ranked 1–4 contain both of the query phrases: "similar sounding call sign" and "similar sounding call signs". Phrase fragments are also found in these narratives, including one or more of: "similar call sign(s)", "similar sounding sign(s)", or "call sign(s)". Narratives ranked 5–86 contain one or the other of the query phrases: "similar sounding call sign"or "similar sounding call signs". Narratives in this group usually also contain one or more of the phrase fragments: "similar call sign(s)" or "call sign(s)". Less common additions include: "similar enough sounding call sign", "similar to the call signs", "similar acft call signs", "similar-sounding but incorrect ident", and "like sounding call signs".

Narratives ranked 87–91 contain one of the following: "similar sounding call sign", "similar sounding call signs", one of those phrases but with inclusions, or a collection of phrase fragments that, taken together, conveys the notion of "similar sounding call sign(s)". For example, the 87th narrative contains only "similar sounding acft call signs", and the 88th contains only "similar sounding fit numbers", "wrong call sign", and "similar call signs". Narratives 92–181 do not contain the whole phrase. Most of them (83) contain the fragment "similar call sign(s)", usually with some other fragments such as "call sign(s)" or "similar sign(s)". The other seven narratives include fragments containing "sounding" but not "similar", e.g., "close sounding or transposable call signs". Narratives 182–200 contain only the fragments "similar call sign(s)" or "call sign(s)". Narrative 182 is the highest-ranking narrative that contains only the fragment "call sign(s)". Most of the many narratives beyond the 200th in rank contain only "call sign(s)".

In summary, the rank ordering of the narratives provided by phrase search for long, multiple query phrases is appropriate. The highest ranked narratives (1–86) contain one or more instances of the query phrases "similar sounding call sign" and "similar sounding call signs" , while a transition group (87–91) at least conveys the notion of the query. The next large group (92–181) mostly contains "similar call sign(s)", which is more general than "similar sounding call sign(s)", but represents the next best match to the query. These are followed by a large group of narratives (increasingly common beginning with 182) that contain only "call sign(s)", which is more general than "similar call sign(s)", but represents the next best match to the query. The following Table 2.3 lists the accession numbers of the 91 ASRS incident reports that are most relevant to the phrase "similar sounding callsign(s)":

TABLE 2.3

| | | | |
|---|---|---|---|
| 1. 236716 | 25. 165761 | 49. 342497 | 73. 178788 |
| 2. 192640 | 26. 93653 | 50. 94979 | 74. 82543 |
| 3. 198106 | 27. 202997 | 51. 339600 | 75. 325390 |
| 4. 255236 | 28. 150627 | 52. 90769 | 76. 249352 |
| 5. 173196 | 29. 374529 | 53. 152083 | 77. 328055 |
| 6. 144720 | 30. 347810 | 54. 142766 | 78. 248464 |
| 7. 273139 | 31. 351689 | 55. 217142 | 79. 135501 |
| 8. 269000 | 32. 343860 | 56. 230971 | 80. 330230 |
| 9. 95030 | 33. 142569 | 57. 160848 | 81. 192059 |
| 10. 310278 | 34. 144569 | 58. 308996 | 82. 160883 |
| 11. 224992 | 35. 89654 | 59. 307837 | 83. 262477 |
| 12. 249451 | 36. 139469 | 60. 306664 | 84. 105298 |
| 13. 370586 | 37. 136784 | 61. 282179 | 85. 133520 |
| 14. 143173 | 38. 334890 | 62. 112496 | 86. 266870 |
| 15. 366360 | 39. 332500 | 63. 276472 | 87. 108119 |
| 16. 139993 | 40. 210935 | 64. 109765 | 88. 85247 |
| 17. 104418 | 41. 146441 | 65. 273212 | 89. 92664 |
| 18. 333433 | 42. 206733 | 66. 286220 | 90. 217637 |
| 19. 246229 | 43. 86887 | 67. 173641 | 91. 266124 |
| 20. 361796 | 44. 158878 | 68. 298130 | |
| 21. 364467 | 45. 246471 | 69. 299673 | |
| 22. 259010 | 46. 201843 | 70. 120463 | |
| 23. 337485 | 47. 343091 | 71. 304066 | |
| 24. 268344 | 48. 342960 | 72. 304370 | |

The results of searching for the phrase "flight crew fatigue" are less than satisfactory due to the small number of matched narratives. Only 8 of 67821 ASRS reports contain the phrase "fit crew fatigue". This small number does not, however, reflect the true prevalence of narratives involving flight crew fatigue. As an alternative, the search can be limited to the phrase "crew fatigue". A larger number of narratives contain "crew fatigue". Among 67821 ASRS reports, a total of 102 narratives contain "crew fatigue", and an additional 9 contain phrases such as "crew's fatigue", "crew member fatigue", or "crew mental fatigue". This does not, however, reflect the true number of narratives on the subject.

Rather than doing a phrase search in this case, a keyterm search on "fatigue" would be more effective. Even better would be a search on "fatigu", which would match "fatigue", "fatigued", and "fatiguing". To increase the probability that the retrieved narratives involve flight crew fatigue, the search can be limited to the subset of the reports that were submitted by flight crews. In a keyterm search on "fatigu" among 36361 reports submitted by the flight crews of large aircraft there were 743 relevant narratives. A search among 67821 ASRS reports of all kinds found 1364 narratives relevant to "fatigue", "fatigued", or "fatiguing".

Narratives that contain the topic of fatigue do not necessarily contain the terms "fatigue", "fatigued", or "fatiguing". Phrase discovery, described below, more fully addresses this issue. Phrase discovery finds a large number of fatigue-related phrases such as "duty time", "crew rest", etc. The process of finding these phrases also finds ASRS reports that contain the topic of fatigue even if no forms of the term "fatigue" are present in the narratives.

Phrase search can also be used to search for a particular sentence that occurs only once in the database. Since phrase search represents phrases implicitly among the contextual relations of the documents, rather than explicitly as a pre-computed list, it is possible to find any phrase, or other sequence of terms, even if it occurs only once. In addition, even though contextual relations in the phrase database are limited in one embodiment to spans of 4 terms, indirect chains of relations allow longer phrases to be found. As an example, the following sentence can be used as a query:

THE ENTIRE CREW WAS DISTR, AND WE BOTH FAILED TO MONITOR THE PERF OF THE ACFT.

As an alternative, the following unabbreviated form of the sentence can be used as the query:

The entire crew was distracted, and we both failed to monitor the performance of the aircraft.

Given either query, phrase search identifies the relevant narrative and displays it with the relevant sections highlighted. Shown below is an excerpt. The query sentence is highlighted, as are additional fragments of the sentence.

I BELIEVE THAT THE COMPLEXITY OF FMS PROGRAMMING IS NOT ADDRESSED IN INITIAL TRAINING AT SCHOOL BECAUSE EACH ACFT HAS DIFFERENT EQUIP. HOWEVER, THIS LEAVES THE FLT CREW TO 'LEARN AS THEY FLY.' THIS EFFECTIVELY TOOK MY FO OUT OF THE LOOP IN THAT IF HE WAS PROGRAMMING THE FMS, I COULD HAVE CONCENTRATED MORE ON MONITORING THE ACFT. I SHOULD HAVE LET THE FO FLY THE ACFT WITH THE AUTOPLT RATHER THAN ME DO ALL THE TASKS. THE ENTIRE CREW WAS DISTR, AND WE BOTH FAILED TO MONITOR THE PERF OF THE ACFT. I SHOULD HAVE JUST PUT MY HSI IN THE VOR MODE RATHER THAN DISPLAY FMS COURSE INFO. THIS WOULD HAVE ALLOWED US TO FOCUS MORE ON THE ACFT. (368360)

By doing the search using the option to include narratives containing only some of the fragments of the sentence, some near-matches can also found. These are ranked as less relevant than the one containing the whole sentence. Here are excerpts from narratives containing only fragments of the sentence:

I WAS DISTR BY THE CAPT'S CONVERSATION AND WE BOTH FAILED TO MONITOR THE ACFT'S DSCNT. (265142)

WHILE WE CONTINUED TO WONDER WHY THE DSCNT DID NOT OCCUR AS PROGRAMMED, IT WAS OBVIOUS THAT WE HAD BOTH FAILED TO MONITOR THE DSCNT, AS WE SHOULD HAVE. (253696)

WE WERE CLRD FOR THE OXI 2 ARR, FWA TRANSITION TO ORD, FO FLYING THE ACFT . . . ALTHOUGH WE HAD TUNED THE OXI 095 DEG RADIAL FOR THE TURN AT SPANN INTXN, WE FAILED TO TURN BECAUSE OF OUR DISTR . . . THE FO AND I DO NOT BELIEVE THAT WE MISSED A RADIO CALL, EVEN THOUGH WE WERE DISTR AND WERE OFF COURSE . . . I BELIEVE THAT MY FAILURE TO MONITOR THE FO'S NAV WHILE I INVESTIGATED POSSIBLE ACFT ABNORMALITIES WAS THE MOST IMPORTANT CONSIDERATION IN THIS OCCURRENCE. (201659)

This example shows the ability of phrase search to find long or rare phrases, while also finding similar text if desired.

Most phrase search and retrieval methods that currently exist, such as Fagan (1987), Croft, Turtle, and Lewis (1991), Gey and Chen (1997), Jing and Croft (1994), Gutwin, Paynter, Witten, Nevill-Manning, and Frank (1998), and Jones and Staveley (1999), treat query phrases as single terms, and typically rely on lists of key phrases for each document. This approach allows little flexibility in matching query phrases with similar phrases in the text, and it requires that all possible phrases be identified in advance, typically using statistical or "natural language processing" (NLP) methods. In contrast, the phrase search method described herein represents phrases implicitly among contextual associations representing each document. This allows both exact matching of phrases and the option of flexible matching of phrases. In addition, the phrase search method eliminates the need for explicit and inevitably incomplete lists of phrases.

Since phrase search does not depend on phrase frequency, such as in Turpin and Moffat (1999), phrase search is not hampered by the infrequency of most phrases, which reduces the effectiveness of statistical phrase search methods. Since phrase search does not use NLP methods, it is not subject to problems such as mistagging as described by Fagan (1987).

Croft, Turtle, and Lewis (1991) dismiss the notion of implicitly representing phrases as term associations, but the association metric they tested is not as definitive as that described herein. Unlike phrase search, pair-wise associations of Croft, Turtle, and Lewis (1991) do not include or suggest a measurement of degree of proximity. Further, while phrase search restricts the scope of acceptable contexts to a few words and enforces term order, the association method of Croft, Turtle, and Lewis (1991) uses entire documents as the contextual scope, and uses no directional information.

Finally, unlike typical Internet search tools, phrase search can easily use large numbers of phrases as query phrases.

Phrase Generation

The use of any phrase search tool requires the user to know or guess what phrases are likely to be in the database being searched. Phrase generation as described herein, and phrase discovery (described below) are two processes that can show the phrases that are likely to be useful queries. In addition, phrase generation and phrase discovery can also help the user to explore and understand the particular nuances of topics in the database.

Phrase generation differs from phrase discovery. Phrase generation assembles phrases from term pairs that are often found in a particular order and close together in the narratives of a database. That is, the phrases are assembled from phrase models. Many of the generated phrases are present in the narratives. Phrases are listed in order of their estimated frequency in the whole database. Phrase generation is a useful way of building phrases that are typically present, without actually storing and retrieving the phrases themselves. In contrast, phrase discovery scans narratives for all possible phrases and distills them down to those which are contextually relevant.

Phrase generation is used to show typical phrases that contain words or phrases of interest. The default is to produce the 10 most typical phrases, but a different number of phrases can also be specified. The output phrases can be used as query phrases for input to a phrase search described above or simply as a list of phrases representing the database.

Figure 16:
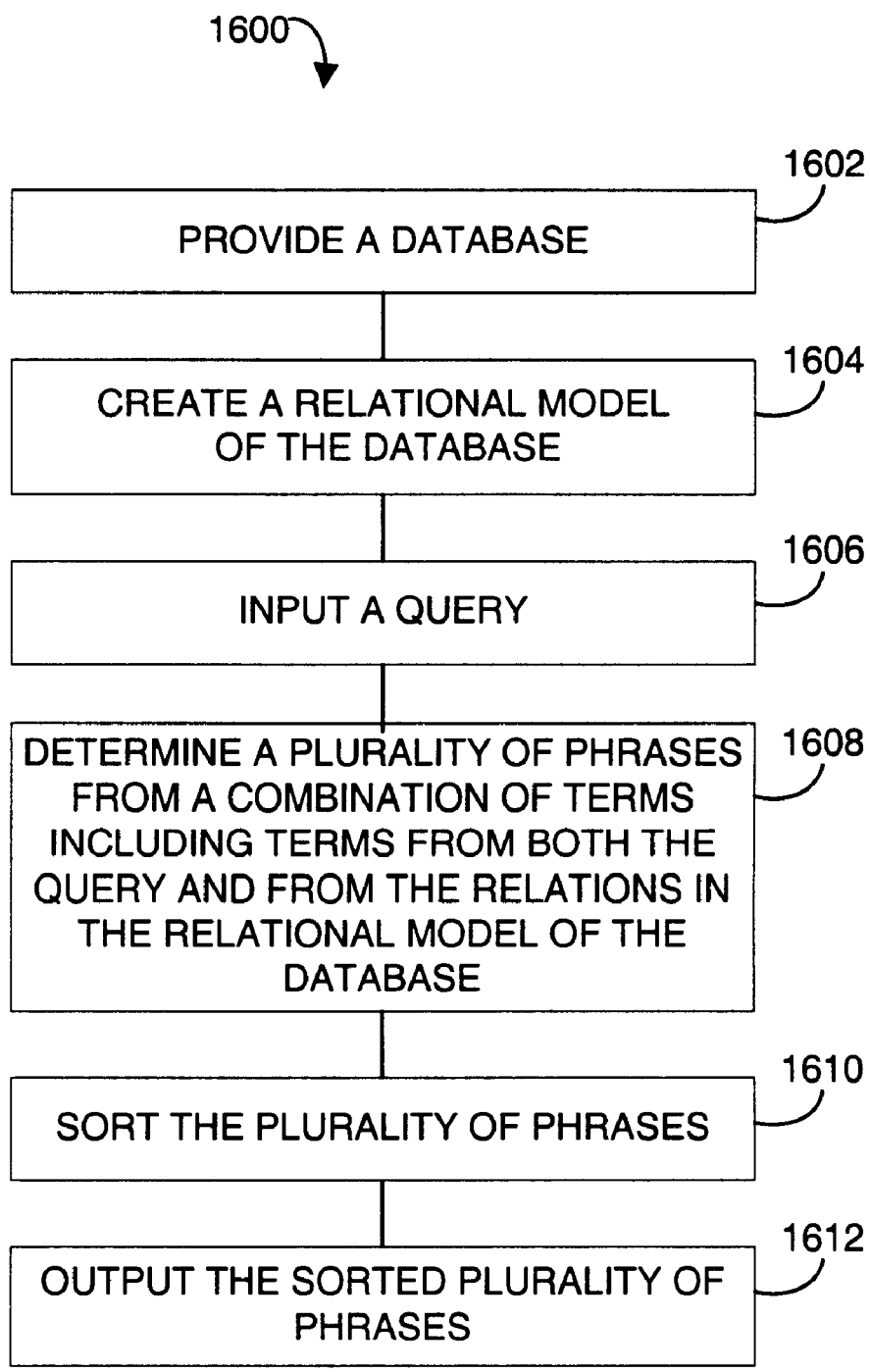
FIG. 16 shows one embodiment of generating phrases from a database of text.

Phrase generation is a method of generating sequences of terms (herein called phrases) that are likely to be present within a database consisting of a collection of one or more longer sequences of terms, such as text. FIG. 16 shows one embodiment of generating phrases from a database of text 1600. First, a database is provided in block 1602. A relational model of that database is created in block 1604. The relational model of the database can include or, alternatively, exclude stopterms. Then, a query is input in block 1606. The query includes a term or a phrase or multiple terms or multiple phrases or a combination thereof. Inputting the query can also include transforming the query as described above in keyterm search. Next, in block 1608, a number of phrases are determined from a combination of terms including terms from both the query and from the relations in the relational model of the database that are contextually related to the query. The phrases are sorted in block 1610 and output in block 1612. In one alternative, the output phrases can exclude stopterms. In another alternative, the output phrases can include any number of stopterms. In yet another alternative, the output phrases can be limited to phrases having no more than a pre-selected number of stopterms.

The process of determining the phrases in block 1608, wherein terms in relations in the database model are contextually related to the query, can also be an iterative process. The iterative process initially uses the input phrases (where an input phrase can include one or more terms) as the starting phrases. A first copy of each starting phrase is extended by adding an appended term before the first copy of the starting phrase, if, for each term in the starting phrase, there is a corresponding non-zero-weighted directional contextual relation in the database model that includes both the appended term and the term in the starting phrase. In addition, a second copy of each starting phrase is extended by adding the appended term following the second copy of the starting phrase if, for each term in the starting phrase, there is a corresponding non-zero-weighted directional contextual relation in the database model that includes both the term in the starting phrase and the appended term.

A weight of each extended phrase is based on the metric values of the relations within the extended phrase. In one alternative, the weight of a phrase is equal to the least of the corresponding non-zero-weighted directional contextual metrics between the terms in the starting phrase and the appended term. Each extended phrase and the corresponding weight of the extended phrase are collected for later output. In a subsequent iteration, copies of the extended phrases are used as the starting phrases for further extension as described above. In one alternative, the process continues until all possible phrases, given the query and the relations in the model of the database, have been determined. In another alternative, the process continues until all possible phrases of a pre-selected maximum phrase length have been determined. The determined phrases are then output. In one alternative, a pre-selected number of the determined phrases are output. In another alternative, determined phrases having weights of at least a pre-selected magnitude are output.

Each output phrase can represent a concise summary of multiple similar phrases by representing the essence of the multiple similar phrases, as shown in the following example. Given an input of "runway" to the phrase generation process, and allowing one stopterm (e.g. to, the, our, their, other, on, an) in the output phrases, one of the output phrases is "approach to runway". The phrase "approach to runway" represents multiple similar phrases such as: "approach to runway", "an approach to the runway", "on approach to our runway", and "their approach to the other runway". When the output phrase "approach to runway" is provided as a query phrase to a phrase search process, as described above in FIGS. 11–15, the flexible phrase matching capability of phrase search enables the retrieved subsets of the database to include such phrases as "approach to runway", "an approach to the runway", "on approach to our runway", and "their approach to the other runway". Thus the output phrase "approach to runway" represents a concise summary of the multiple similar phrases.

Creating a relational model of a database in block 1604 can include providing a subset of relations in the database model. In one alternative, the entire set of relations in the database model can be provided. In another alternative, relations in the database having a function of the corresponding relational metric values greater than or equal to a threshold value can be provided. In another alternative, the function of the relational metric values is the smaller of the left contextual metric (LCM) value and the right contextual metric (RCM) value. In another alternative, the function of relational metric values is equal to the non-directional contextual metric (NDCM) value. In another alternative, the threshold value can be automatically adjusted so that a pre-selected number of phrases are output.

The entire process of phrase generation 1600 can also be an iterative process wherein a number of the phrases that are output in one iteration can be the input to a subsequent iteration.

Figure 17:
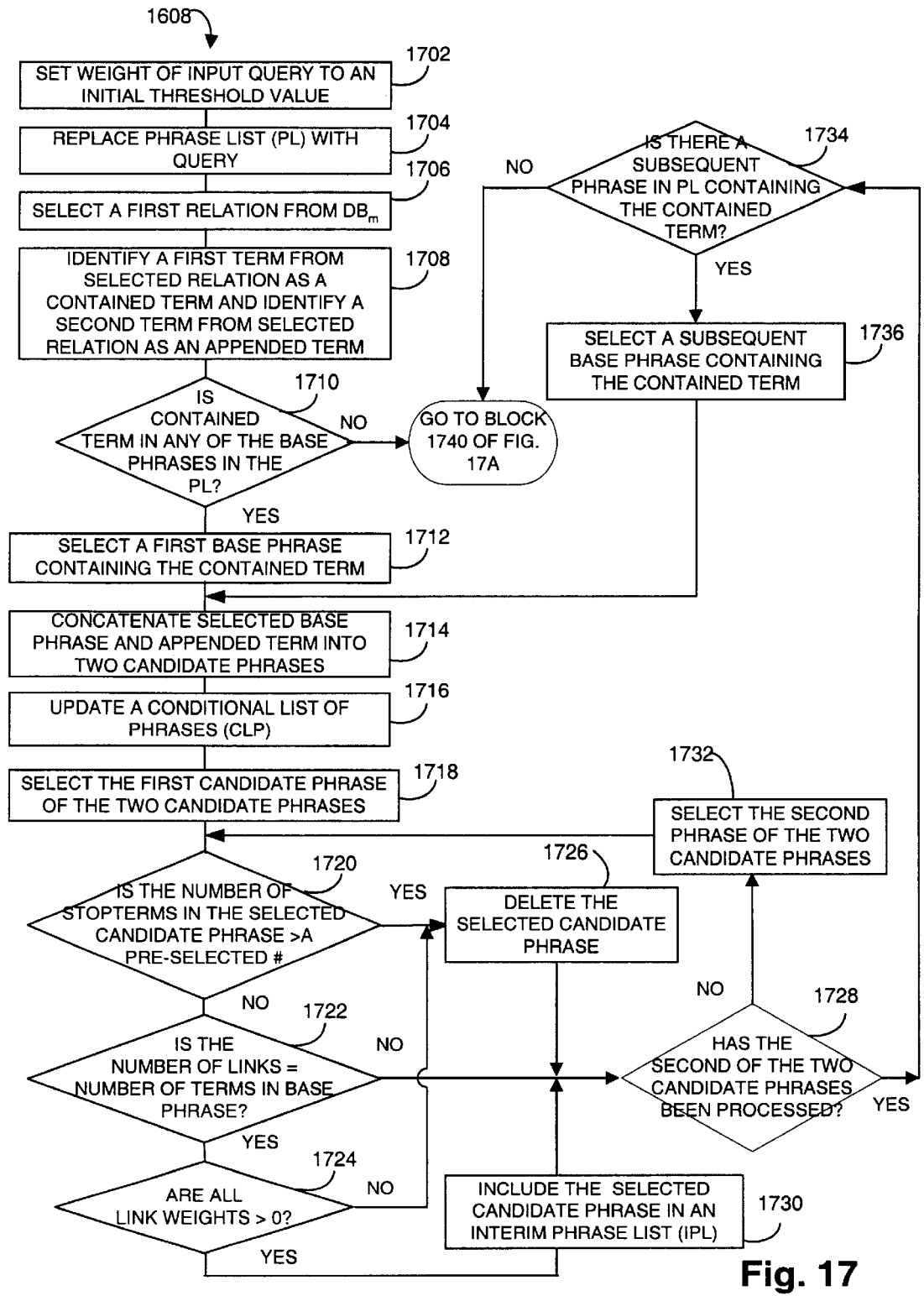
FIGS. 17 and 17A illustrate a process of determining the phrases, which are contextually related to the query, from the model of the database such as in block 1608 of FIG. 16.
Figure 17A:
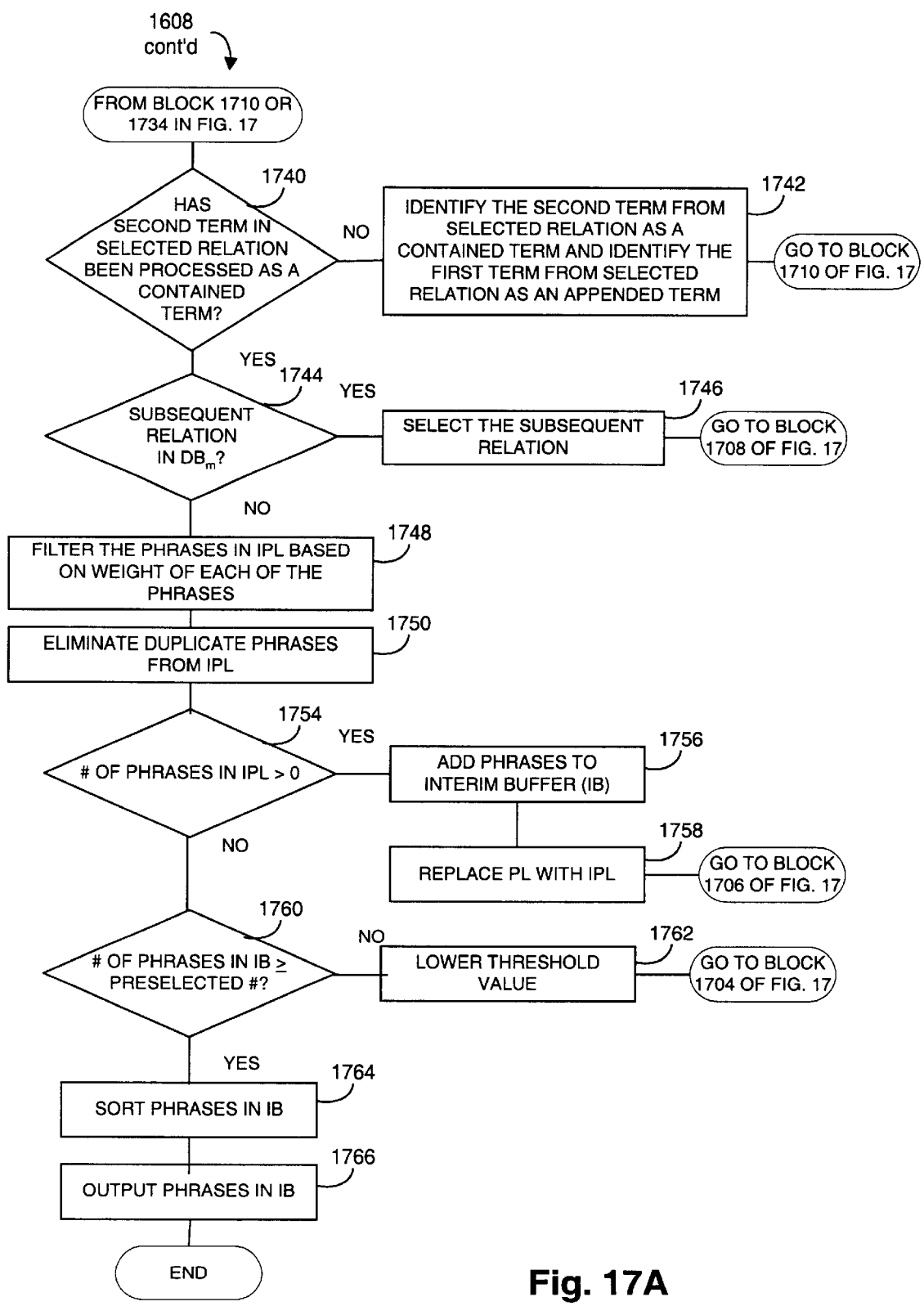

FIGS. 17 and 17A illustrate a process 1608 of determining the phrases, which are contextually related to the query, from the model of the database such as in block 1608 of FIG. 16. First, a threshold weight is assigned or set in block 1702. For alternative embodiments, the weight can be selected manually or default to a function of the query. A phrase list (PL) including a list of base phrases is established by copying the input query into the PL at block in block 1704. Each phrase or keyterm in the input query is copied as a base phrase in the PL. A first relation from the model of the database ($DB_m$) is selected in block 1706. The first term from the selected relation is identified as a contained term and the second term from the selected relation is identified as an appended term in block 1708. Then the PL is analyzed to determine if any base phrases in the PL include the contained term in block 1710. If no base phrases in the PL include the contained term then the process 1700 skips to block 1740 which will be described below. If the base phrases in the PL include the contained term, then the first one of the base phrases that includes the contained term in block 1712 is selected. The first base phrase and the appended term are concatenated into two candidate phrases in block 1714. One candidate phrase is the appended term followed by the base phrase, the second candidate phrase is the base phrase followed by the appended term. The conditional list of phrases (CLP) is then updated in block 1716. One embodiment of updating the CLP is described in more detail below regarding FIG. 18.

Next, the first of the two candidate phrases is selected in block 1718. For one embodiment, if the selected candidate phrase includes more than a pre-selected number of stopterms in block 1720, then the selected phrase is deleted in block 1726 and the second candidate phrase is selected in block 1728. If the selected candidate phrase does not include more than a pre-selected number of stopterms, then the number of links is evaluated in block 1722. A link is equal to a relation between a contained term and an appended term in the candidate phrase. If the number of links found so far is not equal to the number of terms in the base phrase in block 1722, then the second candidate phrase is selected in block 1728.

If the number of links found so far is equal to the number of terms in the base phrase, then the link weights are evaluated in block 1724. A link weight is equal to a directional metric of the selected relation. The directional metric corresponds to the order of occurrence of the contained term and the appended term in the selected candidate phrase. If all of the link weights between the terms of the selected base phrase and the appended term are not greater than zero, then the selected candidate phrase is deleted in block 1726, and the second candidate phrase is selected in block 1728. If all of the link weights between the terms of the selected base phrase and the appended term are greater than zero, then the selected candidate phrase is included in an interim phrase list (IPL) and then the second candidate phrase is selected in blocks 1728, 1732 and the process described in blocks 1720-1730 is applied to the second candidate phrase. If the second candidate phrase has been previously processed, then a subsequent one of the base phrases that includes the contained term is selected in blocks 1734, 1736 and the process in blocks 1714-1736 is applied to the newly selected base phrase. If there are no subsequent phrases in the base phrases including the contained term, then the process continues in block 1740.

If the second term in the selected relation has not been processed as a contained term in block 1740, then the second term from the selected relation is identified as a contained term and the first term from the selected relation is identified as an appended term in block 1742 and the process repeats at block 1710. If the second term in the selected relation has been processed as a contained term in block 1740, then if a subsequent relation is remaining in the $DB_m$, the subsequent relation is selected and the process repeats at block 1708. If no subsequent relations are remaining in the $DB_m$, then for one embodiment, the phrases in the IPL are filtered. For one embodiment, shown in block 1748, the phrases having a weight less than the threshold weight are eliminated from the IPL. For another embodiment, the weight of a phrase in the IPL is determined by the lowest single link weight in the phrase. Next, duplicate phrases are eliminated from the IPL in block 1750. The number of phrases in the IPL could also be reduced by eliminating phrases that include more than a pre-selected number of stopterms.

Next, if the number of phrases remaining in the IPL is greater than zero in block 1754, then the phrases in the IPL are added to the phrases in the interim buffer (IB) in block 1756. Next the interim phrase list (IPL) replaces the phrase list (PL) and the process repeats from block 1706. If the number of phrases remaining in the IPL is not greater than zero in block 1754, then if the number of phrases in the IB is greater than or equal to a pre-selected number in block 1760, then the phrases in the IB are sorted in block 1764 and output in block 1766. If the number of phrases in the IB is not greater than or equal to a pre-selected number in block 1760, then threshold weight is lowered and the process repeats at block 1704.

Figure 18:
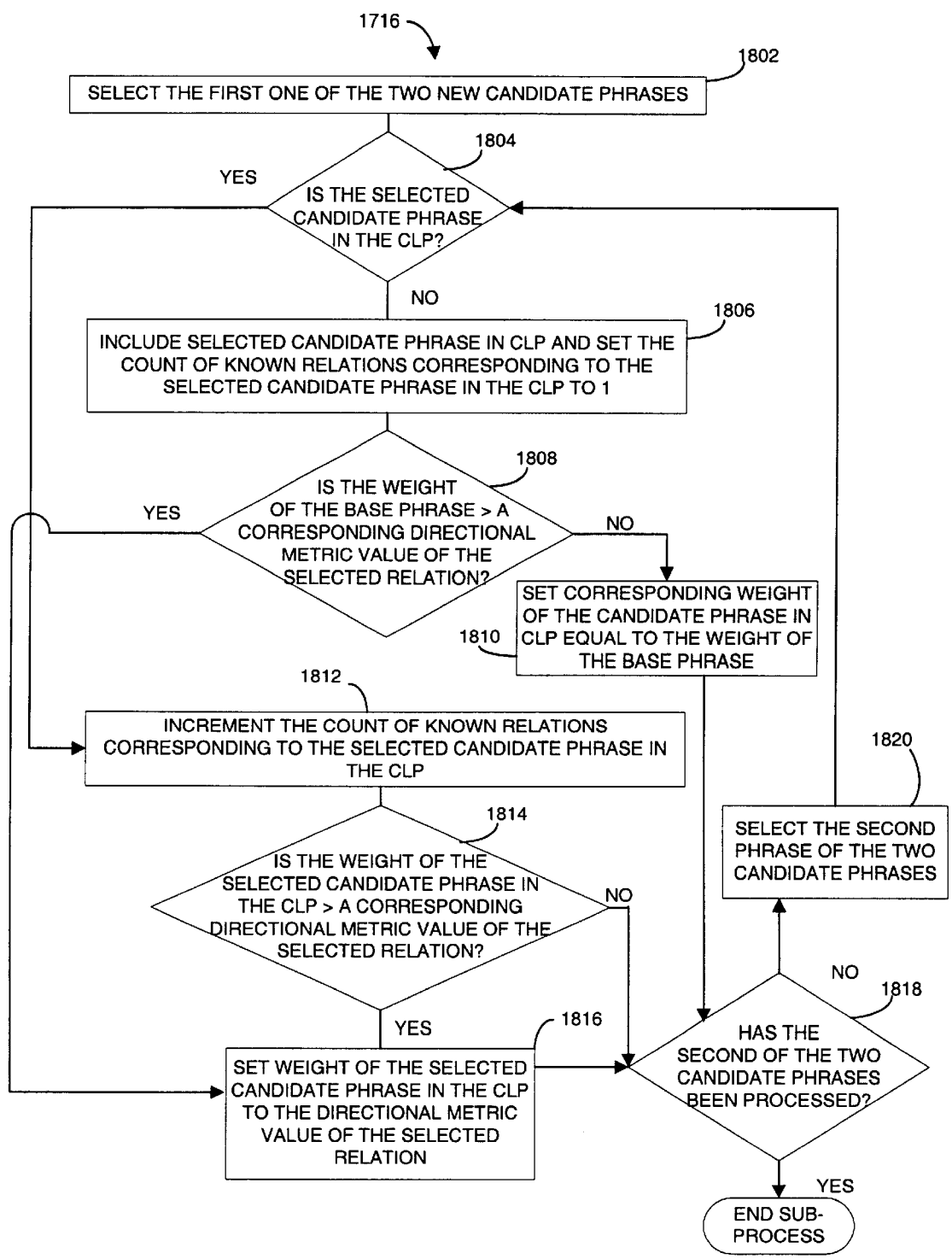
FIG. 18 illustrates one method of updating the conditional list of phrases.

FIG. 18 illustrates one method 1800 of updating the conditional list of phrases (CLP) such as in block 1716 of FIG. 17. The first one of the two new candidate phrases is selected in block 1802. If the selected candidate phrase is not in the CLP in block 1804, then the candidate phrases is included in the CLP and the corresponding count of known relations is set to 1. Then, if the weight of the base phrase is not greater than a corresponding directional metric of the selected relation in block 1808, then the corresponding weight of the candidate phrase in the CLP is set to equal the weight of the base phrase in block 1810 and proceed to in block 1818 below. If the weight of the base phrase is greater than a corresponding directional metric of the selected relation in block 1808, then the corresponding weight of the candidate phrase in the CLP is set to equal the weight of the corresponding directional metric of the selected relation in block 1816 and proceed to block 1818 below.

If the selected candidate phrase is in the CLP in block 1804, then the corresponding count of known relations is incremented in block 1812. If the weight of the selected candidate phrase is greater than a corresponding directional metric of the selected relation in block 1814, then the corresponding weight of the candidate phrase in the CLP is set to equal the weight of the corresponding directional metric of the selected relation in block 1816. If the weight of the selected candidate phrase is not greater than a corresponding directional metric of the selected relation in block 1814, then proceed to in block 1818. In block 1818, if the second of the two candidate phrases has not been processed, then the second of the two candidate phrases is selected and the process repeats at block 1804. In block 1818, if the second of the two candidate phrases has been processed the sub-process ends and the updated CLP is output.

This application is intended to cover any adaptations or variations of the present invention. For example, those of ordinary skill within the art will appreciate that the phrase generation process can be executed in varying orders instead of being executed in the order as described above.

Phrase generation is used to show typical phrases that contain terms or phrases of interest. The default is to produce the 10 most typical phrases, but a different number can also be specified. The output phrases can be used as query phrases for input to phrase search.

As an example, phrases containing the term "rain" can be generated. Given the term "rain", and using the option to specify the number of generated phrases (30 in this case), phrase generation produces the following list:

| | |
|---|---|
| LIGHT RAIN | MODERATE RAIN TURB |
| HVY RAIN | LIGHT RAIN TURB |
| RAIN SHOWERS | ENCOUNTERED RAIN TURB |
| FREEZING RAIN | LIGHT MODERATE RAIN TURB |

| -continued | |
|---|---|
| MODERATE RAIN | ENCOUNTERED MODERATE RAIN TURB |
| LIGHT MODERATE RAIN | ENCOUNTERED LIGHT RAIN TURB |
| HEAVY RAIN | ENCOUNTERED LIGHT MODERATE RAIN TURB |
| RAIN SHOWER | VISIBILITY RAIN |
| RAIN FOG | VISIBILITY RAIN FOG |
| MODERATE HVY RAIN | VISIBILITY LIGHT RAIN |
| ENCOUNTERED RAIN | TURB RAIN |
| ENCOUNTERED MODERATE RAIN | TURB ENCOUNTERED RAIN |
| ENCOUNTERED LIGHT RAIN | MODERATE TURB RAIN |
| ENCOUNTERED LIGHT MODERATE RAIN | LIGHT TURB RAIN |
| RAIN TURB | ENCOUNTERED TURB RAIN |

The phrases toward the beginning of the list are the ones that appear more often in the narratives of the ASRS database. So, for example, "light rain" is more common than "moderate rain". Similarly, "hvy rain" is more common than "heavy rain". Some of the listed phrases, such as "light rain", typically appear in narratives exactly as shown. Other listed phrases, such as "light moderate rain", typically appear in narratives with other terms intermixed. For example, the most common appearance of "light moderate rain" is "light to moderate rain".

Phrase generation can also eliminate phrases containing terms that are not of interest at the moment. Eliminating terms not of interest is accomplished by identifying such terms as additions to a default stopterm list. For example, the user could add the terms LIGHT, MODERATE, ENCOUNTERED, TURB (i.e., turbulence), and CONDITIONS to eliminate the many variations on these themes. When re-running phrase generation with the expanded stopterm list, a revised list of phrases is generated.

Phrase generation can also allow a number of stopterms within each phrase. To avoid generating an excessive number of similar phrases, however, the default is to display only those phrases that contain no stopterms. Otherwise, given the query term "rain", many phrases like the following would be output:

THE LIGHT RAIN
A LIGHT RAIN
SOME LIGHT RAIN
WAS LIGHT RAIN
ANY LIGHT RAIN
THE HVY RAIN
A HVY RAIN
SOME HVY RAIN

Phrase generation can also find phrases that contain other phrases. For example, given the query "freezing rain", the following and other phrases would be generated:

| FREEZING RAIN | MODERATE LIGHT FREEZING RAIN |
|---|---|
| LIGHT FREEZING RAIN | MODERATE LIGHT FREEZING RAIN CONDITIONS |
| FREEZING RAIN CONDITIONS | LIGHT MODERATE FREEZING RAIN CONDITIONS |
| LIGHT FREEZING RAIN CONDITIONS | FREEZING RAIN DRIZZLE |
| MODERATE FREEZING RAIN | LIGHT FREEZING RAIN DRIZZLE |
| MODERATE FREEZING RAIN | |
| CONDITIONS | |
| LIGHT MODERATE FREEZING RAIN | |

When using phrase generation, user query terms are mapped (if necessary) to ASRS abbreviations and usage as described above. For example, "runway" is mapped to "rwy".

Any phrase can be used as input to phrase search, including those produced by phrase generation. For example, for a search for the phrase "light moderate rain", the following are excerpts from some of the most relevant narratives:

CONTRIBUTING FACTORS—LIGHT TO MODERATE RAIN WAS FALLING IN THE JFK AREA WITH STANDING WATER ON RAMP SURFACES—THIS COUPLED WITH LIGHTING ON THE CONCOURSE CAUSED A GLARE ON THE RAMP MAKING VIEW OF THE LEAD—IN LINE DIFFICULT. (86853)

THERE WERE LARGE AREAS OF LIGHT TO MODERATE RAIN SHOWERS AROUND THE LAX AREA... THE GPWS SOUNDED... I SUSPECT THIS WAS CAUSED BY THE EFFECT OF THE RAIN SHOWER ON THE GPWS. (233843)

JUST PRIOR TO FLYING INTO THE HAIL, ATC ASKED WHAT MY CONDITIONS WERE AND I RPTED LIGHT TO MODERATE RAIN. (373915)

The exact phrase "light moderate rain" never appears, but the phrase "light to moderate rain" is common. This shows the value of the flexible phrase matching available with phrase search. Of course, the phrase "light to moderate rain" could itself be used as a query phrase.

It is often helpful to use multiple phrases from the list produced by phrase generation as input to phrase search. For example, if the user were unsure of what phrases typically contain the term "rest" as it relates to fatigue, phrase generation could be used to list the most common phrases containing the term "rest". These would include, in order of estimated prominence in the ASRS database:

| | |
|---|---|
| REST FLT (e.g., "rest of the flight") | REST APCH FLT |
| REDUCED REST | ACFT REST |
| CREW REST | ACFT REST FLT |
| REST PERIOD | ACFT REST APCH |
| CAME REST (e.g., "came to rest") | ACFT CAME REST |
| MINIMUM REST | ACFT REST APCH FLT |
| REST REQUIREMENTS | REST TRIP |
| REST PERIODS | CREW ACFT REST |
| REST APCH (e.g., "rest of the approach") | ADEQUATE REST |
| MINIMUM REST APCH | Etc. |

Given an interest in "rest" as it relates to fatigue, the user would ignore "rest flt", "came rest", and other phrases unrelated to fatigue, and would select the fatigue-related phrases. To simplify the selection task, the user could list the terms ACFT, CAME, APCH, TRIP, and perhaps others as additional stopterms and then re-run the phrase generation program. The fatigue-related phrases, such as those shown below, could be used as input to phrase search:

| | |
|---|---|
| REDUCED REST | LEGAL REST |
| CREW REST | MINIMUM REST REQUIREMENTS |
| REST PERIOD | COMPENSATORY REST |
| MINIMUM REST | REST NIGHT |
| REST REQUIREMENTS | REST BREAK |
| REST PERIODS | MINIMUM CREW REST |
| ADEQUATE REST | REQUIRED REST PRIOR |
| REQUIRED REST | MINIMUM REQUIRED CREW REST |
| MINIMUM REQUIRED REST | REQUIRED REST PRIOR FLT |
| REST OVERNIGHT | REQUIRED CREW REST PRIOR |
| REQUIRED CREW REST | LACK REST |
| PROPER REST | REST NIGHT PRIOR |
| REST PRIOR | LACK PROPER REST |
| CREW REST PRIOR | LACK CREW REST |
| SCHEDULED REST | LACK ADEQUATE REST |
| REST PRIOR FLT | |

A phrase search on these phrases retrieves narratives containing one or more of them. The most relevant narratives contain a greater variety of the most common phrases. Since phrase generation was used to suggest the list of phrases, it is assured that there are narratives in the database that contain one or more of the phrases on the list. The following are excerpts from some of the narratives that are most relevant to the "rest" phrases:

AFTER A NUMBER OF YRS AS BOTH A MIL AND COMMERCIAL CARRIER PLT I'VE FOUND THAT EVERYONE'S BODY NEEDS A ROUTINE, AND RADICAL CHANGES CAN ADVERSELY AFFECT ONE'S PERF AND ABILITY TO GET ADEQUATE SLEEP DURING THE SUPPOSED REST PERIOD. OUR AIRLINE'S SCHEDULING DEPT OPERATES UNDER CRISIS MGMNT DUE TO OUR MGMNT'S 'STAFFING STRATEGY,' AND THUS REQUIRES MANY RESERVE CREW MEMBERS TO COVER MORE THAN 1 SCHEDULED TRIP IN A CALENDAR DAY AND THUS WE HAVE A LARGE NUMBER OF 'SCHEDULED REDUCED REST PERIODS' WHICH ARE 8 HRS, WHICH DOES NOT INCLUDE TRANSPORTATION LCL IN NATURE, WHICH, IN REALITY, REDUCES YOUR TIME AT A REST FACILITY WELL BELOW 8 HRS, PROVIDED YOU FALL TO SLEEP AS SOON AS YOU ARRIVE AT THE HOTEL. MY TRIP/RERTE FROM HELL STARTED AS A 3 DAY WITH AN 8 HR REST THE FIRST NIGHT WITH AN EARLY RPT. I HAPPENED TO BE COMING OFF A COUPLE OF NIGHT TRIPS AND THE EARLY MORNING RPT HAD ME A LITTLE OUT OF SYNC. WHEN WE ARRIVED AT OUR NEXT OVERNIGHT STATION, WHICH WE WERE SCHEDULED COMPENSATORY REST, I FELL ASLEEP EARLY NOT BEING ACCUSTOMED TO EARLY MORNING RPTS AND THUS WOKE VERY EARLY ON THE THE THIRD DAY . . . THE FAA NEEDS TO RECOGNIZE THE IMPORTANCE OF QUALITY CREW REST AND IMPLEMENT GUIDELINES TO PREVENT SUCH SCHEDULING PRACTICES. (254345)

CREW HAD A LEGAL DUTY DAY, BUT LAST 2 DAYS CREW HAD BEEN ON REDUCED REST WITH COMPENSATORY REST TO MINIMUM ALLOWED. CREW WAS EXTREMELY FATIGUED DUE TO MIN LEGAL REST AND RATHER LENGTHY DUTY DAY. CREW HAD BEEN ON DUTY OVER 12 HRS . SUGGESTIVE ACTION: INCREASE REST PERIODS. MIN REST PERIODS ARE ADEQUATE PROVIDED YOU AREN'T FLOWN TO THOSE MINS 6 DAYS IN A ROW. IT'S SIMPLY TOO FATIGUING. THERE WERE MANY SIMPLY MISTAKES MADE THIS FLT, ETC. MISSED CALLS, MISUNDERSTANDING HDG/ALT ASSIGNMENT/FREQ CHANGES. MOST OF THESE ERRORS WERE CAUGHT BY ONE OF THE CREW, THE ALT DEVIATION ON THE LAST LEG OF A 13.2 HR DUTY DAY WITH MINIMUM REQUIRED REST WAS JUST UNAVOIDABLE. PLEASE RESEARCH INCREASED REQUIRED REST PERIODS. (123335)

PRIOR TO DEPARTING ON THE LAST FLT OF DAY 2, I BECAME CONCERNED ABOUT THE REQUIRED CREW REST, SINCE WE WERE BEING DELAYED BY MAINT. I KNEW THAT, THOUGH WE HAD 9 HRS REST THE PREVIOUS NIGHT, ONCE WE EXCEEDED 15 HRS DUTY TIME OUR REST FOR THE 24 HR "LOOKBACK" WOULD BE LESS THAN NORMAL. MY QUESTION WAS THIS: COULD I ACCEPT REDUCED REST ON THE SECOND NIGHT, SINCE I WAS STILL FLYING WHAT WAS SCHEDULED, OR DID WE NEED COMPENSATORY REST BECAUSE OF WHAT WAS ACTUALLY FLOWN? I CALLED OUR COMPANY'S HEAD OF (MY ACFT) TRNING AND EXPLAINED ABOUT MY SIT. HE STATED THAT, WHILE HE FELT I NEEDED COMPENSATORY REST, REPEATED DISCUSSIONS WITH OUR VP OF OPS INDICATED THAT THE COMPANY'S POS WAS THAT REDUCED REST WAS LEGAL. BASED ON THAT, I WENT WITH REDUCED REST. ON COMPLETION OF THE TRIP I TALKED TO OUR DIRECTOR OF OPS, WHO PRODUCED A MEMO FROM OUR VP OF OPS. THE MEMO SUMMARIZED AN FAA RULING DATED JULY 1989 STATING (AGAIN, AS I UNDERSTAND IT) THAT REQUIRED REST IS BASED ON ACTUAL FLT TIME AND DUTY TIME DURING THE PREVIOUS 24 HRS. COMMUTER AIRLINES ROUTINELY USE THE DUTY TIME REGS AS A GOAL TO ACHIEVE MAX UTILIZATION OF PLTS. YET, I HAVE NOT MET A SINGLE LINE PLT THAT FULLY UNDERSTANDS THIS REG. AS AN EXAMPLE, NO LINE PLT I ASKED KNEW THE ANSWER TO MY QUESTION. WHY IS THIS REG SO UNNECESSARILY SUBTLE? (145545)

The above narratives contain a variety of the more prominent "rest" phrases, such as "reduced rest", "crew rest", and "rest periods". In the first of these narratives (254345), the phrases "scheduled reduced rest periods" and "scheduled compensatory rest" are also among the highlighted "rest" phrases, despite the fact that these phrases do not appear in their entirety among the query phrases. Instead, the phrases match several of the query phrases, including "scheduled rest", "reduced rest", "rest periods", and "compensatory rest". This indicates the flexibility of phrase search in highlighting larger phrases of interest built up from smaller ones.

The combination of phrase generation and phrase search provides the ability to avoid ambiguities in searches. An advantage of this method with a topic like "rest" is that it can focus on the uses of the term "rest" that involve fatigue, while avoiding others. A keyterm search would sometimes retrieve narratives involving only "rest of the flight", "came to rest", etc. Without phrase generation, a user would not know what phrases contained the term "rest", and so could not effectively use phrase search to focus on the kinds of "rest" that are of interest. Using phrase generation, topical phrases can be found for use as queries in phrase search, and thus narratives that are focused on the topic of interest can be found. In even more refined searches, phrases that represent particular nuances of the topic of interest can be selected for use as a query to phrase search. The retrieved narratives will reflect the desired nuances of the topic of interest.

Phrase generation also supports domain analysis and taxonomy development by showing prominent variations among topically related phrases. The "rest" phrases, for example, provide the analyst with a variety of variations on the concept of "rest", such as "reduced rest" and "compensatory rest", which, as the third narrative shows, have very particular meanings. With that insight, an analyst could then use phrase search to find other narratives containing "reduced rest" and/or "compensatory rest" to further explore the implications of these issues on crew performance and operational safety.

Phrase generation is one of several methods that display phrases contained in collections of text as a way to assist a user in domain analysis or query formulation and refinement. Phrase generation, described herein, includes an implicit phrase representation that can provide all possible phrases from the database. In contrast, other methods such as Godby (1994), Gutwin, Paynter, Witten, Nevill-Manning, and Frank (1998), Normore, Bendig, and Godby (1999), Zamir and Etzioni (1999), and Jones and Staveley (1999), maintain explicit and incomplete lists of phrases. In addition, phrase generation can provide the essence of multiple, similar phrases, which can be used as queries in a phrase search. The option of using the flexible matching of phrase search allows the generated query phrases to match both identical and nearly identical phrases in the text. This ensures that inconsequential differences do not spoil the match.

Some phrase generation methods such as Church, Gale, Hanks, and Hindle (1991), Gey and Chen (1997), and Godby (1994), use contextual association to identify important word pairs, but do not identify longer phrases, or do not use the same associative method to identify phrases having more than two words. In contrast, phrase generation treats phrases uniformly regardless of their size.

Some methods such as Gelbart and Smith (1991), Gutwin, Paynter, Witten, Nevill-Manning, and Frank (1998), and Jones and Staveley (1999), rely on manual identification of phrases at a critical point in the process, while phrase generation is fully automatic.

Phrase Discovery

Phrase discovery is a process of identifying short sequences of terms, herein called phrases that are contextually associated within a number of subsets of a database. The phrase discovery process can also identify subsets of a database that contain one or more of the discovered phrases or that contain phrases that are similar to the discovered phrases. These identified subsets can also be sorted according to the extent to which they are representative of the contexts in which the discovered phrases are contextually associated.

Phrase discovery is substantially different from phrase generation process described above in FIGS. 16–18. Phrase discovery derives phrases directly from sequences of terms such as narratives or passages, while phrase generation derives phrases from relational models of databases. Further, phrase discovery does not include a query. Phrase discovery discovers contextually associated phrases that are present in the provided relevant sequence of terms. In contrast, phrase generation includes a query and all generated phrases contain a portion of the query.

The process of phrase discovery is initiated by providing a relevant sequence of terms that includes the contexts of interest. In one alternative, the sequence of terms is text. In the following description, the word "text" is intended to be representative of any sequence of terms. Alternative sequences of terms are described above. A relevant sequence of terms can be obtained by conducting a keyterm search or a phrase search as described above, or by another automated or manual process of selection.

Phrase discovery can be used as a method of query expansion. As a query expansion method, one or more terms can be input to keyterm search, or one or more phrases can be input to phrase search, and the retrieved text can provide the relevant text for input to phrase search, and the retrieved text can provide the relevant text for input to phrase discovery, which then produces a list of contextually associated phrases. The relevant text includes contexts of topics of interest, i.e. describes a topic such as "fatigue" which is of interest to the user, and the contexts include descriptions of issues related to the topic "fatigue." This list of contextually associated phrases can then be used as a query in a subsequent phrase search. Thus, an initial query consisting of even a single term or phrase can be expanded into a query consisting of a large number of contextually associated phrases.

Phrase discovery can be a single-pass process, directly deriving contextually associated phrases from the provided relevant text. Alternatively, phrase discovery can be applied iteratively. As an iterative process, phrase discovery first derives contextually associated phrases from provided relevant text from any source. The resulting phrases are then provided as a query to phrase search on a database. Based on the query, phrase search then retrieves from the database a new, more focused, and more relevant body of text, and the phrase discovery process then obtains contextually associated phrases from the new relevant text. Phrase discovery can be applied in any number of iterations. Each iteration further focuses the output results.

Figure 19:
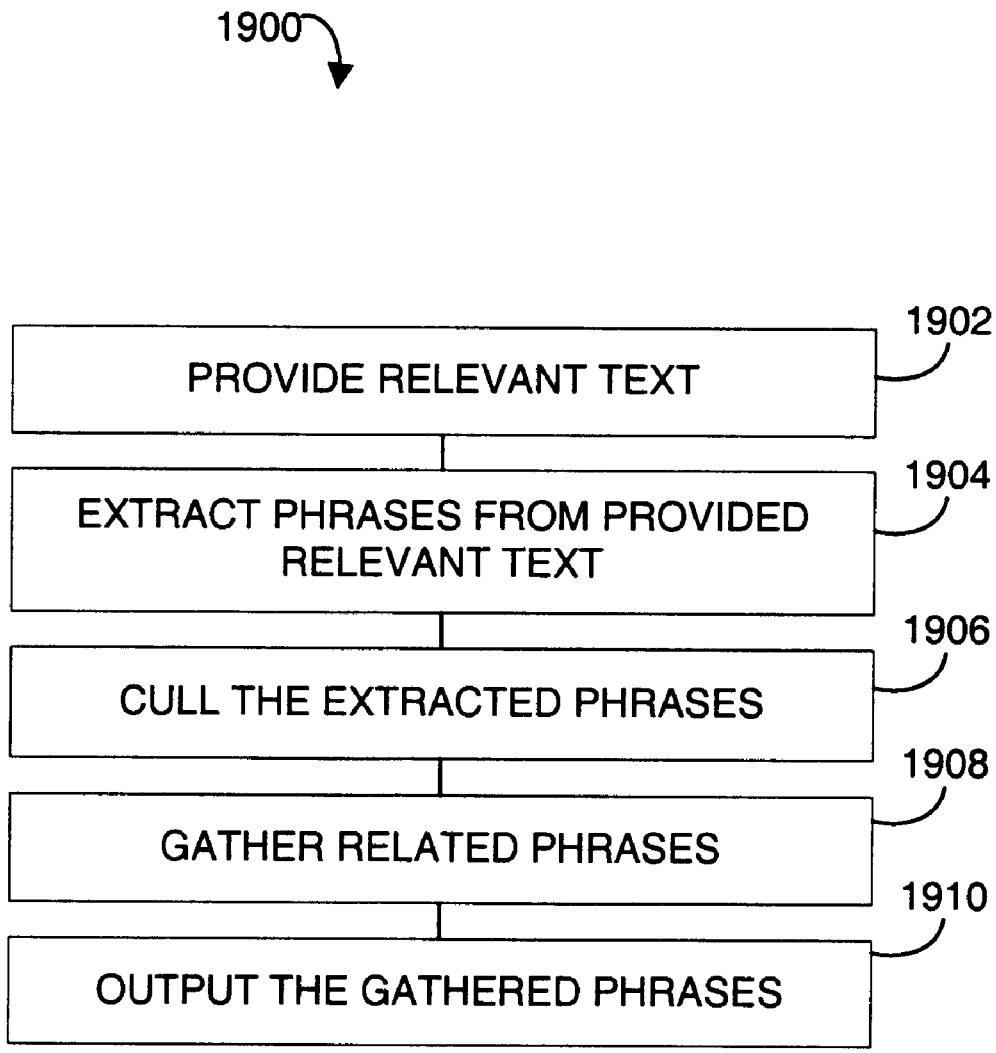
FIG. 19 shows one embodiment of phrase discovery.

FIG. 19 shows one embodiment of an overview of the phrase discovery process 1900. The phrase discovery process is described in more detail below. First, a relevant text is provided in block 1902. The provided relevant text can be any text that contains the topic of interest, and preferably text that prominently contains the topic of interest. For example, if the topic of interest is "aircrew fatigue", then aircrew fatigue should be among the prominent topics in the provided relevant text. The relevant text can be any quantity of text such as a passage, a paragraph, a narrative, a collection of narratives, or larger selections of text. Phrases are extracted from the provided relevant text in block 1904. The extracted phrases can include all phrases that occur in the relevant text. Alternatively, the extracted phrases can include a selected number of the phrases that occur in the relevant text. The extracted phrases are culled in block 1906. The culled phrases are then input to a gathering process in block 1908. The gathering process gathers phrases that are contextually associated, that is, phrases that are prominent in the local context of the provided relevant text, but are not prominent in the global context of a larger collection of similar text. The phrases resulting from the gathering process 1908 are output in block 1910.

The process of phrase discovery is initiated by providing relevant text that includes the contexts and topic of interest. That relevant text can be obtained by conducting a keyterm search or a phrase search as described above, or by another automated or manual process. In one alternative, phrase discovery can be preceded by a keyterm search of a database of narratives, which provides a collection of relevant narratives that are relevant to the keyterm search query. A subset of the relevant narratives can then be input to phrase discovery as the provided relevant text. The provided relevant text includes the contexts of the phrases that are subsequently extracted, culled, and gathered by the phrase discovery process. In another alternative, phrase discovery can be preceded by a phrase search of a database of narratives, which provides a collection of narratives that are relevant to the phrase search query. A subset of those relevant narratives can then be input to phrase discovery as the provided relevant text. This text includes the contexts of the phrases that are subsequently extracted, culled, and gathered by the phrase discovery process. In another alternative, a document is identified as being relevant text and the document is provided as input to phrase discovery. In another alternative, passages from a wide variety of documents are gathered by a combination of manual and automated methods to form a database of passages. The database is input to phrase discovery as the provided relevant text.

Phrase extraction is a process of identifying and collecting a number of sequences of terms that occur within a larger sequence of terms contained in one or more subsets of a database. One embodiment of phrase extraction obtains phrases from a collection of text. Phrase extraction can identify phrases that occur one or more times in the input sequence of terms without reference to any pre-existing lists of phrases, and without recognition of the grammatical structure of language. Phrase extraction uses each term in the input sequence of terms as a first term in a number of phrases. First, a phrase consisting of a single (1) term is identified. Then, starting with the single term, a phrase of two (2) terms is identified. Processing continues until phrases containing any number of terms, up to a selected number (N) of terms, are identified. Then, a subsequent term is identified in the sequence of terms, and another set of phrases of length 1 to N are identified. The process continues until every term in the input sequence of terms has been used as a starting term for a set of phrases of length 1 to N. In one alternative, a count of the unique phrases is maintained and only one copy of each unique phrase is output along with the corresponding frequency of the unique phrase.

In one alternative, phrase extraction can include one or more sets or classes of special terms to determine whether and to what extent a term from one set of special term's is allowed to appear in a particular position within a phrase. Based on the terms membership in the set of special terms and the term's presence in the phrase, the phrase may or may not be identified as an acceptable phrase. Only acceptable phrases are then output to the culling process. In one alternative, the special terms include one or more sets of stopterms. In one alternative, the special terms include one or more sets of stopterms. In one alternative, a set of stopterms includes zero or more terms that occur in the relevant text. In another alternative, a set of stopterms can include conventional stopwords such as articles and conjunctions. Stopterms can also include punctuation.

The culling process reduces the number of extracted phrases. In one embodiment, the culling process eliminates a phrase that only occurs as part of another, longer phrase within the provided relevant text from which the phrases were obtained. In one alternative, the previously extracted phrases can be input to the culling process. The phrases input to the culling process are collected in a list of candidate phrases. A first phrase from the candidate phrases is selected and the selected phrase is then examined to see if the selected phrase is contained within any of the other candidate phrases in the candidate phrase list. If the selected phrase is contained in another candidate phrase (i.e. a containing phrase) in the candidate phrase list, then the frequencies of the selected phrase and the containing phrase are examined. And if the frequency of the selected phrase is not greater than the frequency of the containing phrase, then the selected phrase only occurs in the provided relevant text as part of the containing phrase. Therefore, the selected phrase is not a stand-alone phrase and is therefore deleted. Each of the phrases in the candidate phrase list are tested as described above. The candidate phrases that remain in the candidate phrase list after the culling process is complete are then output. In one alternative, the phrases are output to a gathering phrases process.

The process of gathering related phrases takes a collection of phrases as input, and produces a collection of phrases that are contextually associated. The gathering process can also include sorting the gathered phrases according to the corresponding degrees of contextual association. The gathered phrases having a higher degree of contextual association are more contextually associated locally and less contextually associated globally in a larger collection of similar text. The larger collection of similar text can include some or all of the provided relevant text and also less relevant text, or alternatively can include text that is similar to the provided relevant text and also less relevant text.

The gathering phrases process can also be an iterative process. When the gathering phrases process is iterative, each iteration after the first gathering of phrases includes a phrase search where the previously gathered phrases as the input query. The output of the phrase search includes a new body of provided relevant text, from which additional phrases are obtained, as described below. Thus, the iterative process uses feedback of associated phrases to obtain additional contextually associated phrases. The database searched by the phrase search can include the larger collection of similar text, and alternatively, an additional collection of text. The iterative gathering process can also include a process of extracting additional phrases from the new body of provided relevant text, and can also include a culling process to reduce the number of extracted phrases, to produce additional phrases that are contextually associated. The additional phrases can be sorted according to the corresponding degrees of contextual association and combined in sorted order with previously gathered phrases.

The phrases resulting from the gathering process are output as the final result of the overall phrase discovery process. In one alternative, the phrases are output in an order according to the corresponding degrees of contextual association, which were determined in the process of gathering phrases. As another alternative, the phrases are output in order of the corresponding frequencies within the provided relevant text. As yet another alternative, when the process of gathering related phrases iterates multiple times and processes multiple relevant texts, the phrases can be output in order of the corresponding highest frequency in any of the multiple relevant texts. In yet another alternative, the phrases are output in an order which is a function of one or more of the corresponding frequencies in relevant texts and one or more of the corresponding rankings according to the degree of contextual association.

Figure 20:
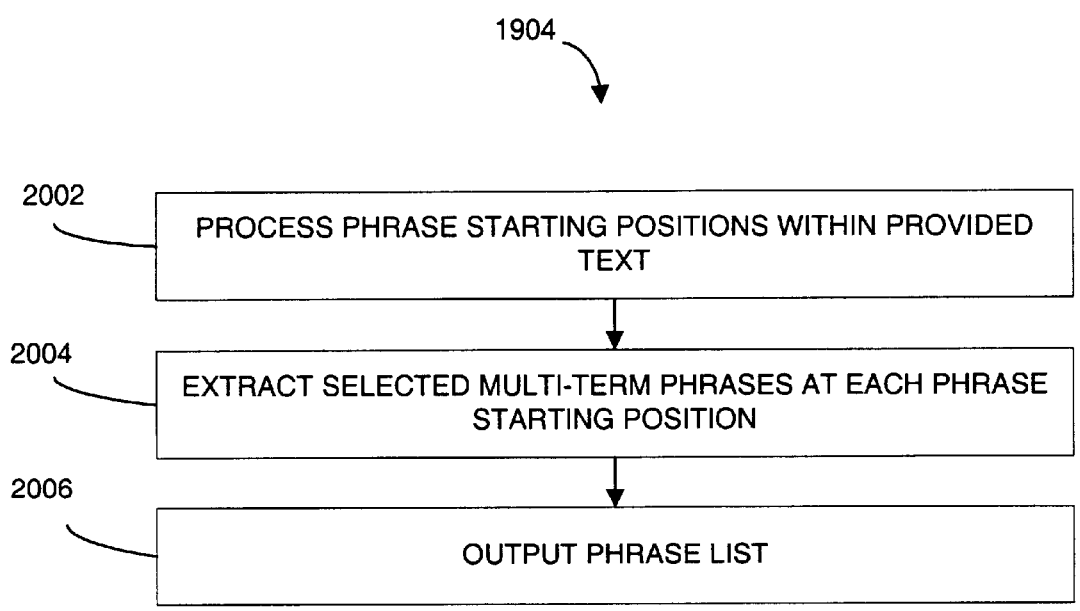
FIG. 20 shows an overview of one embodiment of the phrase extraction process.
Figure 20A:
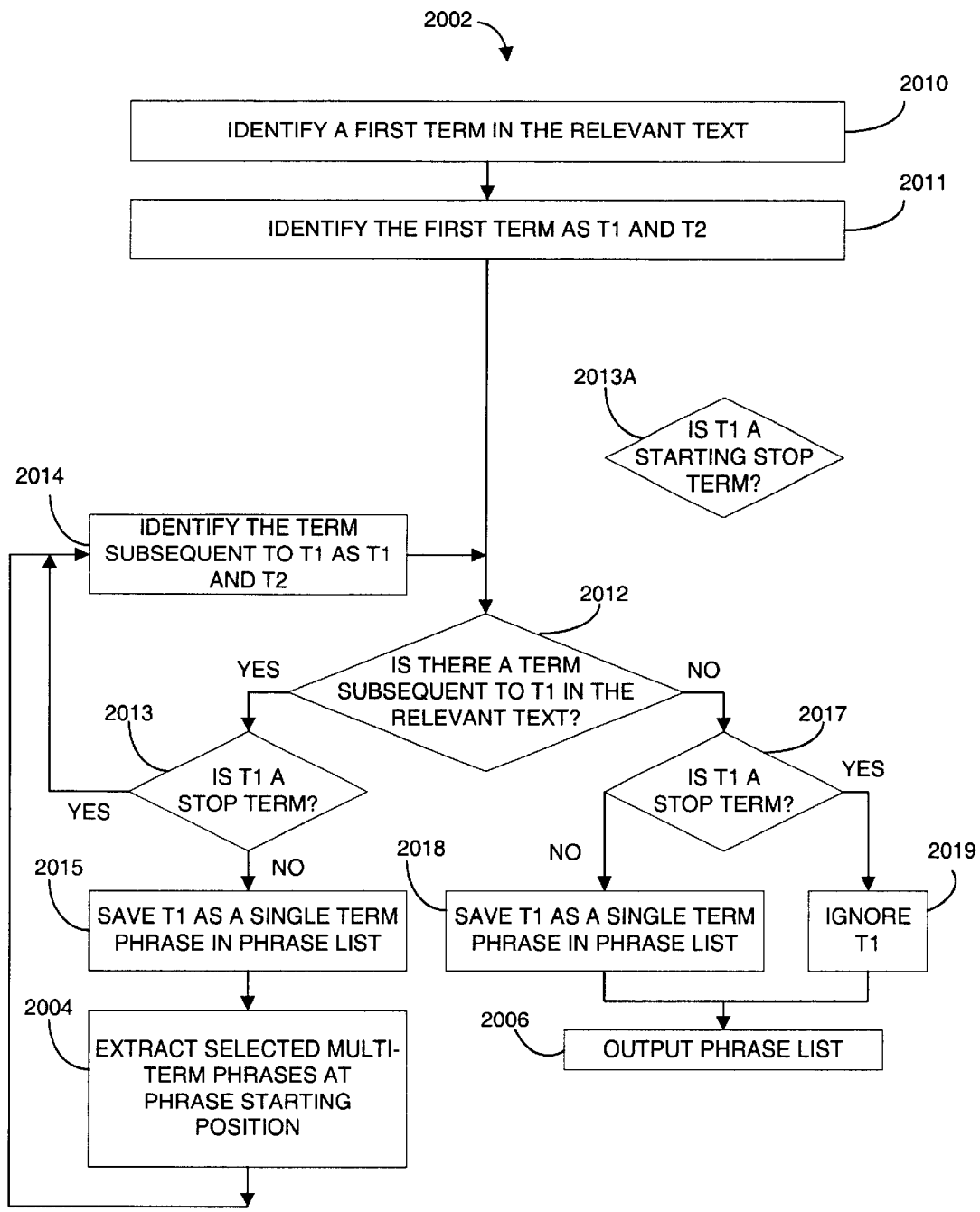
FIG. 20A illustrates one embodiment of the phrase starting positions process.
Figure 20B:
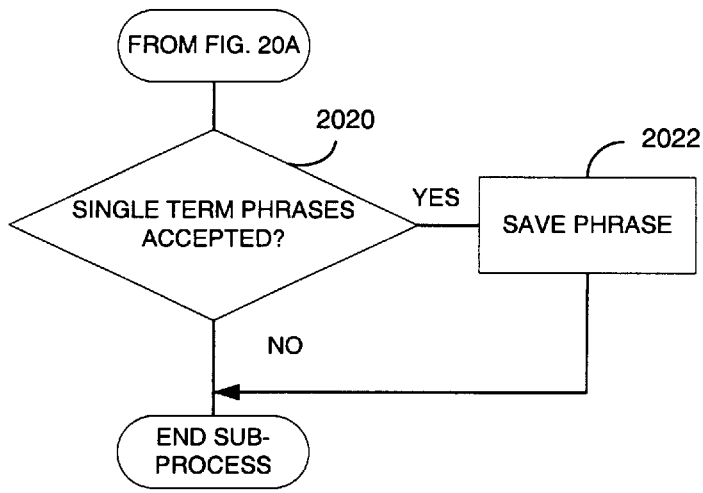
FIG. 20B illustrates one embodiment of saving single term phrases.
Figure 20C:
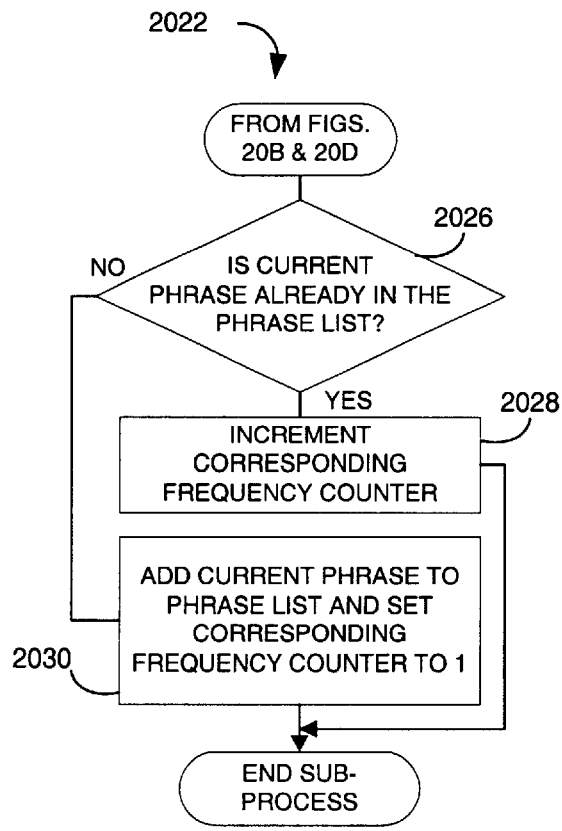
FIG. 20C shows one embodiment of saving a phrase by combining the current phrase into the phrase list.
Figure 20D:
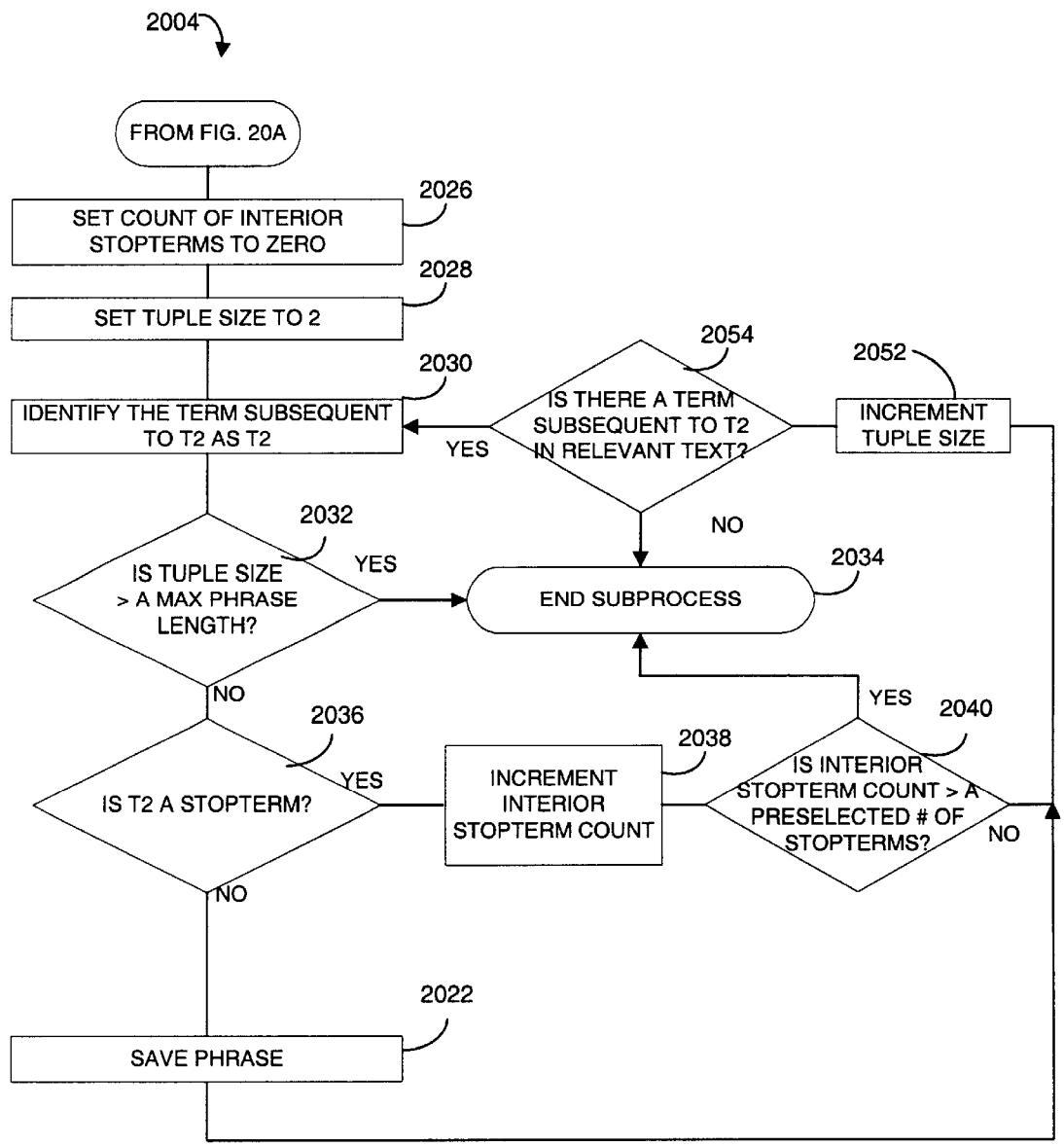
FIGS. 20D and 20E illustrate two embodiments of extracting selected multiterm phrases at each starting position.
Figure 20E:
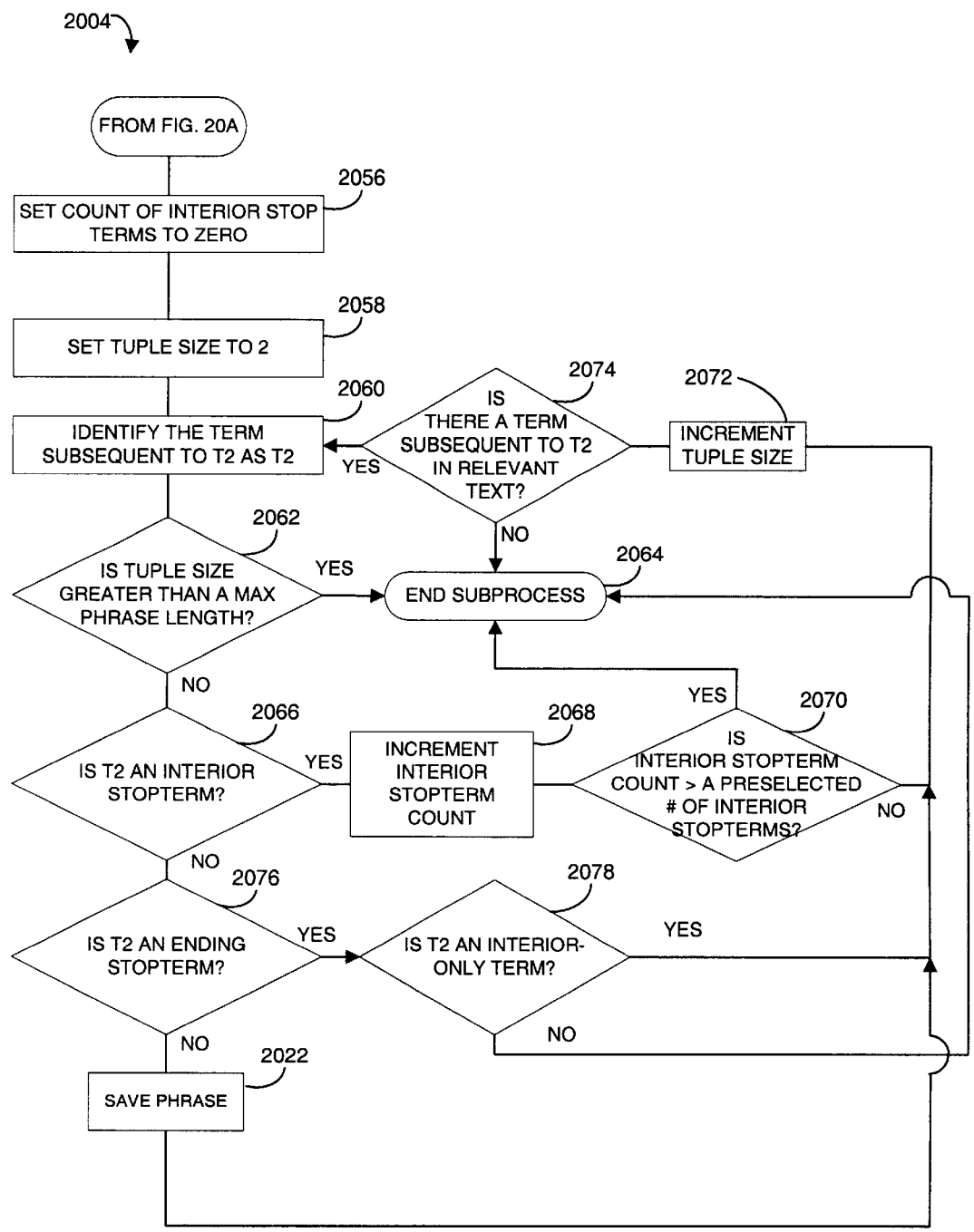

FIGS. 20–20E illustrate various embodiments of the phrase extraction process 1904. FIG. 20 shows an overview of one embodiment of the phrase extraction process 1904. First the phrase starting positions are processed within the relevant text in block 2002. The phrase starting positions include the terms in the relevant text that the process will use to begin each iteration of the phrase extraction process. In one alternative, a number of selected starting position terms are extracted as a number of single-term phrases. Selected multi-term phrases are extracted in block 2004. Multi-term phrases include two or more terms. The first term of each multi-term phrase is one of the phrase starting position terms. The resulting phrase list is output to the next subprocess in block 2006.

FIG. 20A illustrates one embodiment of the phrase starting positions process 2002. A first term in the relevant text is identified in block 2010. The first term is then identified as both T1 and T2 in block 2011. Next, if there is a term subsequent to T1, then T1 is not the last term in the relevant text and it is possible that T1 is an acceptable first term in a multi-term phrase, therefore determine if T1 is a stopterm in block 2013, or alternatively, if T1 is a starting stopterm in block 2013A. If T1 is a stopterm in 2013, or if T1 is a starting stopterm in 2013A, then T1 is not an acceptable first term in a multi-term phrase, and therefore identify the term subsequent to T1 as both T1 and T2 in block 2014. The process continues at block 2012. If T1 is not a stopterm in block 2013, or alternatively, if T1 is not a starting stopterm in 2013A, then T1 is an acceptable first term in a multi-term phrase and a potentially acceptable single term phrase, therefore T1 is saved in the phrase list (PL) as a single term phrase in block 2015 according to the subprocess shown in FIG. 20B, as described below. Next, selected multi-term phrases are extracted at the starting position T1 in block 2004 according to the process described in FIG. 20D or FIG. 20E, as described below. After extracting phrases in block 2004, the phrase extraction process begins at a new starting position by continuing the process at block 2014.

If there is not a term subsequent to T1 in the relevant text in block 2012, then T1 is the last term in the relevant text, and the process continues at block 2017. If T1 is a stopterm in block 2017, then T1 is ignored in block 2019 and the phrase list is output in block 2006. If T1 is not a stopterm in block 2017, then T1 is a potentially acceptable single-term phrase, therefore T1 is saved in the phrase list as a single-term phrase in block 2018 according to the subprocess shown in FIG. 20B, as described below.

FIG. 20B illustrates one embodiment of saving single term phrases. If single term phrases are acceptable in block 2020, then the phrase is saved in block 2022, and then the subprocess illustrated in FIG. 20B is ended. If single term phrases are not acceptable in block 2020, then the phrase is not saved, and then the subprocess illustrated in FIG. 20B is ended. Single term phrases are acceptable if a user has enabled single term phrases.

FIG. 20C shows one embodiment of saving a phrase subprocess, block 2022 in FIG. 20B, of combining the current phrase into the phrase list. If the current phrase is included in the phrase list in block 2026 then a frequency counter corresponding to the current phrase in the phrase list is incremented in block 2028 and the FIG. 20C subprocess ends. If the current phrase is not included in the phrase list in block 2026, then the current phrase is added to the phrase list and a corresponding frequency counter in the phrase list is set to 1 in block 2030 and the subprocess ends.

FIG. 20D illustrates one embodiment of a subprocess of extracting selected multi-term phrases at each starting position in block 2004 of FIG. 20 and FIG. 20A. An interior stopterm count is set to zero in block 2026. The initial value of the tuple size is set to 2 in block 2028. For alternative embodiments the initial value of the tuple size can be set to a larger number. The tuple size is the number of terms in the current multi-term phrase. The smallest multi-term phrase has 2 terms, so the initial tuple size is 2. After each current phrase is processed, as described below, the tuple size is incremented in order to process a phrase containing one additional term. Next, the term subsequent to T2 is identified as T2 in block 2030. If the tuple is greater than a pre-selected maximum phrase length in block 2032, then end the subprocess in block 2034, and return to process 2002 in FIG. 20A at block 2014. If the tuple size is not greater than a pre-selected maximum phrase length in block 2032, then determine if T2 is a stopterm in block 2036. If T2 is not a stopterm then the current phrase is saved in the phrase list in block 2022, as described in FIG. 20C, and then the tuple size is incremented in block 2052. If T2 is a stopterm in block 2036 then the interior stopterm counter is incremented in block 2038 and the number of interior stopterms in the current phrase is compared to a pre-selected number of interior stopterms in block 2040. The preselected number of interior stopterms represents the number of interior stopterms that will be allowed within a phrase. If the number of interior stopterms is greater than the pre-selected number of interior stopterms, then end the subprocess at block 2034, and return to process 2002 in FIG. 20A at block 2014. If the number of interior stopterms in the current phrase is not greater than the pre-selected number of interior stopterms in block 2040, then the tuple size is incremented in block 2052. Once the tuple size is incremented in block 2052, determine if there is a term subsequent to T2 in the relevant text in block 2054. If there is not a term subsequent to T2 in the relevant text, then end the subprocess at block 2034, and return to process 2002 in FIG. 20A at block 2014. If there is a term subsequent to T2 in the relevant text in block 2054, then the term subsequent to T2 is identified as T2 in block 2030. The process continues until all acceptable multi-term phrases beginning with T1 are assembled.

The process described in FIG. 20D uses a single class of stopterms to reject some candidate phrases. In one embodiment, accepted phrases can be limited to those phrases containing no stopterms. For example, if the word "the" is a stopterm, the phrase "call number" (the identifier of an aircraft) would be accepted, while the phrase "call the number" and "the call number" would be excluded. In an alternative embodiment, accepted phrases can be limited to phrases meeting two conditions: first, the starting and ending terms are not stopterms of the phrases, and second, the phrases have no more than a certain number of interior terms that are stopterms. An interior term is a term that is not a first or a last term in a phrase. For example, using a typical list of stopterms including such words as "to", "the", and "in", and allowing up to two interior stopterms, the phrases "approach runway", "approach to runway", and "approach to the runway" would be accepted, while the phrases "approach the runway in", "approach the runway in the fog", "the approach", and "approach the" would be rejected.

Having a single class of stopterms, combined with determination of the position of stopterms within a phrase, may be sufficient for some applications of the phrase extraction process, but having additional classes of terms provides additional control and refinements in extracting phrases having particular forms. A process using multiple classes of terms is illustrated in FIG. 20E, described below. FIG. 20E illustrates an alternative embodiment of extracting selected multi-term phrases at each starting position in the text. The process of FIG. 20E differs from the process of FIG. 20D in that the process illustrated in FIG. 20E includes use of a number of classes of stopterms and a class of interior-only terms. Three classes of stopterms are illustrated: starting stoptersm, interior stopterms, and ending stopterms. A starting stopterm is a term that may not be the first term of a phrase. An interior stopterm is an interior term that may appear only up to a pre-selected number of times in a phrase (including zero times). An ending stopterm is a term that may not be the last term of a phrase. When distinguishing among the three classes is unnecessary, a stopterm in any class is merely referred to as a stopterm. An interior-only term is a term that is not an interior stopterm and may not be the first or last term of a phrase.

Distinguishing starting stopterms from ending stopterms allows, for example, acceptance of phrases such as "the autopilot" and "the mode control panel" by not including the word "the" among the class of starting stopterms, while also excluding phrases such as "autopilot the" and "mode control panel the" by including the word "the" among the class of ending stopterms. Distinguishing the classes of starting stopterms from ending and interior stopterms allows, for example, acceptance of phrases like "call number", "the call number", and "a call number" by not including "the" and "a" among the class of starting stopterms, while also rejecting phrases such as "call a number", "call number and", and "call number of" by allowing no interior stopterms and including "a", "and", and "of" among the classes of ending and interior stopterms. Phrases such as "and call number" and "of call number" are also rejected by including "and" and "of" among the class of starting stopterms. Distinguishing the class interior-only terms from the various classes of stopterms allows, for example, acceptance of phrases such as "rate of climb", "time of day", and "mode control panel" by including "of" among the class of interior-only terms (and conversely not including "of" among the class of interior stopterms), while also excluding phrases like "rate of", "rate of the", "the rate of climb", and "of climb", by including "of" and "the" among both the classes of starting and ending stopterms, and also excluding such phrases as "cleared the runway" and "begin to climb" by allowing no interior stopterms and including "the" and "to" among the class of interior stopterms.

In another application, the phrase extraction process can be used for highly targeted phrase extractions, such as finding certain prepositional phrases. In one alternative, highly targeted extractions can be done by defining all vocabulary words except prepositions as starting stopterms, using a conventional stoplist for the ending and interior stopterms, and allowing up to two interior stopterms. Such phrases as "on board", "in the cockpit", "at altitude", and "below the other aircraft", would be accepted, while all phrases not starting with a preposition would be rejected. Interior-only terms could be used to further limit the acceptable phrases. Additional general classes of terms, such as ending-only terms, can also be envisioned.

FIG. 20E illustrates an alternative embodiment of a subprocess of extracting selected multi-term phrases at each starting position in block 2004 of FIG. 20 and FIG. 20A. An interior stopterm count is set to zero in block 2056. The initial value of the tuple size is set to 2 in block 2058. Next, the term subsequent to T2 is identified as T2 in block 2060. If the tuple size is greater than a pre-selected maximum phrase length in block 2062, then end the subprocess in block 2064, and return to process 2002 in FIG. 20A at block 2014. If the tuple size is not greater than a pre-selected maximum phrase length in block 2062, then determine if T2 is an interior stopterm in block 2066. If T2 is an interior stopterm in block 2066, then the interior stopterm counter is incremented in block 2068 and the number of interior stopterms in the current phrase is compared to a pre-selected number of interior stopterms in block 2070. If the number of interior stopterms is greater than the pre-selected number of interior stopterms, then end the subprocess in block 2064, and return to process 2002 in FIG. 20A at block 2014. If the number of interior stopterms in the current phrase is not greater than the pre-selected number of interior stopterms in block 2070, then the tuple size is incremented in block 2072. If T2 is not an interior stop term in block 2066, then determine if T2 is an ending stopterm in block 2076. If T2 is not an ending stopterm then the current phrase is saved in the phrase list in block 2022, as described in FIG. 20C, and then the tuple size is incremented in block 2072. If T2 is an ending stopterm in block 2076, then determine if T2 is an interior-only term in block 2078. if T2 is not an interior-only term, then end the subprocess in block 2064, and return to process 2002 in FIG. 20A at block 2014. If T2 is an interior only term in block 2078, then the tuple size is incremented in block 2072. Once the tuple size is incremented in block 2072, determine if there is a term subsequent to T2 in the relevant text in block 2074. If there is not a term subsequent to T2 in the relevant text, then end the subprocess in block 2064, and return to process 2002 in FIG. 20A at block 2014. If there is a term subsequent to T2 in the relevant text in block 2074, then the term subsequent to T2 is identified as T2 in block 2060. The phrase processing continues until all acceptable phrases beginning with T1 are assembled.

Figure 21:
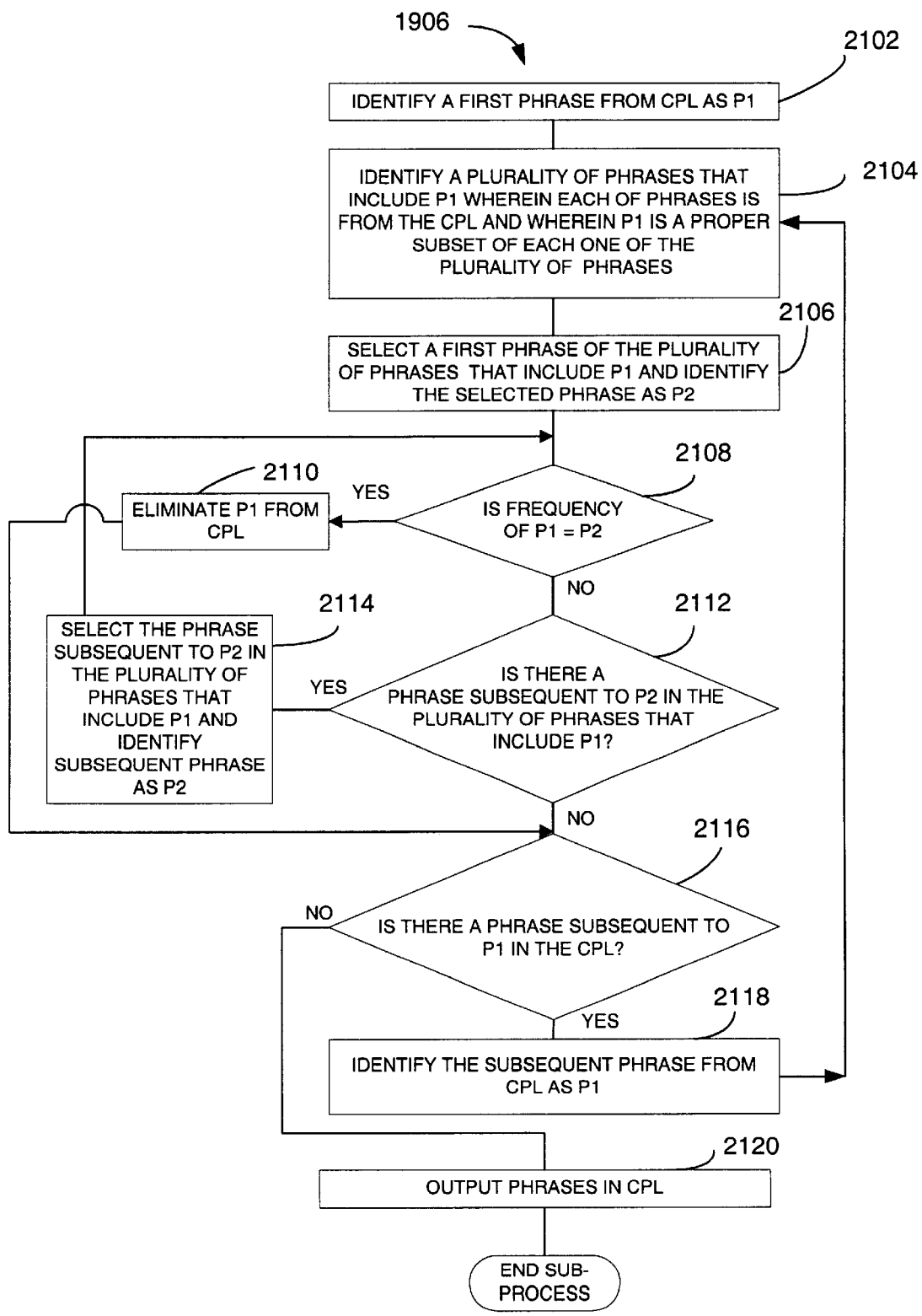
FIG. 21 illustrates one embodiment of culling the extracted phrases.

FIG. 21 illustrates one embodiment of culling the extracted phrases in block 1906 of FIG. 19. The first phrase from the candidate phrase list (CPL) is identified as P1 in block 2102. Several phrases from the CPL are identified. Each one of the identified phrases includes P1 as a proper subset in block 2104 i.e. P1 is only a portion of each one of the phrases. A first one of the phrases is identified as P2 in block 2106. If the frequency of P1 is equal to the frequency of P2 in block 2108 then P1 is eliminated from the CPL in block 2110 and the process continues at block 2116 below. If the frequency of P1 is not equal to the frequency of P2 in block 2108, then a phrase subsequent to P2 is selected as P2 in blocks 2112, 2114 and the new P2 is input to block 2108 above. If there are no more phrases subsequent to P2 in block 2112, then a phrase subsequent to P1 in the CPL is selected as P1 2116, 2118 and the subsequent P1 is processed beginning with block 2104. If there are no more phrases subsequent to P1 in the CPL then the phrases in the CPL are output to the process of gathering related phrases in block 1908 of FIG. 19.

Figure 22:
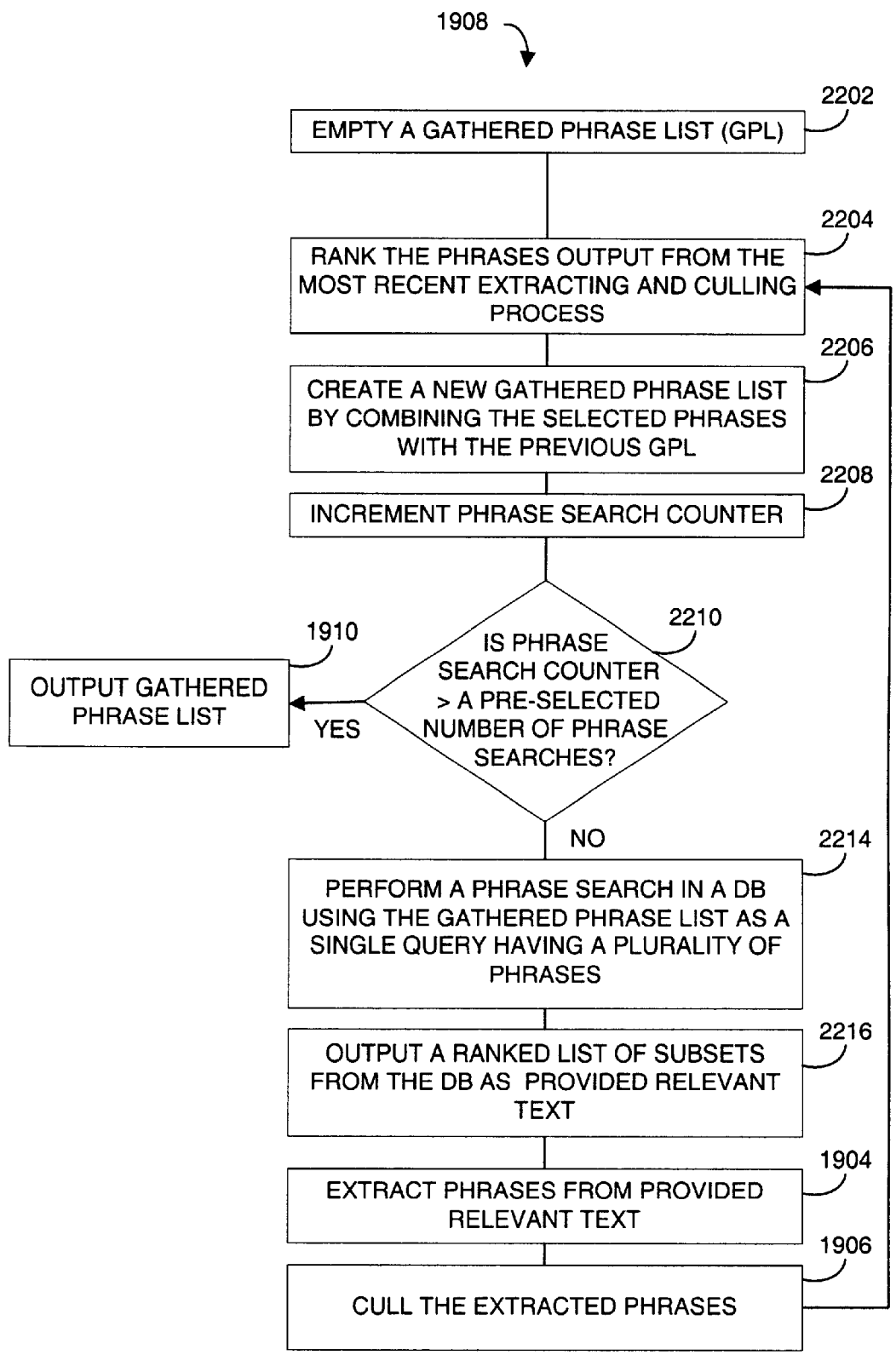
FIG. 22 illustrates one embodiment of gathering related phrases.
Figure 22A:
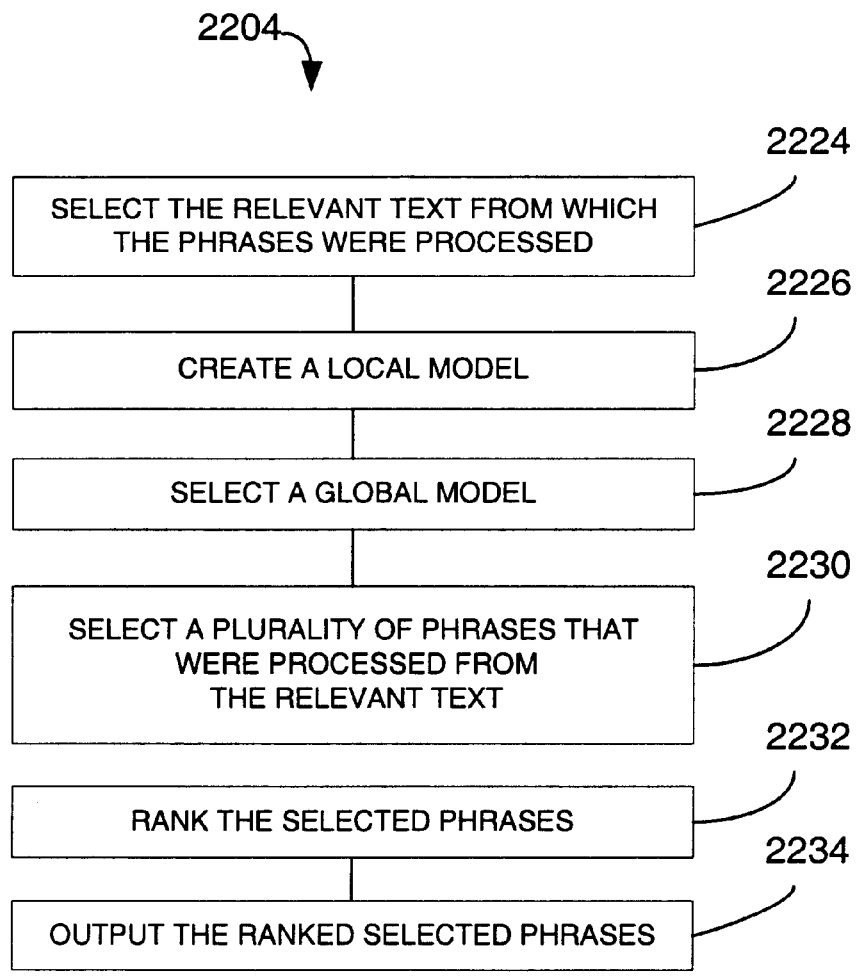
FIG. 22A illustrates one embodiment of ranking the phrases output from the extracting and culling processes.
Figure 22B:
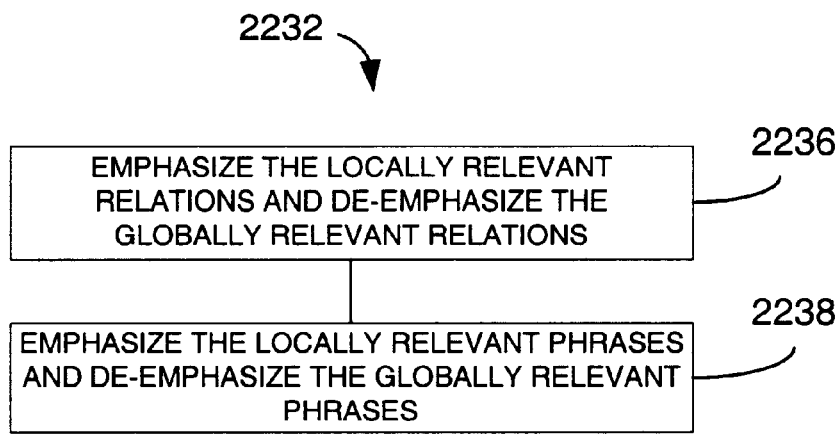
FIG. 22B illustrates one embodiment of ranking the selected phrases.
Figure 22C:
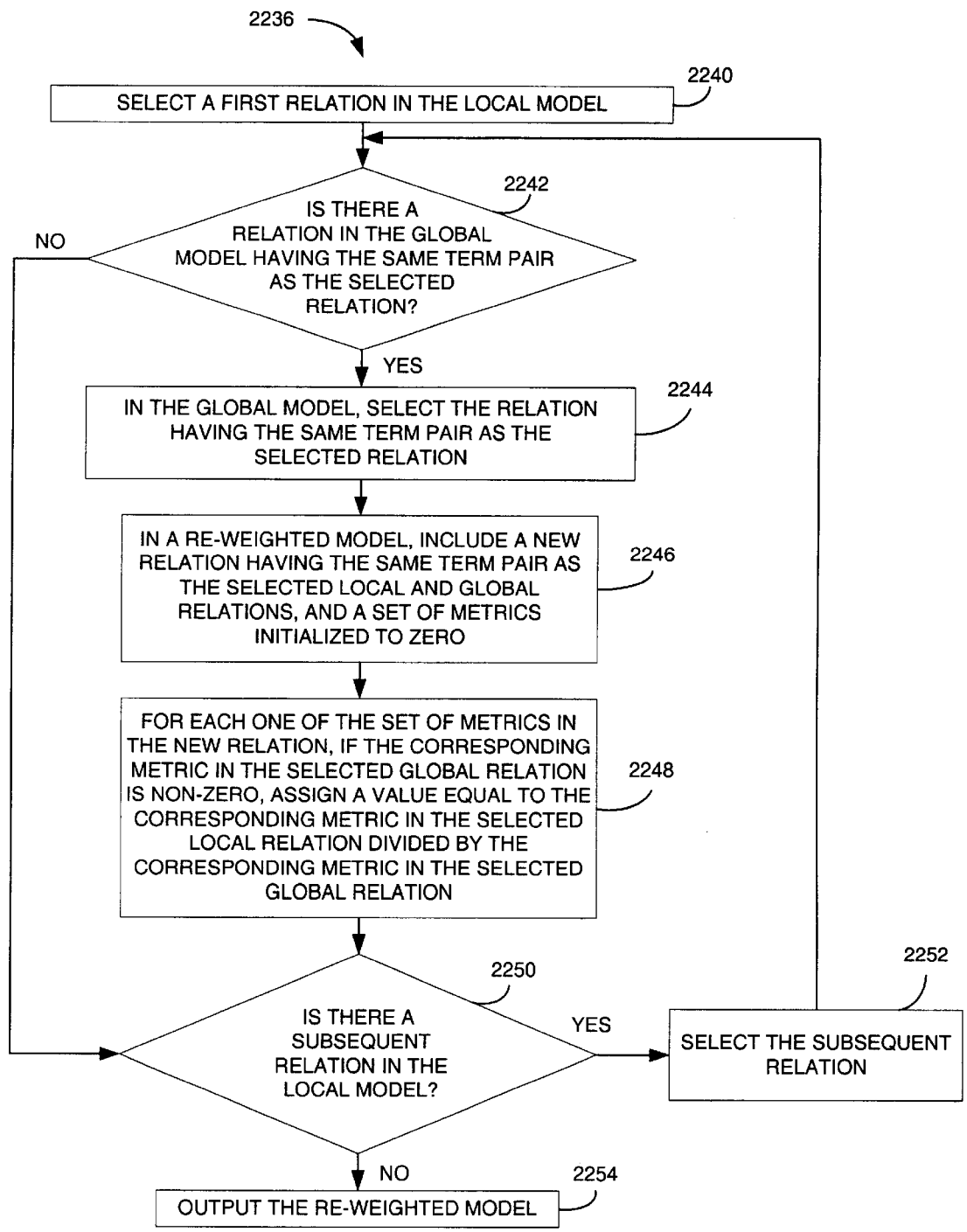
FIG. 22C illustrates one embodiment of a process of emphasizing the locally relevant relations and de-emphasizing the globally relevant relations.
Figure 22D:
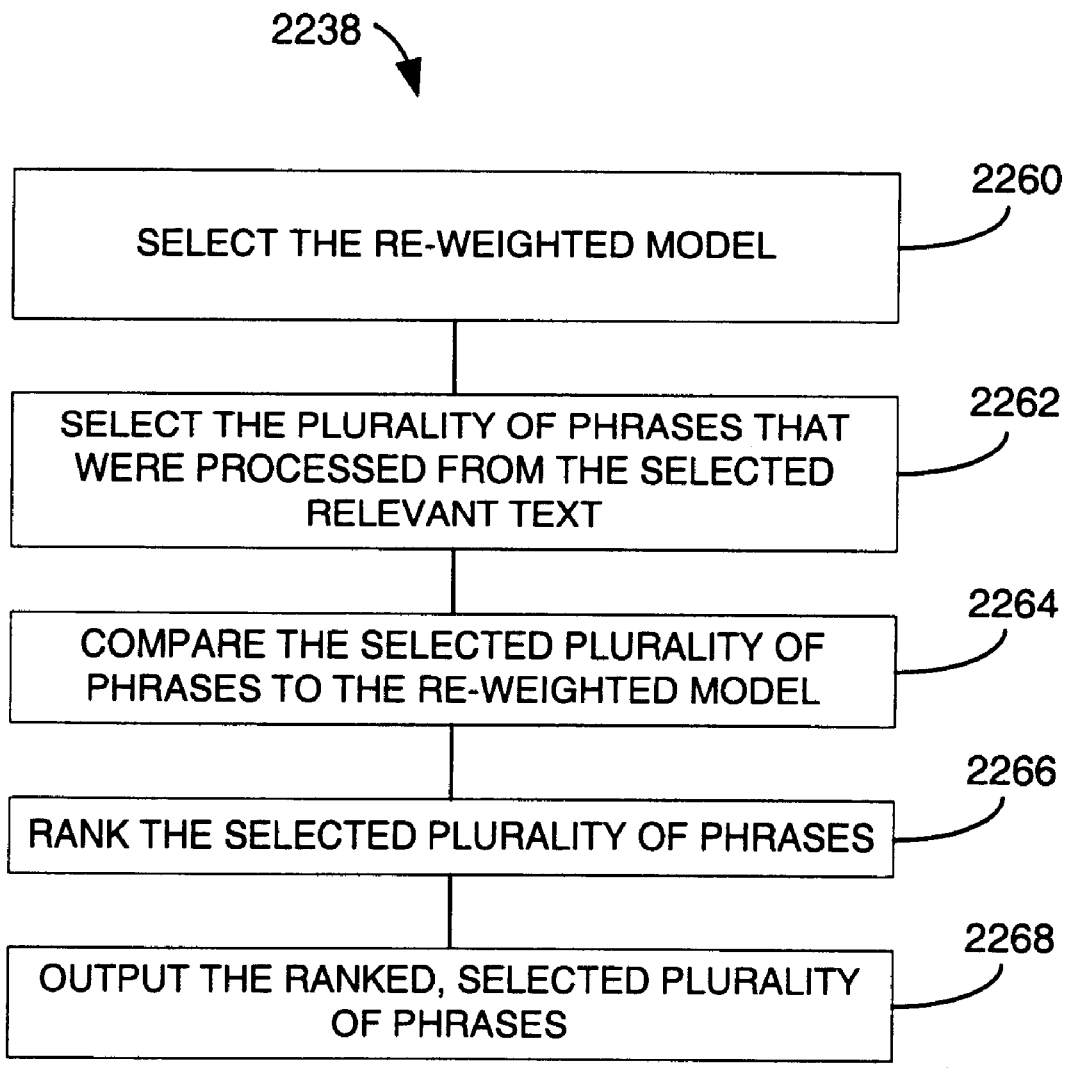
FIG. 22D illustrates one embodiment of emphasizing the locally relevant phrases and de-emphasizing the globally relevant phrases.

FIGS. 22–22D illustrate various embodiments of the process of gathering related phrases in block 1908 of FIG. 19. In addition to the processes illustrated in FIGS. 22–22D, related phrases can alternatively be gathered by manually selecting related phrases, or by a single iteration or a multiple iteration of the processes presented in FIGS. 22–22D.

FIG. 22 illustrates one embodiment of gathering related phrases 1908. A gathered phrase (GPL) list is initialized in block 2202. The phrases output from the most recent extracting and culling process are ranked in order of relevance, in block 2204. The ranked phrases are selected and then combined with the GPL to create a revised GPL in block 2206. A phrase search counter is then incremented in block 2208 and evaluated in block 2210. If the phrase search counter is greater than a pre-selected number then the gathered phrase list is output in block 1910. The phrase search counter counts the number of iterations through the gathering related phrases process 1908. Each iteration through the process of gathering related phrases 1908 further focuses the discovered phrases on the designed topic. For one embodiment a single iteration is sufficient. For alternative embodiments additional iterations can also be used.

If the phrase search counter is not greater than a pre-selected number of phrase searches in block 2210 then a phrase search is performed using the gathered phrases as a single query including multiple phrases in block 2214. The phrase search in block 2214 is performed on a database having relevant data. This database may or may not include the relevant text provided in block 1902 of FIG. 19 in the initial phrase discovery process, but the database should include a common topic with the relevant text provided in block 1902.

The phrase search in block 2214 outputs a ranked list of subsets from the database and a selected number of the ranked list of subsets are then designated as the relevant text and input to the extract phrases process described in FIG. 20 in block 1904. The phrases extracted from the extract phrases process in block 1904 are then input to the process of culling the extracted phrases described in FIG. 21 in block 1906. The phrases output from the process of culling the extracted phrases in block 1906 are then ranked at block 2204 and the process repeats, until the number in the phrase search counter is greater than the pre-selected number of phrase searches.

FIG. 22A illustrates one embodiment of ranking the phrases output from the extracting and culling processes of block 2204 of FIG. 22. First, the relevant text from which the phrases were processed is selected in block 2224. A local model is then created in block 2226. A local model is a contextual model of subsets of the provided relevant text from which the phrases were extracted and culled. All of the relevant text could be modeled in one embodiment. Alternatively, only a selected number of subsets of the provided relevant text that are also the most representative of the provided text are also modeled. One embodiment of a local model includes isolating distinct subsets from one another within the selected relevant text. Another embodiment of a local model includes inserting several non-term "buffer terms" between distinct subsets. A non-term buffer term includes a set of text designated as space filler. Another embodiment of a local model includes generating a vocabulary list that includes the terms that occur in the selected relevant text and the frequency of each term.

Next, a global model is selected in block 2228. A global model can include a contextual model of the entire database or a single relational model of a number of subsets. A global model can also include a single relational model of a number of subsets wherein the number of subsets is greater than the number of subsets used to generate the local model. Alternatively, a global model can include a single relational model of a number of subsets wherein the subsets include the relevant text from which the selected phrases were extracted and culled. A global model can also include a single relational model of subsets wherein the subsets include text that is similar to the relevant text from which the selected phrases were extracted and culled. A global model can also include a number of relational models wherein each model represents one subset. A global model can also include creating a single relational model of a number of subsets by reducing the relations to unique relations. This process is similar to reducing the relations in a query described in keyterm search above, except reducing relations from all of the subset models, not just the subset relations matching a query. For another alternative embodiment a global model also includes limiting unique global model relations to only those relations having the same term pairs as relations in the local model.

A number of the phrases that were processed from the relevant text are selected in block 2230 and ranked in block 2232. As one alternative, all phrases having a frequency in the relevant text greater than a pre-selected value are selected and ranked. The ranked phrases are then output in block 2234. For an alternative, the output phrases and their corresponding ranking values are output. The output phrases can also be sorted. For one embodiment the output phrases are sorted in an order corresponding to their ranking values.

FIG. 22B illustrates one embodiment of ranking the selected phrases in block 2232. First the locally relevant relations are emphasized and the globally relevant relations are de-emphasized in block 2236. Next, the locally relevant phrases are emphasized and the globally relevant phrases are de-emphasized in block 2238.

FIG. 22C illustrates one embodiment of a process of emphasizing the locally relevant relations and de-emphasizing the globally relevant relations in block 2236. First, a first relation is selected in the local model in block 2240. If there is not a relation in the global model having the same term pair as the selected relation in the local model in block 2242, then processing continues at block 2250, described below. If there is a relation in the global model having the same term pair as the selected relation in the local model in block 2242, then the relation having the same term pair as the selected local relation is selected in the global model in block 2244. Next, a new relation is included in a re-weighted model in block 2246. The new relation includes the same term pair as the selected local relation, which is also the same term pair as the selected global relation. The metrics of the new relation are initialized to zero. For each of the types of metrics in the new relation, if the corresponding type of metric in the selected global relation is non-zero, then the corresponding type of metric of the new relation in the re-weighted model is set equal to the result of the corresponding type of metric in the selected relation from the local model divided by the corresponding type of metric in the selected relation from the global model in block 2248. If there is a subsequent relation in the local model in block 2250, that relation is selected in block 2252 and processing continues at block 2242. The process continues in blocks 2242–2252 until all relations in the local model are processed. If there is no subsequent relation in the local model in block 2250, then the re-weighted local model is output in block 2254. For one alternative, each type of metric in each relation of the re-weighted model is multiplied by the frequency of the first term of the relation and the frequency of the second term of the relation, as represented in the vocabulary list obtained above with the local model from the selected relevant text.

FIG. 22D illustrates one embodiment of emphasizing the locally relevant phrases and de-emphasizing the globally relevant phrases in block 2238 of FIG. 22B. First the re-weighted model is selected in block 2260 and the processed phrases are selected in block 2262. Alternatively, a weight could also be determined for each one of the processed phrases. The weight for each one of the processed phrases could also be set to a pre-selected value such as 1. A frequency of occurrence of the phrase within the selected relevant text could also be determined and used as the phrase weight. The selected phrases are then compared to the re-weighted model in block 2264. The selected phrases are then ranked in order of relevance to the re-weighted model in block 2266. The comparison in block 2264 can be a process similar to the comparison process in keyterm search described in FIG. 10 above. Thus, each phrase is modeled as a subset of the database, and the re-weighted model is used as a criterion model. The criterion model (that is, the re-weighted model) is compared with the subset models which represent the phrases to determine the degree of similarity of the criterion model and each of the phrase models. In addition, the ranking of the phrases in block 2266 can be done using the process of ranking subsets in keyterm search described above. Thus, the phrases are ranked on their degree of similarity to the re-weighted model.

The ranked phrases can also be scaled. For one embodiment the scaling for each one of the processed phrases includes multiplying the ranking value by a function of the phrase frequency. For one embodiment the scaling for each one of the processed phrases includes dividing the ranking value by the number of possible pair-wise, inter-term relations in the phrase. For one embodiment the scaling for each one of the processed phrases includes dividing the ranking value by a function of the largest ranking value. The ranked phrases are then output in block 2268. The output phrases can also include the corresponding ranking value of each one of the ranked phrases.

This application is intended to cover any adaptations or variations of the present invention. For example, those of ordinary skill within the art will appreciate that the phrase discovery process can be executed in varying orders instead of being executed in the order as described above.

Phrase discovery scans narratives to find phrases that are related to topics of interest. This is very different from phrase generation, which uses phrase models to build likely phrases on a given term or phrase. In the example shown here, phrases related to "fatigue" are discovered. These include, for example: "rest period", "continuous duty", "crew scheduling", "reserve or standby", "crew fatigue", and "continuous duty overnight". Unlike generated phrases, discovered phrases are not required to contain any of the query terms. For this example, the phrase discovery process began with a keyterm search on the terms: "fatigue", "fatigued", "fatiguing", "tired", "tiredness", "sleep", "asleep", "sleeping", "sleepy", and "circadian". The particular forms of these terms were suggested by reviewing the vocabulary used in the narratives of the ASRS database. The phrase discovery process ultimately produced a collection of relevance-ranked narratives and a list of phrases that are topically related to "fatigue".

The following Table 3.1 shows 50 of 420 phrases related to the topic of fatigue. The 420 phrases were extracted from three sets of 200 narratives that were found to be most relevant to the topic of fatigue. The frequency of each phrase within a set of 200 narratives is shown in the first column. This list shows, for example, that in the context of fatigue, "rest period(s)", "reduced rest", and "crew rest" are the most prominent concerns. Further, these are greater concerns than "continuous duty", "duty period", and "crew duty". The list also shows that "crew scheduling" ranks high among the concerns of the reporters in the context of fatigue. Other prominent concerns include: "reserve or standby", "rest requirements", "crew fatigue", "continuous duty overnight (s)", "adequate rest", "minimum rest", "required rest", "plt fatigue" (i.e., pilot fatigue), and "compensatory rest". The prominence of these fatigue-related phrases parallels the prominence of these concerns in the industry.

TABLE 3.1

| Freq | phrase | freq | phrase |
|---|---|---|---|
| 152 | REST PERIOD | 12 | 24 HR REST PERIOD |
| 109 | REDUCED REST | 12 | CREW SCHEDULER |
| 79 | CREW REST | 12 | FELL ASLEEP |
| 57 | CONTINUOUS DUTY | 12 | LACK OF SLEEP |
| 46 | CREW SCHEDULING | 12 | SCHEDULING PRACTICES |
| 37 | DUTY PERIOD | 11 | ENTIRE CREW |
| 36 | REST PERIODS | 10 | FATIGUE AND STRESS |
| 34 | RESERVE OR STANDBY | 10 | REDUCED REST OVERNIGHT |
| 30 | REST REQUIREMENTS | 9 | DUTY PERIODS |
| 28 | CREW FATIGUE | 9 | EARLY AM |
| 22 | CREW DUTY | 9 | FALL ASLEEP |
| 20 | CONTINUOUS DUTY OVERNIGHT | 9 | FIRST NIGHT |
| 19 | ADEQUATE REST | 8 | CIRCADIAN RHYTHMS |
| 18 | MINIMUM REST | 8 | NOT SLEEP |
| 18 | REQUIRED REST | 8 | PROPER REST |
| 17 | PLT FATIGUE | 8 | SCHEDULING DEPT |
| 16 | COMPENSATORY REST | 8 | SHORT REST |
| 16 | STANDBY STATUS | 8 | STANDBY PLT |
| 15 | REDUCED REST PERIOD | 7 | 14 HR DUTY |
| 15 | SLEEP THE NIGHT | 7 | BODY CLOCK |
| 13 | CONTINUOUS DUTY OVERNIGHTS | 7 | CIRCADIAN RHYTHM |
| 13 | EARLY MORNING | 7 | CONTEXT OF REST PERIOD |
| 13 | LONG DUTY | 7 | DEFINITION OF DUTY |
| 13 | NIGHT'S SLEEP | 7 | DUTY AND REST |
| 13 | RESERVE OR STANDBY STATUS | 7 | DUTY REGS |

It is useful to subdivide the list of topical phrases into groups. One approach, shown below, is based on the prominence of terms in the phrases. To find the prominence of each term among all 420 of the fatigue-related phrases, the frequencies of the term groups containing each term were summed. The top 10 of 304 phrase terms are shown in the following Table 3.2. Table 3.2 shows, for example, that "rest" is the most prominent term among the phrases.

TABLE 3.2

| Sum | phrase term | sum | phrase term |
|---|---|---|---|
| 855 | REST | 151 | FATIGUE |
| 370 | DUTY | 147 | SLEEP |
| 304 | PERIOD | 135 | SCHEDULING |

TABLE 3.2-continued

| Sum | phrase term | sum | phrase term |
|---|---|---|---|
| 291 | CREW | 109 | NIGHT |
| 163 | REDUCED | 102 | RESERVE |

These terms can be used to group the prominent fatigue-related phrases. For example, one can find all of the phrases containing the prominent term "rest". Using this approach, the following 10 tables (Tables 3.3–3.12) show prominent subtopics within the fatigue-related narratives. The frequency of each phrase within 200 fatigue-related narratives is shown in the first column. The following groupings show, for example, that "rest period" and "reduced rest" are the most prominent "rest" phrases. Similarly, "continuous duty" and "duty period" are the most prominent "duty" phrases. Among "period" phrases, "rest period" is far more common than "duty period", indicating that rest periods are a greater concern than duty periods among the sampled narratives.

TABLE 3.3

| freq | REST phrases |
|---|---|
| 152 | REST PERIOD |
| 109 | REDUCED REST |
| 79 | CREW REST |
| 36 | REST PERIODS |
| 30 | REST REQUIREMENTS |
| 19 | ADEQUATE REST |
| 18 | MINIMUM REST |
| 18 | REQUIRED REST |
| 16 | COMPENSATORY REST |
| 15 | REDUCED REST PERIOD |

TABLE 3.4

| freq | DUTY phrases |
|---|---|
| 57 | CONTINUOUS DUTY |
| 37 | DUTY PERIOD |
| 22 | CREW DUTY |
| 20 | CONTINUOUS DUTY OVERNIGHT |
| 13 | CONTINUOUS DUTY OVERNIGHTS |
| 13 | LONG DUTY |
| 9 | DUTY PERIODS |
| 7 | 14 HR DUTY |
| 7 | DEFINITION OF DUTY |
| 7 | DUTY AND REST |

TABLE 3.5

| freq | PERIOD phrases |
|---|---|
| 152 | REST PERIOD |
| 37 | DUTY PERIOD |
| 36 | REST PERIODS |
| 15 | REDUCED REST PERIOD |
| 12 | 24 HR REST PERIOD |
| 9 | DUTY PERIODS |
| 7 | CONTEXT OF REST PERIOD |
| 7 | REQUIRED REST PERIOD |
| 7 | REST PERIOD EXISTS |
| 7 | SAID FOR REST PERIODS |

TABLE 3.6

| freq | CREW phrases |
|---|---|
| 79 | CREW REST |
| 46 | CREW SCHEDULING |
| 28 | CREW FATIGUE |
| 22 | CREW DUTY |
| 12 | CREW SCHEDULER |
| 11 | ENTIRE CREW |
| 7 | MINIMUM CREW REST |
| 5 | 14 HR CREW DUTY |
| 5 | CALL FROM CREW SCHEDULING |
| 5 | CALLED CREW SCHEDULING |

TABLE 3.7

| freq | REDUCED phrases |
|---|---|
| 109 | REDUCED REST |
| 15 | REDUCED REST PERIOD |
| 10 | REDUCED REST OVERNIGHT |
| 7 | SCHEDULED REDUCED REST |
| 4 | REDUCED REST PERIODS |
| 3 | REDUCED REST SCHEDULES |
| 3 | REDUCED REST TRIPS |
| 2 | BLOCK-TO-BLOCK REDUCED REST |
| 2 | BLOCK REDUCED REST |
| 2 | GIVEN A REDUCED REST PERIOD |

TABLE 3.8

| freq | FATIGUE phrases |
|---|---|
| 28 | CREW FATIGUE |
| 17 | PLT FATIGUE |
| 10 | FATIGUE AND STRESS |
| 7 | FATIGUE AND STRESS INDUCED FATIGUE |
| 5 | EXTREMELY FATIGUED |
| 5 | FATIGUE CAUSED |
| 4 | CAUSED BY PLT FATIGUE |
| 4 | CHRONIC FATIGUE |
| 4 | LEVEL OF FATIGUE |
| 4 | SIGNS OF FATIGUE |

TABLE 3.9

| freq | SLEEP phrases |
|---|---|
| 15 | SLEEP THE NIGHT |
| 13 | NIGHT'S SLEEP |
| 12 | FELL ASLEEP |
| 12 | LACK OF SLEEP |
| 9 | FALL ASLEEP |
| 8 | NOT SLEEP |
| 7 | SLEEP PATTERNS |
| 6 | FALLING ASLEEP |
| 6 | SLEEP PRIOR |
| 5 | ENOUGH SLEEP |

TABLE 3.10

| freq. | SCHEDULING phrases |
|---|---|
| 46 | CREW SCHEDULING |
| 12 | SCHEDULING PRACTICES |
| 8 | SCHEDULING DEPT |
| 5 | CALL FROM CREW SCHEDULING |
| 5 | CALLED CREW SCHEDULING |
| 5 | TYPE OF SCHEDULING |
| 3 | CALL SCHEDULING |
| 3 | CALLED SCHEDULING |

TABLE 3.10-continued

| freq. | SCHEDULING phrases |
|---|---|
| 3 | SCHEDULING ASKED |
| 3 | SCHEDULING CALLED |

TABLE 3.11

| freq. | NIGHT phrases |
|---|---|
| 20 | CONTINUOUS DUTY OVERNIGHT |
| 15 | SLEEP THE NIGHT |
| 13 | CONTINUOUS DUTY OVERNIGHTS |
| 13 | NIGHT'S SLEEP |
| 10 | REDUCED REST OVERNIGHT |
| 9 | FIRST NIGHT |
| 7 | LATE NIGHT |
| 6 | REST OVERNIGHT |
| 4 | REST THE NIGHT |
| 3 | LATE AT NIGHT |

TABLE 3.12

| freq. | RESERVE phrases |
|---|---|
| 34 | RESERVE OR STANDBY |
| 13 | RESERVE OR STANDBY STATUS |
| 7 | RESERVE' OR' STANDBY' PLT |
| 7 | RESERVE OR STANDBY DUTY |
| 7 | RESERVE OR STANDBY PLT |
| 6 | RESERVE OR STANDBY FALLS |
| 5 | CONSISTENT INTERP OF RESERVE |
| 4 | RESERVE CREW |
| 4 | RESERVE PLT |
| 3 | AM A RESERVE CAPT |

Two very useful by-products of the method used to produce the topically relevant phrases are a display of the most relevant narratives with their matching phrases highlighted, and a relevance-ranked list of the narratives that are relevant to the topic. The following is the most relevant narrative, in its entirety. Although it does not contain any form of the term "fatigue", it does contain a diversity of fatigue-related topics.

I WORK FOR A LARGE REGIONAL/NATIONAL CARRIER AND CURRENTLY AM A RESERVE CAPT. OUR CURRENT WORKING AGREEMENT HAS VERY LITTLE IN THE WAY OF WORK RULES REGARDING SCHEDULING AND HRS OF SVC, AND THUS, WE ARE SCHEDULED AND FLOWN TO THE MAX ALLOWED BY THE FARS, WHICH WE ALL KNOW LEAVES MUCH TO BE DESIRED WITH THE REALITY OF OUR CIRCADIAN RHYTHMS. MANY PEOPLE THINK THAT CIRCADIAN RHYTHMS ONLY APPLY TO LONG HAUL INTL PLTS. HOWEVER, AFTER A NUMBER OF YRS AS BOTH A MIL AND COMMERCIAL CARRIER PLT I'VE FOUND THAT EVERYONE'S BODY NEEDS A ROUTINE, AND RADICAL CHANGES CAN ADVERSELY AFFECT ONE'S PERF AND ABILITY TO GET ADEQUATE SLEEP DURING THE SUPPOSED REST PERIOD. OUR AIRLINE'S SCHEDULING DEPT OPERATES UNDER CRISIS MGMNT DUE TO OUR MGMNT'S 'STAFFING STRATEGY,' AND THUS REQUIRES MANY RESERVE CREW MEMBERS TO COVER MORE THAN 1 SCHEDULED TRIP IN A CALENDAR DAY AND THUS WE HAVE A LARGE NUMBER OF 'SCHEDULED REDUCED REST PERIODS' WHICH ARE 8 HRS, WHICH DOES NOT INCLUDE TRANSPORTATION LCL IN NATURE, WHICH, IN REALITY, REDUCES YOUR TIME AT A REST FACILITY WELL BELOW 8 HRS, PROVIDED YOU FALL TO SLEEP AS SOON AS YOU ARRIVE AT THE HOTEL. MY TRIP/RERTE FROM HELL STARTED AS A 3 DAY WITH AN 8 HR REST THE FIRST NIGHT WITH AN EARLY RPT. I HAPPENED TO BE COMING OFF A COUPLE OF NIGHT TRIPS AND THE EARLY MORNING RPT HAD ME A LITTLE OUT OF SYNC. WHEN WE ARRIVED AT OUR NEXT OVERNIGHT STATION, WHICH WE WERE SCHEDULED COMPENSATORY REST, I FELL ASLEEP EARLY NOT BEING ACCUSTOMED TO EARLYMORNING RPTS AND THUS WOKE VERY EARLY ON THE THE THIRD DAY. OUR DAY WAS SCHEDULED TO START AT 0450 AND END AT 1358 LCL. WHEN I WENT TO CHKOUT, CREW SCHEDULER INFORMED ME I HAD BEEN REROUTED AND I NOW HAD ADDITIONAL FLTS WITH ANOTHER OVERNIGHT AND MY DUTY DAY NOW WAS GOING TO BE 15:30, LEGAL BUT SAFE? LATER, AS I WAITED TO MAKE THE LAST FLT TO THE OVERNIGHT STATION THEY HAD ME DO AN ADDITIONAL 2 LEGS, WHICH BROUGHT ME UP TO 8 LEGS. AFTER CHKING THE TRIP ON THE SCHEDULING COMPUTER, I FOUND THE SCHEDULER HAD CHANGED THE TRIP TO SHOW A COMBINATION OF ACTUAL TIME FLOWN, AND MARKETING TIMES TO MAKE THE TRIP LEGAL (I.E., UNDER 8 HRS SCHEDULED) AS OPPOSED TO USING THE HISTORIC BLOCK TIMES AS IS CALLED FOR BY BOTH OUR OPS MANUAL AND FAA POI. THE REMAINDER OF THE TRIP WAS MUCH THE SAME. THE FAA NEEDS TO RECOGNIZE THE IMPORTANCE OF QUALITY CREW REST AND IMPLEMENT GUIDELINES TO PREVENT SUCH SCHEDULING PRACTICES. ON THE THIRD AND FOURTH DAY, I WAS FAR FROM BEING AT PEAK PERF AND HAD THERE BEEN A SERIOUS EMER THE OUTCOME MAY HAVE BEEN QUESTIONABLE. THE FAA IS MANDATING MANY ITEMS TO ENHANCE SAFETY SUCH AS TCASII AND GPWS, HOWEVER, THEY SEEM TO FORGET THE MOST CRITICAL AND COMPLEX PIECE OF EQUIP ON THE ACFT: THE PLT! (254345)

Numerous fatigue-related phrases are highlighted in this narrative, and most of these appear in the list of 420 fatigue-related phrases produced by phrase discovery. Some phrases that are not on the list are also highlighted. The phrase "scheduled compensatory rest", for example, is highlighted because the phrases "scheduled rest" and "compensatory rest" are on the list. This approach aids the user in recognizing compound topical phrases in the narratives. The following Table 3.13 shows the accession numbers of the 100 narratives that are most relevant to the fatigue-related phrases. The more relevant narratives appear closer to the top of the list.

TABLE 3.13

| 1. 254345 | 26. 340923 | 51. 244901 | 76. 190632 |
| 2. 288683 | 27. 256799 | 52. 80148 | 77. 96789 |
| 3. 288893 | 28. 261075 | 53. 307314 | 78. 358723 |
| 4. 288846 | 29. 123541 | 54. 118537 | 79. 147013 |

TABLE 3.13-continued

| | | | |
|---|---|---|---|
| 5. 317360 | 30. 206207 | 55. 302099 | 80. 298219 |
| 6. 344664 | 31. 193131 | 56. 245026 | 81. 302300 |
| 7. 295352 | 32. 276356 | 57. 294430 | 82. 223012 |
| 8. 289770 | 33. 367856 | 58. 281395 | 83. 172229 |
| 9. 290921 | 34. 254267 | 59. 142582 | 84. 368250 |
| 10. 299489 | 35. 294130 | 60. 270256 | 85. 206269 |
| 11. 362160 | 36. 309408 | 61. 364640 | 86. 375952 |
| 12. 188837 | 37. 82286 | 62. 146711 | 87. 134612 |
| 13. 96242 | 38. 145545 | 63. 140005 | 88. 280233 |
| 14. 277949 | 39. 311602 | 64. 337600 | 89. 373770 |
| 15. 233057 | 40. 296275 | 65. 258759 | 90. 185044 |
| 16. 255852 | 41. 205528 | 66. 246248 | 91. 261246 |
| 17. 297614 | 42. 319125 | 67. 206734 | 92. 123033 |
| 18. 281704 | 43. 262904 | 68. 254490 | 93. 360420 |
| 19. 257793 | 44. 367822 | 69. 275586 | 94. 345560 |
| 20. 219810 | 45. 314510 | 70. 102754 | 95. 189506 |
| 21. 360800 | 46. 164061 | 71. 218676 | 96. 108189 |
| 22. 96245 | 47. 184813 | 72. 123335 | 97. 356959 |
| 23. 273938 | 48. 348901 | 73. 168334 | 98. 306800 |
| 24. 245003 | 49. 176651 | 74. 301360 | 99. 270930 |
| 25. 324660 | 50. 143879 | 75. 112090 | 100. 151142 |

This example shows that phrase discovery is useful for finding topically related phrases and narratives that do not necessarily contain the original query terms or phrases.

Phrase discovery is somewhat similar to the so-called "natural language processing" (NLP) methods such as (Godby, 1994); (Jing and Croft, 1994); (Gutwin, Paynter, Witten, Nevill-Manning, and Frank, 1998); (de Lima and Pedersen, 1999); and (Jones and Staveley, 1999), of phrase-finding in that phrase discovery classifies words and requires that candidate word sequences match particular patterns. Most methods, such as (Godby, 1994); (Jing and Croft, 1994); (Gutwin, Paynter, Witten, Nevill-Manning, and Frank, 1998); (de Lima and Pedersen, 1999); and (Jones and Staveley, 1999), however, classify words by part of speech using grammatical taggers and apply a grammar-based set of allowable patterns. These methods typically remove all punctuation and stopterms as a preliminary step, and most then discover only simple or compound nouns leaving all other phrases unrecognizable. In contrast, phrase discovery described herein uses the full text, and applies a simple classification scheme where one categorical distinction is between stopterms and non-stopterms. When phrase discovery is applied to text, stopterms can include punctuation and conventional stopterms. In addition, phrase discovery uses a simple, procedurally defined set of acceptable patterns that can require phrases to begin and end with non-stopterms, can limit the number of interior stopterms, and can allow the "-" (dash) character to be an interior term.

Like Keyphind and Phrasier of Gutwin, Paynter, Witten, Nevill-Manning, and Frank (1998) and Jones and Staveley (1999), phrase discovery described herein identifies phrases in sets of documents. In contrast to Keyphind and Phrasier, however, phrase discovery requires no grammatical tagging, no training phrases, no manual categorization of phrases, and no pre-existing lists of identifiable phrases. Further, phrase discovery identifies a far greater number of the phrases that occur within sets of documents because its method of phrase identification is more powerful. The larger number of phrases identified by phrase discovery also provides much more information for determining the degree of relevance of each document containing one or more of the phrases.

Other Applications

The above described methods and processes of keyterm search, phrase search, phrase generation and phrase discovery have been described and illustrated in terms of information retrieval (IR) embodiments. In IR: terms are symbols or elements of a data set, subsets are collections of symbols, databases are collections of subsets, each relation is binary and links a symbol pair, and quantification of relations is based on contextual associations of symbols within subsets. Further, models are collections of symbol relations, the models can be aggregated, the models can represent subsets, databases, and queries, models can be ranked on similarity to other models, and sequentially grouped terms are derived from models and subsets.

It is important to recognize that there are other "real world" embodiments of these concepts. These real world embodiments are derived from the fact that terms are not limited to being symbols, but can also refer to, or be, entities in the real world, such as people, objects, concepts, actions, attributes, and values. In contrast to the IR embodiment in which symbol collections are subsets, one real-world embodiment includes entity collections such as: occurrences, events, incidents, episodes, circumstances, domains, situations, environments, and objects. Further, any entity collection can be treated as an entity, and any entity can be further elaborated as an entity collection, depending on the observed or desired level of detail. While databases define the total scope of subset collections in the IR embodiments, domains define the total scope of entity collections (e.g., situations) in a real-world embodiment.

As with term pair relations in the IR embodiment, quantification of entity pair relations in the real world can also be based on contextual associations. In the real world, the scope of that context is space, time, causality, and thought. Thus, the notion of context is not limited to proximity relations among symbols within a subset. Instead, real-world context is a much broader concept, one that is more fully represented by the term "metonymy" in the sense developed by Roman Jakobson (Jakobson, R.: "Two aspects of language and two types of aphasic disturbances" (1956), (pp. 95–114) and "Marginal notes on the prose of the poet Pasternak" (1935), (pp. 301–317), in K. Pomorska and S. Rudy (Eds.), Language in Literature. Belknap Press, Cambridge, Mass., 1987). Jakobson asserted that the interpretation of a symbol or entity is derived from both its similarity to others and its contextual association with others. Thus, the contextual meaning of a symbol or entity is determined by its connections with others in the same context, that is, by its metonymic relations with others. This notion of metonymy, of contextual meaning, is a fundamental structural component of narrative text, symbol systems, and human behavior, according to Jakobson.

This conception of contextual meaning, combined with the fact that symbols typically refer to real-world entities (as when the word "autopilot" in a narrative refers to the actual system in the real world), suggests that the contextual relations within symbol structures (e.g., narrative text) refer to the metonymic relations within entity structures in the real world (e.g., the situation described in the narrative text). As a practical example, since narrative text is based on real-world situations, the structural relationships among the symbols in narrative text must ultimately be based on the structural relationships among the entities found in the real-world situations described in the narratives.

Given a correspondence between entities and symbols, and a correspondence between their metonymic relations, measurements of metonymy within a symbol structure correspond to measurements of metonymy within a corresponding entity structure. For example, a real-world situation can be implicitly or explicitly modeled by an observer and then mapped to an arrangement of words in a narrative describing the situation. The words are symbols corresponding to entities in the situations. Due to the structure of narratives, which maps situational meaning to narrative meaning, contextually related entities tend to be mapped to contextually related words. Consequently, the contextual associations within the narrative (i.e., the symbol structure) created by the observer can be measured as a means of measuring the structure of the situation in the real world. Thus, a metonymic model of the narrative structure is a metonymic model of the structure of the corresponding real-world situation. Similarly, a musical inspiration or experience can be mapped to musical notation that can subsequently be mapped to a metonymic model of the musical inspiration or experience itself. Further, genetic or protein sequences can be represented as symbols that can subsequently be mapped to a metonymic model of the physical entities themselves.

It is also possible to directly model entity structures (e.g., situations or environments) without using the intermediary of a narrative or comparable representation. This can be accomplished by identifying each pair of entities and quantifying their degree of metonymic association. The results can be greatly simplified by considering only the most closely associated entity pairs, which can still produce a useful model (Simon, H. A.: The Sciences of the Artificial. MIT Press, Cambridge, Mass., 1969). Further simplification can be achieved by including only those entity pairs that are of particular concern to the observer, such as the essential details of an incident. The resulting models can be structured exactly as are the models of subsets, that is, as collections of relations consisting of pair-wise associations of terms, each quantified by the degree of their metonymic association. The models can then be aggregated, compared, sorted, and otherwise manipulated in a manner similar to those applied to models derived from the IR embodiments described above.

Since observers filter observations through their concerns, every model derived directly or indirectly from observations is subjective. Subjective models of entity structures can be called "individual situated models", "individual domain models", or can in some comparable way be named as a function of the scope of the model. In all cases, these models can be considered to be models of presence, since they represent the pattern and degree of engagement of the observer with a particular subset of the real world. In addition, these models represent the observer's interpretation of the presence of each entity within the entity structure, since the engagement of each entity with the other entities is also represented in the model.

In order to approximate an objective model, multiple models can be aggregated. Aggregations can represent, for example, multiple views of a single situation or multiple views of a single class of situations. Similarly, a large aggregation of situational models approximates a model of the domain of the situations, just as a large aggregation of subset models approximates a model of a database of subsets. Further, a model that aggregates many individual models of presence approximates an objective model of presence.

In a real-world embodiment, a query to "entity structure search" (analogous to one IR embodiment of phrase search) might be a current situation, and the database of situations to be searched could be the set of situations previously encountered. In this sense, a query to find the most similar situations is comparable to recalling prior relevant experience to guide current understanding and action. Similarly, a query might be based on a story told by a person in a conversation. The model of that story could be used to find similar stories known by another person in the conversation. Elements of one or more of these similar stories could form part of the reply of the person hearing the first story.

At a finer resolution, a set of phrases in the IR embodiment is analogous to a set of sequentially related entities in the real-world embodiment. Examples of such related entities include, for example: sequences of actions, chains of circumstances, and sequences of causes and effects. A search using sequences like these as a query to "entity sequence discovery" (analogous to phrase discovery) consists of finding related sequences of actions, related chains of circumstances, or related sequences of causes and effects. Applying the queries to "entity sequence search" (analogous to one IR embodiment of phrase search) or "entity sequence discovery" (analogous to phrase discovery) could also find the broader contexts of the observed sequences among the situations or other entity structures of prior experience, as well as related sequences within those contexts. This embodiment is also like having a snippet of a song remind one of other lines of the song or of circumstances in which that song was particularly salient.

A collection of individual entities observed in the real world could serve as a query to a real-world form of "key-entity search" (analogous to keyterm search), and that search could find previously encountered entity structures containing some or all of the observed entities in their most typical or salient contexts. This is another form of reminding based on contextual memory, where that memory is embodied as an ability to search a collection of contextual models.

Similarly, one or more entities can be a query to "entity sequence generation" (analogous to phrase generation) in order to find entity sequences that are prominent in contextual memory and contain one or more entities from the query. An example of this is placing an observed event into previously observed sequences of events of particular significance.

In summary, the formal structures of terms, relations, metrics, models, and model manipulations apply equally well to information retrieval (IR) embodiments and to real-world embodiments. Further, formal structures in an IR embodiment can correspond to, and represent, those in a real-world embodiment, and vice versa.

This correspondence allows these embodiments to be very useful in the design of software and systems based on models of real-world domains, situations, environments, etc., by enabling the real-world models readily to map to computer-based models, such as those used in the information retrieval embodiment. This ease of mapping directly supports methods such as object-oriented analysis, modeling, and design, and allows any combination of real-world and symbolic analysis and modeling to contribute to the ultimate design of software and systems. For example, document analysis and modeling can be used to guide fieldwork in the real world so as to refine, extend, and validate the models, leading to the final design. All computer software and system design intended to support real-world activities can benefit from use of these techniques, including not only the design of traditional applications, but also the design of virtual reality software and systems. Using the methods described, the analysis and modeling of application domains, situations, and environments can be based on collections of symbols such as documents as well as real-world entities such as people at work in their everyday working environments, and the results can then be directly mapped to computable representations.

Figure 23:
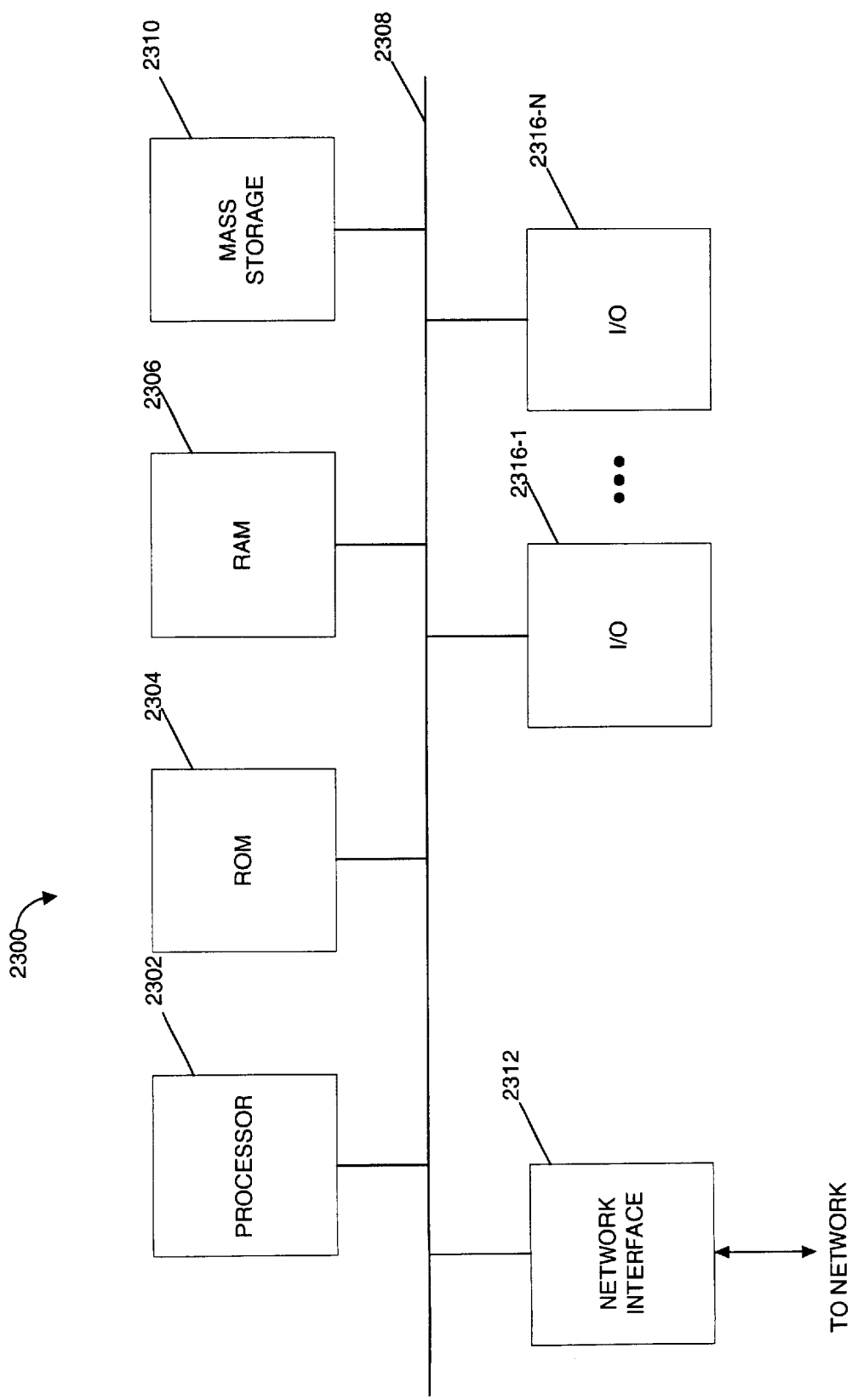
FIG. 23 shows a high-level block diagram of a computer system.

It is also contemplated that the various embodiments described above can also be practiced in the context of a computer system, computer software, computer hardware and combinations thereof. FIG. 23 shows a high-level block diagram of a computer system upon which the above described embodiments may be executed in the form of computer software and hardware. As shown, the computer system 2300 includes a processor 2302, ROM 2304, and RAM 2306, each connected to a bus system 2308. The bus system 2308 may include one or more buses connected to each other through various bridges, controllers and/or adapters, such as are well known in the art. For example, the bus system 2308 may include a "system bus" that is connected through an adapter to one or more expansion buses, such as a Peripheral Component Interconnect (PCI) bus. Also coupled to the bus system 2308 are a mass storage device 2310, a network interface 2312, and a number (N) of input/output (I/O) devices 2316-1 through 2316-N.

I/O devices 2316-1 through 2316-N may include, for example, a keyboard, a pointing device, a display device and/or other conventional I/O devices. Mass storage device 2310 may include any suitable device for storing large volumes of data, such as a magnetic disk or tape, magneto-optical (MO) storage device, or any of various types of Digital Versatile Disk (DVD) or Compact Disk (CD) based storage.

Network interface 2312 provides data communication between the computer system and other computer systems on a network. Hence, network interface 2312 may be any device suitable for or enabling the computer system 2300 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

Of course, many variations upon the architecture shown in FIG. 23 can be made to suit the particular needs of a given system. Thus, certain components may be added to that shown in FIG. 23 for given system, or certain components shown in FIG. 23 may be omitted from the given system.

Given this description, one skilled in the art will readily appreciate that the described techniques can be practiced with other computer system configurations, including multiprocessor systems, minicomputers, mainframe computers, and the like. It will also be appreciated that any of a variety of programming languages may be used to implement the embodiments as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will also be appreciated that the above-described processes can be implemented in software or hardwired in a computer system or combinations thereof. Therefore, the description of any of the embodiments described herein is not limited to any particular combination of hardware and/or software.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. Further the use of section headings is not to be construed as being limiting in any manner but rather to ease the organization and understanding of an otherwise complex presentation of information.

What is claimed is:

1. A method of searching a database comprising:

providing a plurality of relational models wherein each of the plurality of relational models includes a relational model of at least one subset of a database and a plurality of relations, wherein each of the plurality of relations includes at least one subset term pair and a subset plurality of types of relational summation metrics (RSMs) that include a summation of values of the corresponding type of relational metric of occurrences of the at least one subset term pair within at least one context window within the at least one subset and includes at least one of a right contextual metric (RCM) and a left contextual metric (LCM);

inputting a first query for the database;

creating a relational model of the first query, wherein the relational model of the first query includes at least one first query relation, each of the first query relations having a first query term pair and a first query plurality of types of relational summation metrics;

comparing the relational model of the first query to each one of the plurality of relational models of the subsets; and outputting at least one identifier of the subsets relevant to the first query.

2. The method as recited in claim 1, wherein, an order of said plurality of types of RSMs corresponds to an order of said term pair.

3. The method as recited in claim 1, further comprising, providing at least one stopterm.

4. The method as recited in claim 3, further comprising, when either a first term in said subset term pair or a second term in said subset term pair is one of said at least one stopterm, said relation is not included in said relational model of said at least one subset.

5. The method as recited in claim 3, further comprising, when a first stopterm is included in said first query, then the first stopterm is no longer included in said at least one stopterm.

6. The method as recited in claim 3, further comprising, when a first stopterm is included in said first query, said at least one stopterm no longer includes any stopterm.

7. The method as recited in claim 1, further comprising choosing said types of RSMs to include a non-directional contextual metric (NDCM).

8. The method as recited in claim 7, further comprising providing a value NDCM(T1, T2)=C−1−N of said NDCM for a single occurrence of a term pair (T1, T2) in said subset wherein:

T1 is a first term in said term pair;

T2 is a second term in said term pair;

C is equal to a number of terms in said context window; and

N is equal to a number of terms occurring between T1 and T2.

9. The method as recited in claim 1, further comprising providing a value RCM(T1, T2) for said RCM for a single occurrence of a term pair (T1, T2) in said subset wherein:

T1 is a first term in the said term pair;
T2 is a second term in the said term pair;
RCM(T1, T2)=0, if T2 precedes T1; and
RCM(T1, T2)=C−1−N, if T1 precedes T2, wherein:
C is equal to a number of terms in said context window; and
N is equal to a number of terms occurring between T1 and T2.

10. The method as recited in claim 1, further comprising providing a value LCM(T1, T2) for said LCM for a single occurrence of a term pair (T1, T2) in said subset wherein:
T1 is a first term in said term pair;
T2 is a second term in said term pair;
LCM(T1, T2)=0, follows T1; and
LCM(T1, T2)=C−1−N, if T1 follows T2, wherein:
C is equal to a number of terms in said context window; and
N is equal to a number of terms occurring between T1 and T2.

11. The method as recited in claim 1, further comprising including in said types of relational metrics a directional contextual metric (DCM).

12. The method as recited in claim 11, further comprising providing at least one directional contextual metric (DCM) among said types of relational metrics, wherein:
the DCM for a single occurrence of a term pair (T1, T2) in the subset has a value DCM(T1, T2), wherein:
T1 is a first term in said term pair;
T2 is a second term in said term pair;
DCM(T1, T2)=RCM(T1, T2)−LCM(T1, T2), wherein:
RCM(T1, T2) is a right contextual metric for a single occurrence of said term pair (T1, T2) in said subset;
LCM(T1, T2) is a left contextual metric for a single occurrence of said term pair (T1, T2) in said subset; and
RCM(T1, T2)$\geqq$LCM(T1, T2).

13. The method as recited in claim 1, further comprising providing said context window having a window size that is a function of an average sentence length.

14. The method as recited in claim 1, further comprising providing said context window having a window size that is a function of an avenge paragraph length.

15. The method as recited in claim 1, further comprising providing said context window having a window size that is a pre-selected number of terms.

16. The method as recited in claim 1, further comprising:
providing a relation threshold value for a selected one of said subset plurality of types of RSMs; and
eliminating all relations having a value of said selected type of RSM less than the relation threshold value.

17. The method as recited in claim 1, further comprising:
selecting one of said subset plurality of types of RSMs; and
selecting a pre-selected number of relations having a greatest value of the selected type of RSM from at least one of the said plurality of relational models of said subsets.

18. The method as recited in claim 1, further comprising choosing said first query to include one or more query fields.

19. The method as recited in claim 18, further comprising creating a relational model of said first query by a process comprising:
creating one or more relational models of said one or more query fields wherein, each of said one or more relational models of said one or more query fields includes at least one relational model of one of said one or more query fields in the said first query, wherein each one of said one or more relational models of said one or more query fields has one or more relations; and p1 combining said one or more relational models of said one or more query fields in said first query into a first query relational model.

20. The method as recited in claim 1, further comprising providing one or more stopterms, wherein, if neither a first term in said first query term pair nor a second term in said first query term pair is one of the one or more stopterms said RSMs are increased.

21. The method as recited in claim 1, further comprising, providing one or more stopterms, wherein, if both a first term in said first query term pair and a second term in said first query term pair are included in the one or more stopterms said RSMs are decreased.

22. The method as recited in claim 1, further comprising, providing one or more stopterms, wherein, if either but not both a first term in said first query term pair and a second term in said first query term pair is one of the one or more stopterms said RSMs are unchanged.

23. The method as recited in claim 1, further comprising providing one or more emphasis terms, wherein, if neither a first term in said first query term pair nor a second term in said first query term pair is one of the one or more emphasis terms said RSMs are decreased.

24. The method as recited in claim 1, further comprising providing one or more emphasis terms, wherein, if both a first term in said first query term pair and a second term in said first query term pair are included in the one or more emphasis terms said RSMs are increased.

25. The method as recited in claim 1, further comprising providing one or more emphasis terms, wherein, if either but not both a first term in said first query term pair and a second term in said first query term pair is one of the one or more emphasis terms said RSMs are unchanged.

26. The method as recited in claim 1, further comprising:
providing one or more stop relations, wherein each of the stop relations includes a first term and a second term and a plurality of types of relational metrics; and
eliminating the one or more stop relations from the relational model of said first query.

27. The method as recited in claim 1, further comprising inputting said first query by a process comprising transforming the first query.

28. The method as recited in claim 27, transforming said first query by a process comprising at least one of a group process consisting of:
not changing said first query; and
replacing a selected portion of said first query with an alternate portion from a substitution list.

29. The method as recited in claim 28, further comprising cross referencing said alternate portion to said selected portion of said first query in a look-up table.

30. The method as recited in claim 29, further comprising choosing said look-up table to comprise[[s]]:
one or more non-empty hash chains, wherein each of the one or more non-empty bash chains corresponds to a first section of said selected portion of said first query and each of the one or more hash chains has one or more phrases, each phrase consisting of one or more of said terms, beginning with the first section of said selected portion of said first query; and
one or more alternate portions, wherein each one of the one or more alternate portions corresponds to one of the one or more phrases.

31. The method as recited in claim 1 further comprising choosing at least one identifier of said subsets to correspond to at least one subsets of said database.

32. The method as recited in claim 1 further comprising choosing said database to included at least one of a group consisting of; text, narratives, reports, literature, punctuation, messages, electronic mail, internet text, web site information, linguistic patterns, grammatical tags, alphabetic data, alphabetic strings, numeric data, numeric strings, alphanumeric data, alphanumeric strings, sound, music, voice, audio data, audio encoding, vocal encoding, biological information, biological data, biological representations, biological analogs, medical information, medical data, medical representations, medical sequences, medical patterns, genetic sequences, genetic representations, genetic analogs, protein sequences, protein representations, protein analogs, computer software, computer hardware, computer firmware, computer input, computer internal information, computer output, computer representations, computer analogs, sequential symbols, sequential data, sequential items, sequential objects, sequential events, sequential causes, sequential lime spans, sequential actions, sequential attributes, sequential entities, sequential relations, sequential representations, patterned symbols, patterned data, patterned items, patterned objects, patterned events, patterned causes, patterned time spans, patterned actions, patterned attributes, patterned entities, patterned relations, and patterned representations.

33. A method of searching a database comprising:
providing a plurality of relational models wherein each of the plurality of relational models includes one relational model of at least one subset of a database;
inputting a first query, having one or more query fields, for the database;
creating a relational model of the first query, wherein the relational model of the first query includes at least one relation, each relation having a first query term pair and a first query plurality of types of relational summation metrics, by a process comprising:
creating one or more relational models of the one or more query fields wherein each of said one or more relational models of the one or more query fields includes at least one relational model of one of the one or more query fields in the first query, wherein each of the one or more relational models of the one or more query fields has one or more relations; and
combining the one or more relational models of the one or more query fields in the first query into a first query relational model by a process comprising:
analyzing a first one of the one or more relational models of the one or more query fields including:
determining if a first relation from the first one of the one or more relational models of the one or more query fields is included in the first query model by a process comprising:
selecting a first relation from the first one of the one or more relational models of the one or more query fields, wherein the selected first relation includes a first term pair;
determining if the first term pair is included in one of the one or more relations in the first query model;
when the first term pair is not included in one of the one or more relations in the first query model, then including the selected first relation in the first query model; and
when the first term pair is included in one of the one or more relations in the first query model,
comparing a first order of the first term pair in the selected first relation wit a second order of the first term pair in the relation from the first query model containing the first term pair;
when the first order and the second order are the same, combining a plurality of types of Relational Summation Metrics (RSMs) of the selected first relation in the first query field model, with a corresponding plurality of types of RSMs of the relation containing the first term pair in the first query model; and
when the first order and the second order are not the same,
reversing the order of the term pair in the selected first relation and exchanging a right directional RSM of the selected first relation with a left directional RSM of the selected first relation; and
combining a plurality of types of RSMs of the selected first relation in the first query field model, with a corresponding plurality of types of RSMs of the relation containing the first term pair in the first query model; and
determining if a subsequent relation from the first one of the one or more relational models of the one or more query fields is included in the first query model; and
analyzing a subsequent one of the one or more relational models of the one or more query fields; and
comparing the relational model of the first query to each one of the plurality of relational models of the subsets; and
calculating a plurality of first relevance metric values corresponding to each of the subsets; and
outputting at least one identifier of the subsets relevant to the first query.

34. The method as recited in claim 33, further comprising performing said process of combining said plurality of types of RSMs of said selected first relation in said query field model, with said corresponding plurality of types of RSMs of said relation containing said first term pair in said first query model by a process comprising:
selecting one of said plurality of types of RSMs;
selecting said relation from either of said first query field model or said first query model, wherein said selected relation has a greatest magnitude of said selected type of RSM; and
replacing said relation containing said first term pair in said first query model with the selected relation.

35. The method as recited in claim 33 further comprising selected one of said plurality of said types of said relevance metrics to include at least one of a group consisting of:
a combination of types of said relevance metrics;
a weighted sum of types of said relevance metrics; and
a weighted product of types of said relevance metrics.

36. The method as recited in claim 33, further comprising combining said plurality of type of RSMs of said selected first relation in said query field model, with said corresponding plurality of types of RSMs of said relation containing said first term pair in first query model includes:
calculating a summation of value of said corresponding plurality of types of RSMs from said relation containing the first term pair in both said first query field model and said first query model; and replacing said plurality of types of RSMs for the relation containing said first term pair in said first query model with the summation of values of said corresponding plurality of types of RSMs.

37. The method as recited in claim 33, further comprising:
selecting at least one of said one or more query fields in said first query; and
assigning a weight to the selected query field, wherein each one of said plurality of types of RSMs corresponding to the selected query field is scaled by a factor determined by a weight.

38. A method of searching a database comprising:
providing a plurality of relational models wherein each of the plurality of relational models includes one relational model of at least one subset of a database
inputting a first query, having one or more query fields, for the database;
creating a relational model of the first query, wherein the relational model of the query includes at least one relation having a first query term pair and a first query plurality of types of relational summation metrics, by a process comprising:
  creating one or more relational models of said one or more query fields wherein each of said one or more relational models of said one or more query fields includes at least one relational model of one of said one or more query fields in the first query, wherein each of said one or more relational models of said one or more query fields has one or more relations; and
  calculating for each one of the one or more relations in each one of the one or more relational models of the one or more first query fields a summation of values of each of the corresponding types of the relational metrics of each one of one or more occurrences of a first query term pair within the query field, wherein, the plurality of types of the relational metrics include at least one of a non-directional contextual metric (NDCM), a right contextual metric (RCM), a left contextual metric (LCM), and a directional contextual metric (DCM); and
  combining the one or more relational models of the one or more query fields in the first query into a first query relational model; and
comparing the relational model of the first query to each one of the plurality of relational models of the subsets; and
calculating a plurality of first relevance metric values corresponding to each of the subsets;
outputting at least one identifier of the subsets relevant to the first query.

39. A method of searching a database comprising:
providing a plurality of relational models wherein each of the plurality of relational models includes one relational model of at least one subset of a database;
inputting a first query, having one or more query fields, for the database;
creating a relational model of the first query, wherein the relational model of the first query includes at least one first query relation having a first query term pair and a first query plurality of types of relational summation metrics, by a process comprising:
  creating one or more relational models of the one or more query fields wherein each of said one or more relational models of the one or more query fields includes at least one relational model of one of the one or more query fields in the first query, wherein each of the one or more relational models of the one or more query fields has one or more relations; and
  combining the one or more relational models of the one or more query fields in the first query into a first query relational model;
comparing the relational model of the first query to each one of the plurality of relational models of the subsets by a process comprising:
  calculating a plurality of first relevance metrics for a first one of said plurality of relational models of said subsets by a process comprising:
    determining an intersection model of said relational model of said first query and a first one of said plurality of relational models of said subsets by a process comprising:
      determining one or more intersection relations, wherein each of the intersection relations has:
        a shared term pair that includes a term pair present in at least one relation in each one of said first query relational model and the first one of said plurality of the relational models of said subsets; and
        a plurality of intersection metrics (IM), wherein each IM is a function $fct(RSM_{Q1}, RSM_{S1})$, wherein:
          $RSM_{Q1}$ is a type of Relational Summation Metric (RSM) in the relational model of said first query; and
          $RSM_{S1}$ is a corresponding type of said RSM in the relational model of the first one of said plurality of relational models of said subsets; and
    calculating a first relevance metric for each of the plurality of types of said RSMs equal to a function of the plurality of corresponding IMs of all intersection relations; and
  determining a subsequent plurality of first relevance metrics corresponding to each subsequent one of said plurality of relational models of said subsets; and
outputting a first list of one or more identifiers of the subsets relevant to the first query, wherein each identifier has a corresponding type of first relevance metric for each of the plurality of types of said RSM.

40. The method as recited in claim 39, wherein said process of determining said one or more intersection relations further comprises:
determining a first order of said shared term pair in said first query relational model and a second order of said shared term pair in said first one of said plurality of the relational models of said subsets; and
reversing the second order and exchanging an RCM and an LCM of the subset relation having said shared term pair in the first one of said plurality of the relational models of said subsets, when the first order and second order are not equal.

41. The method as recited in claim 39, further comprising choosing said function $fct(RSM_{Q1}, RSM_{S1})=(RSM_{Q1})*(RSM_{S1})$.

42. The method as recited in claim 39, further comprising applying a scale factor to said $fct(RSM_{Q1}, RSM_{S1})$.

43. The method as recited in claim 39, further comprising choosing said function of said plurality of corresponding IMs of all intersection relations to include a summation of said plurality of corresponding IMs of all intersection relations.

44. The method as recited in claim 39, further comprising choosing said function of said plurality of corresponding IMs of all intersection relations to include a summation of values of each of said plurality of types of $RSM_{Q1}$ in all of said one or more first query relations having said shared term pair included in said one or more intersection relations.

45. The method as recited in claim 39, further comprising calculating said plurality of first relevance metrics for said first one of said plurality of relational models of said subsets by a process comprising assigning a zero relevance to the first one of the plurality of subsets if all term pairs of said relational model of said first query are not included in said relational model of the first subset.

46. The method as recited in claim 39, wherein determining said intersection model further comprises:
applying a scaling factor to said function of said plurality of corresponding intersection metrics.

47. The method as recited in claim 46, further comprising choosing said scaling factor to be a subset emphasis factor (SEF)=$S_S/R$, wherein $S_S$ is equal to a summation of values of a selected said type of relational summation metric (RSM) from all subset relations having one of said shared term pairs in the first one of said plurality of relational models of said subsets and R is equal to a summation of values of the selected said type of relational summation metric (RSM) in all of said subset relations in the first one of said plurality of relational models of said subsets.

48. The method as recited in claim 46, further comprising choosing said scaling factor to be a query emphasis factor (QEF)=$S_Q/Q$, wherein $S_Q$ is equal to a summation of values of a selected said type of relational summation metric (RSM) from all of said query relations having one of said shared term pairs in said relational model of the said first query and Q is equal to a summation of values of the selected said type of relational summation metric (RSM) in all of said query relations in said relational model of said first query.

49. The method as recited in claim 46, further comprising choosing said scaling factor to be a length emphasis factor (LEF)=$L_S/T$, wherein $L_S$ is equal to a number of terms in said subset and T is equal to a number greater than a number of terms in a largest subset of said database.

50. The method as recited in claim 46, further comprising choosing said scaling factor to be an alternate length emphasis factor (LEF$_{alt}$)=$L_{cap}/T$, wherein, $L_{cap}$ is equal to the lesser of either a number of terms in said subset or an average number of terms in each one of said plurality of subsets, and T is equal to a number greater than a number of terms in a largest subset of said database.

51. The method as recited in claim 39, wherein outputting said at least one identifier of said subsets relevant to said first query comprises:
outputting a plurality of types of said relevance metrics corresponding to each of said subsets;
selecting one of said plurality of types of said relevance metrics; and
sorting identifiers of said subsets in order of magnitude of the selected one of said plurality of types of relevance metrics.

52. The method as recited in claim 51, further comprising choosing said selected one of said plurality of types of relevance metrics to include at least one of a group consisting of:
a combination of types of said relevance metrics;
a weighted sum of types of said relevance metrics; and
a weighted product of types of said relevance metrics.

53. The method as recited in claim 51, further comprising mormalizing each of said plurality of corresponding intersection metrics of all of said intersection relations.

54. The method as recited in claim 51, further comprising outputting said relational model of said first query.

55. The method as recited in claim 51, further comprising displaying a pre-selected number of said subsets in order of magnitude of said selected type of relevance metric.

56. The method as recited in claim 55, further comprising highlighting one or more said shared term pairs in each of said subsets relevant to said first query, wherein the terms within each of said one or more shared tern pairs, occur within at least one context window in the subset.

57. The method as recited in claim 56, further comprising choosing one or more of said shared term pairs to consist of said shared term pairs having a greatest magnitude of a selected type of said relevance metric.

58. The method as recited in claim 51, further comprising displaying one or more of said shared term pairs that are included in each one of said subsets relevant to said first query, wherein terms within each one of said one or more shared term pairs occur within at least one context window in the subset.

59. The method as recited in claim 58, further comprising determining a typical order of each of said shared term pairs by process comprising:
comparing a magnitude of an RCM of said shared term pair to a magnitude of an LCM of said shared term pair;
when the RCM is larger said shared term pair is in typical order;
when the LCM is larger, reverse an order of said shared term pair and exchange the RCM and the LCM.

60. The method as recited in claim 58, further comprising, for each one of said one or more shared term pairs, displaying a feedback metric of the query (FBM$_{Q1}$) equal to a combination of an LCM$_{Q1}$ and an RCM$_{Q1}$ and displaying a feedback metric of a subset (FBM$_{S1}$) equal to a combination of an LCM$_{S1}$ and an RCM$_{S1}$ and a product equal to wherein the LCM$_{Q1}$ is equal to a left contextual metric of said shared term pair in said query, the RCM$_{Q1}$ is equal to a right contextual metric of said shared term pair in said query, LCM$_{S1}$ is equal to a left contextual metric of said shared term pair in said subset and the RCM$_{S1}$ is equal to a right contextual metric of said shared term pair in said subset.

61. The method as recited in claim 58, further comprising choosing said plurality of said shared term pairs to consist of one or more of said shared term pairs having a greatest magnitude of a selected type of said relevance metric.

62. The method as recited in claim 39, further comprising:
inputting a second query;
creating a relational model of the second query;
comparing the relational model of the second query to each one of said plurality of relational models of said subsets;
outputting a second list of one or more identifier of said subsets relevant to the second query; and
determining a plurality of combined relevance metric values by combining, for each of said types of RSM, values of a second plurality of said relevance metrics for the second query with values of said first plurality of relevance metrics for said first query.

63. A method as recited in claim 62, further comprising determining a third list of one or more identifiers of said subsets to consist of at least one identifier of said subsets present in both of said first and second lists of one or more identifiers of said subsets, wherein, for a selected one of said types of RSM, said combined relevance metric values are greater than zero for each of the identifiers included in the third list of identifiers.

64. A method as recited in claim 63 further comprising computing at least one of said combined relevance metric values by a process comprising calculating a product of values of a first type of first relevance metric and a first type of a second relevance metric.

65. A method as recited in claim 62, further comprising determining a third list of one or more identifiers of said subsets to consist of at least one identifier of said subsets present in either or both of said first and second lists of one or more identifiers of said subsets, wherein, for a selected one of said types of RSM, said combined relevance metric values are greater than zero for each of the identifiers included in the third list of identifiers.

66. A method as recited in claim 65, further comprising computing at least one of said combined relevance metric values by a process comprising calculating a summation of values of a first type of first relevance metric and a first type of a second relevance metric.

* * * * *